(12) United States Patent
Quady

(10) Patent No.: US 10,054,464 B2
(45) Date of Patent: *Aug. 21, 2018

(54) ELECTRICAL POWER SWITCH CONTROL WITH USAGE DATA DISPLAY

(71) Applicant: Curtis E. Quady, Burnsville, MN (US)

(72) Inventor: Curtis E. Quady, Burnsville, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/622,230

(22) Filed: Jun. 14, 2017

(65) Prior Publication Data

US 2017/0307406 A1 Oct. 26, 2017

Related U.S. Application Data

(63) Continuation of application No. 15/052,691, filed on Feb. 24, 2016, now Pat. No. 9,683,867.
(Continued)

(51) Int. Cl.
*G01D 4/12* (2006.01)
*H02J 3/12* (2006.01)
(Continued)

(52) U.S. Cl.
CPC ............ *G01D 4/002* (2013.01); *G01D 4/00* (2013.01); *H02J 3/12* (2013.01); *G06Q 30/0283* (2013.01);
(Continued)

(58) Field of Classification Search
CPC .................... G06Q 30/00–30/08; G01D 4/002
See application file for complete search history.

(56) References Cited

U.S. PATENT DOCUMENTS

| 6,894,609 | B2 | 5/2005 | Menard et al. |
| 6,967,562 | B2 | 11/2005 | Menard et al. |

(Continued)

FOREIGN PATENT DOCUMENTS

WO WO-2012166780 A1 12/2012

OTHER PUBLICATIONS

"U.S. Appl. No. 13/458,757, Response filed Jan. 23, 2013 to Non Final Office Action dated Oct. 26, 2012", 11 pgs.
(Continued)

*Primary Examiner* — Michael Misiaszek
(74) *Attorney, Agent, or Firm* — Schwegman Lundberg & Woessner, P.A.

(57) ABSTRACT

A device to be connected to first electrical power wiring and for displaying electrical power usage information of at least one first electrical load connected to the first electrical power wiring, the device including terminals to electrically connect to the first electrical power wiring of a building, a controller to receive information representing at least a current to the at least one first electrical load, determine first electrical power usage information of the at least one first electrical load using the received information, a user interface to display the determined first electrical power usage information of the at least one first electrical load, and a communications interface to transmit the determined first electrical power usage information to at least one second electrical device for display, and receive determined second electrical power usage information of at least one second electrical load from the at least one second electrical device for display.

34 Claims, 24 Drawing Sheets

Related U.S. Application Data

(60) Provisional application No. 62/248,419, filed on Oct. 30, 2015.

(51) Int. Cl.
   *G01D 4/00* (2006.01)
   *G06Q 50/06* (2012.01)
   *G06Q 30/02* (2012.01)
   *G06Q 30/06* (2012.01)

(52) U.S. Cl.
   CPC ......... *G06Q 30/0613* (2013.01); *G06Q 50/06* (2013.01)

(56) References Cited

U.S. PATENT DOCUMENTS

| | | | |
|---|---|---|---|
| 7,324,876 B2 | 1/2008 | Ying | |
| 8,149,095 B2 | 4/2012 | Hayashi et al. | |
| 8,340,834 B1 | 12/2012 | Walma et al. | |
| 8,350,694 B1 | 1/2013 | Trundle et al. | |
| 8,373,547 B2 | 2/2013 | Benya et al. | |
| 8,548,439 B2 | 10/2013 | Quady | |
| 9,683,867 B2 | 6/2017 | Quady et al. | |
| 2003/0091158 A1 | 5/2003 | Puchek et al. | |
| 2006/0154642 A1 | 7/2006 | Scannell, Jr. | |
| 2006/0277075 A1 | 12/2006 | Salwan | |
| 2008/0258650 A1 | 10/2008 | Steiner et al. | |
| 2011/0028121 A1 | 2/2011 | Sennett | |
| 2012/0309364 A1 | 12/2012 | Quady | |
| 2013/0030589 A1* | 1/2013 | Pessina | H05B 37/0272 700/295 |
| 2013/0253721 A1 | 9/2013 | Parsons | |
| 2013/0304268 A1 | 11/2013 | Pernia et al. | |
| 2014/0054963 A1 | 2/2014 | Spitchka et al. | |
| 2016/0111878 A1 | 4/2016 | Qureshi et al. | |
| 2017/0122774 A1 | 5/2017 | Quady | |

OTHER PUBLICATIONS

"U.S. Appl. No. 13/458,757, Non Final Office Action dated Oct. 26, 2012", 11 pgs.

"U.S. Appl. No. 13/458,757, Notice of Allowance dated Jun. 25, 2013", 17 pgs.

"U.S. Appl. No. 13/659,772, Examiner Interview Summary dated Aug. 13, 2013", 2 pgs.

"U.S. Appl. No. 13/659,772, Non Final Office Action dated Aug. 22, 2013", 16 pgs.

"U.S. Appl. No. 13/659,798, Examiner Interview Summary dated Aug. 12, 2013", 2 pgs.

"U.S. Appl. No. 13/659,798, Non Final Office Action dated Aug. 19, 2013", 16 pgs.

"U.S. Appl. No. 15/052,691, Advisory Action dated Dec. 27, 2016", 3 pgs.

"U.S. Appl. No. 15/052,691, Corrected Notice of Allowance dated Mar. 30, 2017", 2 pgs.

"U.S. Appl. No. 15/052,691, Final Office Action dated Oct. 28, 2016", 21 pgs.

"U.S. Appl. No. 15/052,691, Non Final Office Action dated Aug. 30, 2016", 21 pgs.

"U.S. Appl. No. 15/052,691, Notice of Allowance dated Feb. 23, 2017", 8 pgs.

"U.S. Appl. No. 15/052,691, Response filed Jan. 6, 2017 to Final Office Action dated Oct. 28, 2016", 14 pgs.

"U.S. Appl. No. 15/052,691, Response filed Jul. 22, 2016 to Restriction Requirement dated Jul. 6, 2016", 10 pgs.

"U.S. Appl. No. 15/052,691, Response filed Sep. 23, 2016 to Non Final Office Action dated Aug. 30, 2016", 12 pgs.

"U.S. Appl. No. 15/052,691, Response filed Nov. 21, 2016 to Final Office Action dated Oct. 28, 2016", 14 pgs.

"U.S. Appl. No. 15/052,691, Restriction Requirement dated Jul. 6, 2016", 7 pgs.

"Canadian Application Serial No. 2,944,789, Office Action dated May 10, 2017", 5 pgs.

"Canadian Application Serial No. 2,944,789, Response filed Jun. 14, 2017 to Office Action dated May 10, 2017", 5 pgs.

"International Application Serial No. PCT/US2012/039962, International Search Report dated Sep. 19, 2012", 4 pgs.

"International Application Serial No. PCT/US2012/039962, Written Opinion dated Sep. 19, 2012", 4 pgs.

* cited by examiner

ELECTRICAL POWER SWITCH CONTROL WITH USAGE DATA DISPLAY

CLAIM OF PRIORITY

This application claims the benefit of priority of U.S. patent application Ser. No. 15/052,691, titled "ELECTRICAL POWER SWITCH CONTROL WITH USAGE DATA DISPLAY", filed on Feb. 24, 2016, which claims the benefit of priority of U.S. Provisional Patent Application Ser. No. 62/248,419, titled "ELECTRICAL POWER SWITCH CONTROL WITH USAGE DATA DISPLAY" to Curtis E. Quady and filed on Oct. 30, 2015, which are herein incorporated by reference in their entirety.

RELATED APPLICATIONS

This application is related to U.S. Pat. No. 6,894,609, issued on May 17, 2005 and U.S. Pat. No. 6,967,562, issued on Nov. 22, 2005, both of which are incorporated herein by reference in their entirety.

This application is related to U.S. patent application Ser. No. 14/136,191, titled "INTERACTIVE PROPERTY COMMUNICATION SYSTEM," and filed on Dec. 20, 2013, the entire contents being incorporated herein by reference.

BACKGROUND

It is thought that the average person in the United States (2010 population greater than 308 million according to the United States Census Bureau) normally spends almost one-half of their time in their "household" (greater than 113,000,000 in 2010—United States Census Bureau) owned, rented or living with others (a convenient term used to represent where a person calls their "home"). The elderly and disabled spend more to all of their time in their home. If the weather is inclement, a person is sick, without a job, has little income, or with other similar or adverse happenings or conditions, the time spent in their home would be substantially more.

When a person does leave their home it is common for them to carry a portable cell phone ("PCP"), portable smart phone ("PSP") or some other such similar portable communication device—commonly cell phones ("CP") (of 308,000,000 citizens, 234,000,000 owned CP's—"comScore") that allows for a user ("user") to, among other functions, make and receive voice calls, e-mails, text or other short messages, videos, pictures, music, voice, data, graphics, and in general, send and receive other information, along with carrying in the CP personal alarm clocks, calendars, reminders, contact name, business, etc. lists, having and using an internet web browser and entering a web address, selecting speed connections through a personalized app, using voice commands, etc. to connect to a destination web site, etc. to search, view, etc. and obtain requested or other useful, in general, information in various forms.

In most circumstances when the user leaves their home they have their CP powered up or turned on in some mode that they can be aware of some to all inbound e-mails, telephone calls, messages, data, etc., broadly called inbound information. But many times the user must turn the CP off, or at least turn the CP to some form of diminished alert status to incoming information—thus rendering the CP in many cases partially to completely inoperative to inbound information. Examples of when the user must turn off or to a diminished alerting status would be in a meeting, in church, in a movie theater, to name but a few likely situations. Or the user may simply elect to not have the CP on, not be in useable proximity, may even have left it somewhere or have had the battery drained below operating levels, thus rendering the CP temporarily or permanently unusable for any communications—in or out.

When a person returns home they generally set their CP somewhere in a single location, thus making the CP usage or range of operability extremely small, or perhaps not operational at all. In some cases in the US and in the World, some people return home and do not have either a CP or home land-line telephone provider service. This circumstance may be one of choice, or because one or both of the services to the CP and/or land-line telephone may be inoperative because of numerous reasons. In either of these cases, the user(s) would be totally without telephone-type communication—in or out bound.

In the past it was common for the US household and its inhabitants (each household has 2.6 inhabitants—US Census Bureau 2010 totaling more than 294,000,000 population in households) to have a telephone land-line. In 1999 there were 186,000,000 home lines. But since 2000 the number of land-lines has fallen in number 4 to 6% every year since. And even more, today 25% of homes have abandoned their landlines (National Health Interview Survey). 22.9% of adults live in homes that have CP but no land-line telephone. The number of wireless (CP) only homes grew 4.3% between 2008 and 2009. Younger users are more likely to live in CP only homes: 48.6% of people aged 25-29, 33% of people aged 18-24 and 30-34. More interesting are those adults living in poverty live in 36.3 CP only homes, and amazingly 1.7% of US adults have no phone—CP or land-line. A review of the telephone company's revenue from home land-lines shows a similar story; continue decreasing numbers of home land-lines and revenue, along with increasing revenue from CP service. In the past, households treated the telephone company as a utility—a must, but today what with higher energy, food, etc. costs, loss or reduction in work and earnings or stagnant income, etc., consumers are saying land-lines are an expendable luxury that can only call from home not anywhere the user is. Even abandoned and foreclosed homes are contributing to abandoned or cancelled land-line service, not to be often placed back into service with a new owner. Even new homes now come with 'optional' telephone wiring.

People at home are very often not in close contact with either type of telephone—CP or landline because they are in a different or distant room, indisposed, disabled, aged or slow of movement, sleeping or are outside in their yard where they cannot hear either phone 'ring.' Additionally people may not be able to hear the phone 'ring' because the volume is turned down or off by conscious switching or by a depleted battery, the phone and/or network is inoperable, or the CP is on vibrate. Or people at home can perhaps hear either phone 'ring' but cannot answer because they are indisposed, have their arms full or cannot answer for numerous other reasons.

One attempt to provide communications with persons at home was taken with prior art home security systems that provide an emergency communication controlled by an alarm panel at the home of the individual. However, such communications are restricted to situations where the person is at the location of the alarm panel in the home.

Consequently, cell phones are intended to provide communications to a person, but those communications have the foregoing issues. Accordingly, there is a need in the art for providing an improved interactive communication system for dwellings and other places occupied by people.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present invention provides a system for bidirectional communication that can programmably control communications to and from places where people, live, work, monitor, recreate, safeguard or protect, or just generally occupy. For the purposes of this application, each such place shall be called a "property." The use of the term property shall not be limited to a structure, but can include areas outside of a structure, such as a back yard or playground. Thus, the property can be indoors or outdoors, or combinations thereof. Any variety of dwelling places, workplaces, storage places, and play areas are included as some examples of the scope of the concept of property for purposes of this application. The system includes a content control service that acts as a broker for the type of communications sent to the property and the information coming from the property to at least one agency (a "broker service"). In various applications, the broker service is programmable for indicating a plurality of parameters for communications, including preferences of communications.

The present system allows for a communications to a home, office, warehouse, factory, or any number of properties. It allows the resident or subscriber the ability to control communications as they move from one location at the property to another, as long as each such location in the property has at least one Property Communications Node (PCN) that allows for two-way communications between the person at the property and the broker service. Depending on the application a plurality of PCNs may be employed. It is understood that in some applications a single PCN may suffice.

Communications System

Figure 1:
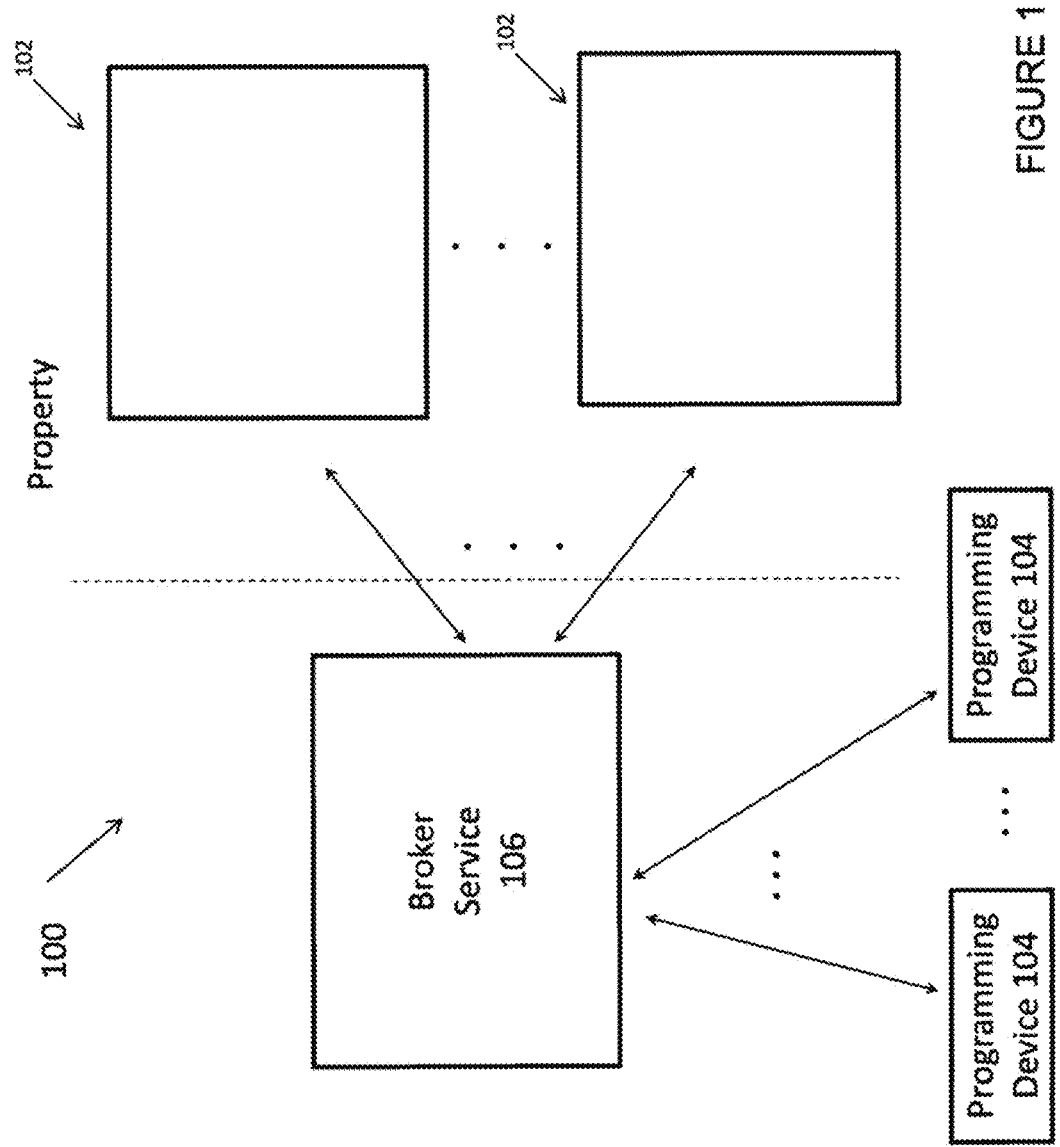
FIGS. 1-5 show some different embodiments of an interactive property communication system according to various embodiments of the present subject matter.

FIG. 1 shows a block diagram of an overview of one embodiment of a system of the present subject matter. The system 100 includes a broker service 106 that can be configured by one or more programming devices 104 and which is in communication with one or more property communication nodes (PCNs) 102. In various embodiments, the PCNs 102 are devices that communicate with sensors at the property and provide annunciation functions for the subscriber(s) at the property. Further aspects of the communications system are set forth in this document and the examples given herein are intended to demonstrate the present subject matter and not in an exhaustive or limited sense.

Broker Service

The broker service may have a variety of communications options and may be deployed across a number of and variety of different apparatus. It is understood that the broker service 106 can communicate with one or a plurality of PCNs. It is understood also that the broker service 106 can communicate to a property or a plurality of different properties. Such communications can be to a single subscriber or to a plurality of subscribers. For example, the broker service can communicate with a single PCN at the property of a single subscriber. It can communicate to several property owned or controlled or rented or merely occupied by the same subscriber. These same communications can take place with any number of PCNs at each property, as long as there is at least one PCN at each property.

For example, the broker service can communicate with a single PCN at the property of a plurality of subscribers. It can communicate to several property owned or controlled or rented or merely occupied by a plurality of subscribers. These same communications can take place with any number of PCNs at each property, as long as there is at least one PCN at each property.

In various embodiments, the broker service is connected to the PCNs at the property. Such connection can be wired, wireless, or combinations thereof. One embodiment is a wireless connection to the PCNs 102 and a wireless or wired connection to the programming devices 104. The connection can be a network connection adapted for a variety of uses and users or it can be a dedicated connection. Any variety of wireless protocols can be employed including, but not limited to, cellular, sms messaging, WiFi, Bluetooth™, and proprietary wireless protocols. Wired connections include various types of typical Internet connections, local area network connections, intranet connections, public switched telephone network (PTSN) connections, and proprietary network connections.

In one embodiment, the broker service 106 is connected to the Internet. It is also connected to the telephone network, including wireless cellular networks. It has a software interface that affords subscribers secure access via a dedicated programming interface or via a general communication interface with controlled access. In various embodiments, the broker service 106 includes a database for each subscriber. The database includes some private information about the subscriber and application-specific information. For example, assuming the particular application relates to medical monitoring, the entry for the subscriber can include medical information about the subscriber, and information about the timing and nature of the medical monitoring that must be done for that subscriber. To demonstrate one example, the subscriber database can include the following (however, the subscriber database can include different and other information and is not limited to this example):

Subscriber Name: John Smith
    Subscriber Medical Monitoring Notification: "Did you take your insulin?"
    Frequency of Notification: 3 times a day
    Notification times: 9:00 a.m., 1:00 p.m., 6:00 p.m.
    Notification method: Transmit verbal message to PCN
    Confirmation Codes: Code 1 "Press 1 or say one for Yes," Code 2 "Press 2 or say two for No," Code 3 "Press 3 or say Need Help" for Need Help
    Confirmation Method: Voice Prompt and Voice Recognition at
    Property
    Contingency actions by broker service based on results from f.:
        If Need Help, then
            Contact 911 Emergency Systems with Subscriber Name and Subscriber PCN Address and Subscriber Medical Information
            Contact Daughter, Mary Smith
                Call (613) 333-3099
                Email: msmith338@aol.com
        If No, then the broker service will contact subscriber's Daughter, Mary Smith at (613) 333-3099
        Authorized Access Contact: Daughter, Mary Smith at (613) 333-3099 (this allows the trusted daughter the ability to access all of the subscriber's information).

Therefore, the broker service 106 provides a confidential, trusted resource for monitoring and controlling communications for each subscriber. It provides a barrier to unwanted communications from services and individuals who would like to use the communications to their advantage and allows the subscriber to control such features. It provides the broker service 106 an ability to block unwanted communications (as defined by the subscribership) and to allow preferred communications to and from the subscriber with third parties (other individuals, services, entities) via the PCN or PCNs 102.

Figure 8:
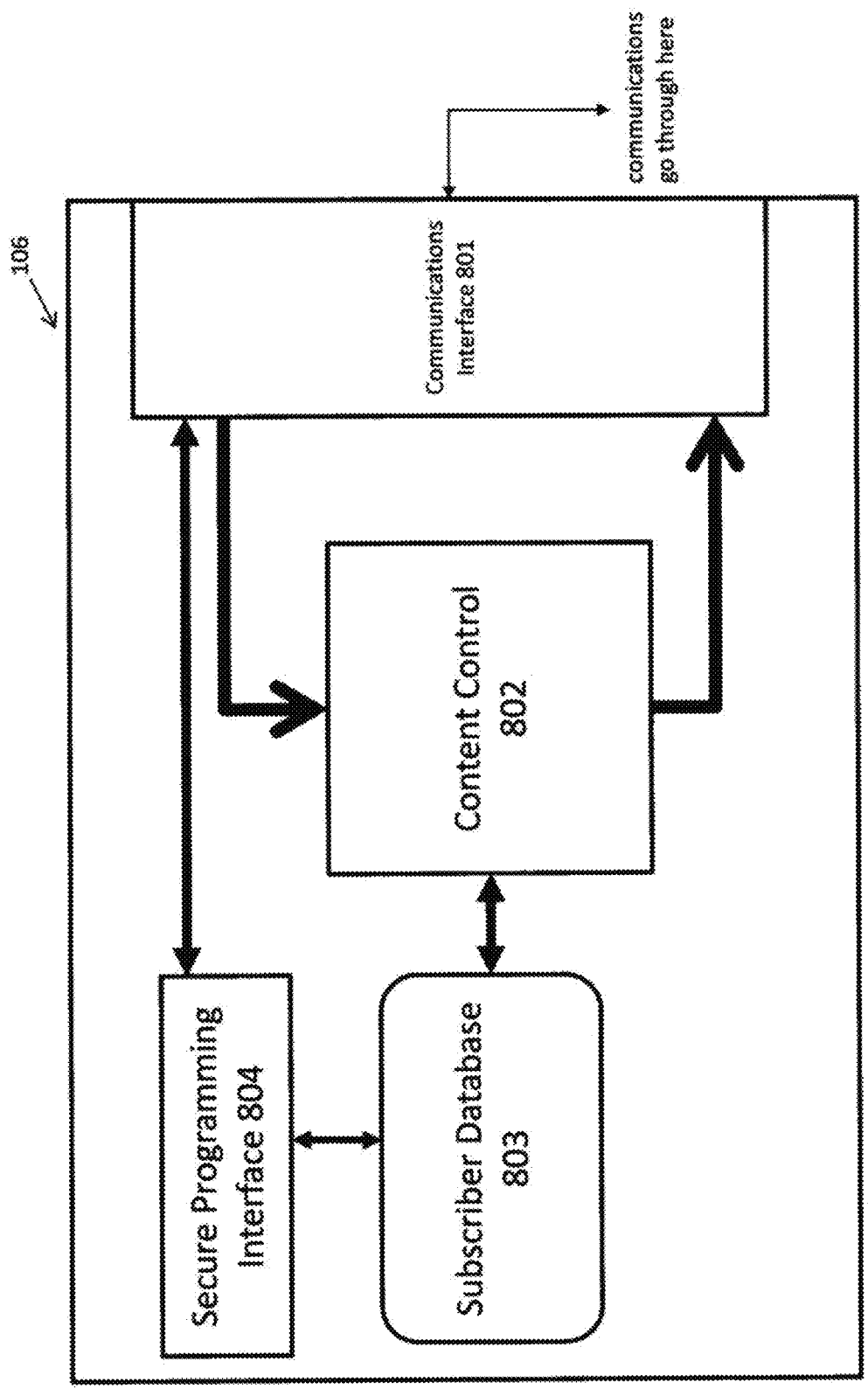
FIGS. 8 and 9 show some variations of different embodiments of broker service block diagrams according to various embodiments of the present subject matter.
Figure 9:
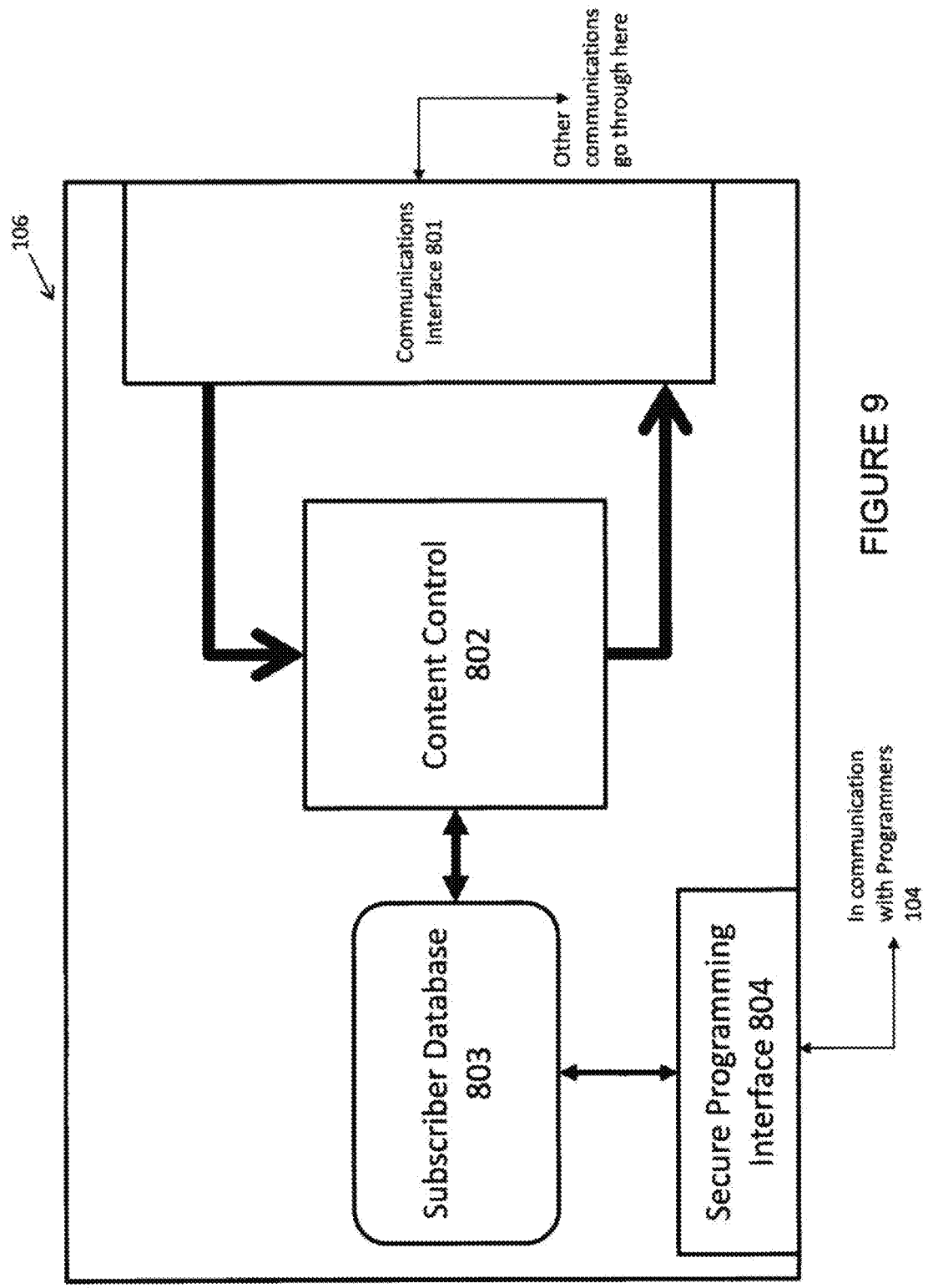

In various embodiments, the broker service 106 has a database for subscriber information 803, and a content controller 802 for filtering content through the broker service 106, as shown in FIGS. 8 and 9. The embodiment of FIG. 8 includes a common communication interface 801 which controls communications to and from subscribers, programming devices, service providers and content sources. The broker service 106 provides controlled access by the subscribers using secure programming interface 804. Programming devices 104 can be used to communicate to the interface 801 and provide the necessary authentication codes or information to access the subscriber database 803 via secure programming interface 804. This allows configurable and programmable ways for different trusted entities to program the subscriber database 803 or portions of it. For example, subscribers via programming devices 104 can program the subscriber database 803 (and access information therefrom) using a security code, password, or other controlled access.

Other subscriber information can be accessed and programmed from a portion of the subscriber database by trusted services, for example in the application involving home security a trusted monitoring service can access subscriber information to update its alert database, or to query the subscriber for customized access information. For example, the trusted service provider (e.g., monitoring service) can provide queries to the subscriber who is their customer to request updates for monitoring and alerts. The subscriber can receive such queries at their respective PCN(s) 102 and respond. The information can be stored in the subscriber database under an entry for that monitoring service. For example, if a fire is detected, besides contacting emergency support services, the system is programmed to contact the subscriber at her cell phone number (613) 337-2013 and send a text message to a predetermined internet address with the fire detection information. Of course, the broker service could contact any neighbor, friend, or other PCN of such persons.

The broker service can use any PCN on the network to distribute information. In some applications, only the broker service knows where the subscriber is at and the broker service can take appropriate actions based on the predetermined programming by the subscriber. The broker system can provide these contingency options for the subscriber no matter where the subscriber is at. One such application can be in travel. For example a hotel fitted with PCNs could be used by any subscriber to "follow" his or her person along their travels and any emergency or other communications can relatively seamlessly be conducted while the subscriber is at the hotel or other establishment fitted with a PCN. The broker service can know where the person is at physically and address any situation as programmed by the subscriber in any event.

The embodiment of FIG. 9 includes at least two communication interfaces. A first communications interface 801 is used generally for incoming information from a variety of sources and for outgoing information to a variety of destinations, based on content controller 802. In this embodiment, the secure programming interface 804 is directly accessible for subscribers and other users of programming devices 104. The secure programming interface 804 allows access to the subscriber database 803.

Figure 10:
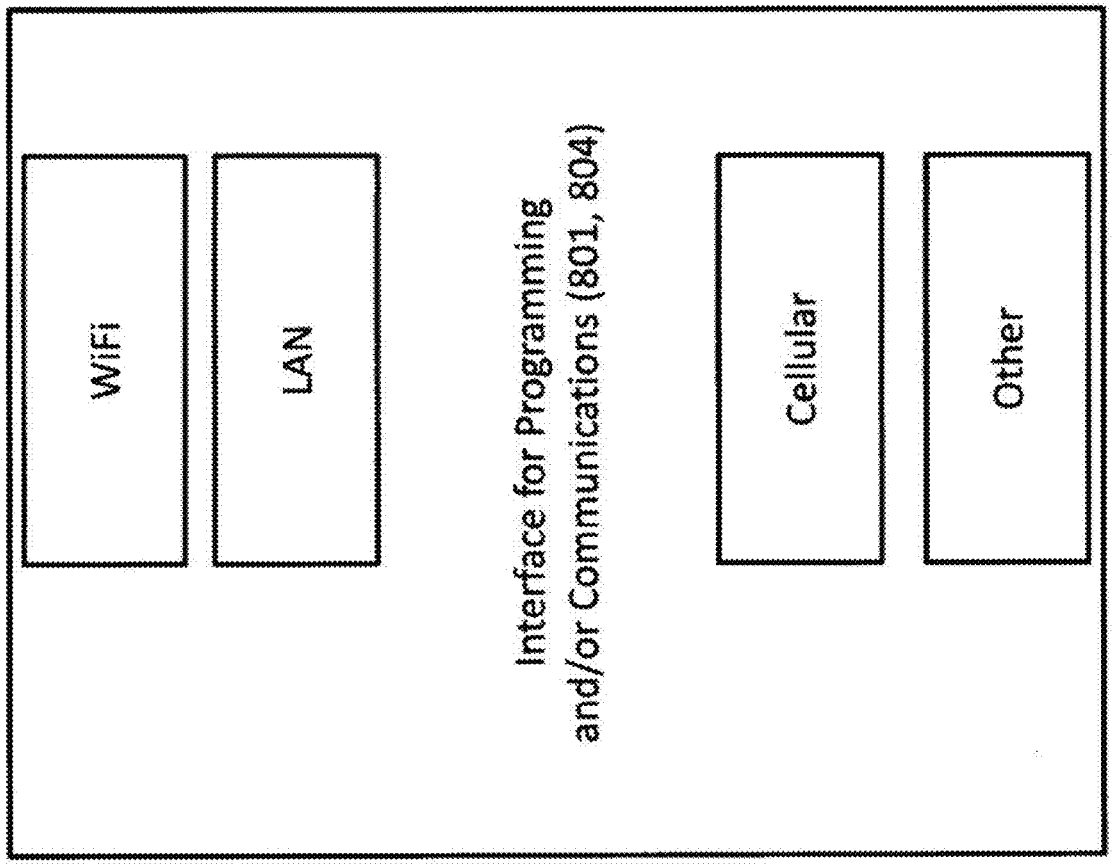
FIG. 10 shows one example of different interfaces of a broker service according to various embodiments of the present subject matter.

FIG. 10 demonstrates that for either interface 801 or 804, any variety of wired and wireless protocols can be employed including, but not limited to, cellular, LAN, WiFi, and other protocols. FIG. 10 demonstrates just some of the protocols available. It is understood that a variety of other protocols can be employed, including, but not limited to, SMS messaging, Bluetooth™, and other proprietary wireless protocols. Other wired connections include, but are not limited to various types of typical Internet connections, Ethernet connections, intranet connections, public switched telephone network (PTSN) connections, and proprietary network connections.

In various embodiments, the subscriber database includes portions that are accessible by the subscriber, portions that are accessible by service providers approved by that subscriber, portions that are accessible for other service providers not yet approved, and portions that are used by the broker service to attend to the various needs of the subscribers. Other accesses are contemplated and the present system is not limited to those mentioned, as they are used to demonstrate the system. Further examples of such embodiments are provided in this disclosure after discussion of the other aspects of the system 100.

In various embodiments, the broker service 106 is remote from the property or properties being serviced. This provides the broker service 106 an ability to be located at one or more locations independent of the property or properties. The broker service 106 can "follow" a subscriber as they move from location to location, whether in a single property or across multiple properties. This is a great advantage over prior art systems using a single control feature, such as alarm systems which use a single alarm panel for a single location. Therefore, the present system allows for a subscriber to use and benefit from his or her preferences and programming across a vast array of locations, whether intra-property or inter-property.

Property Communications Nodes (PCNs)

Figure 2:
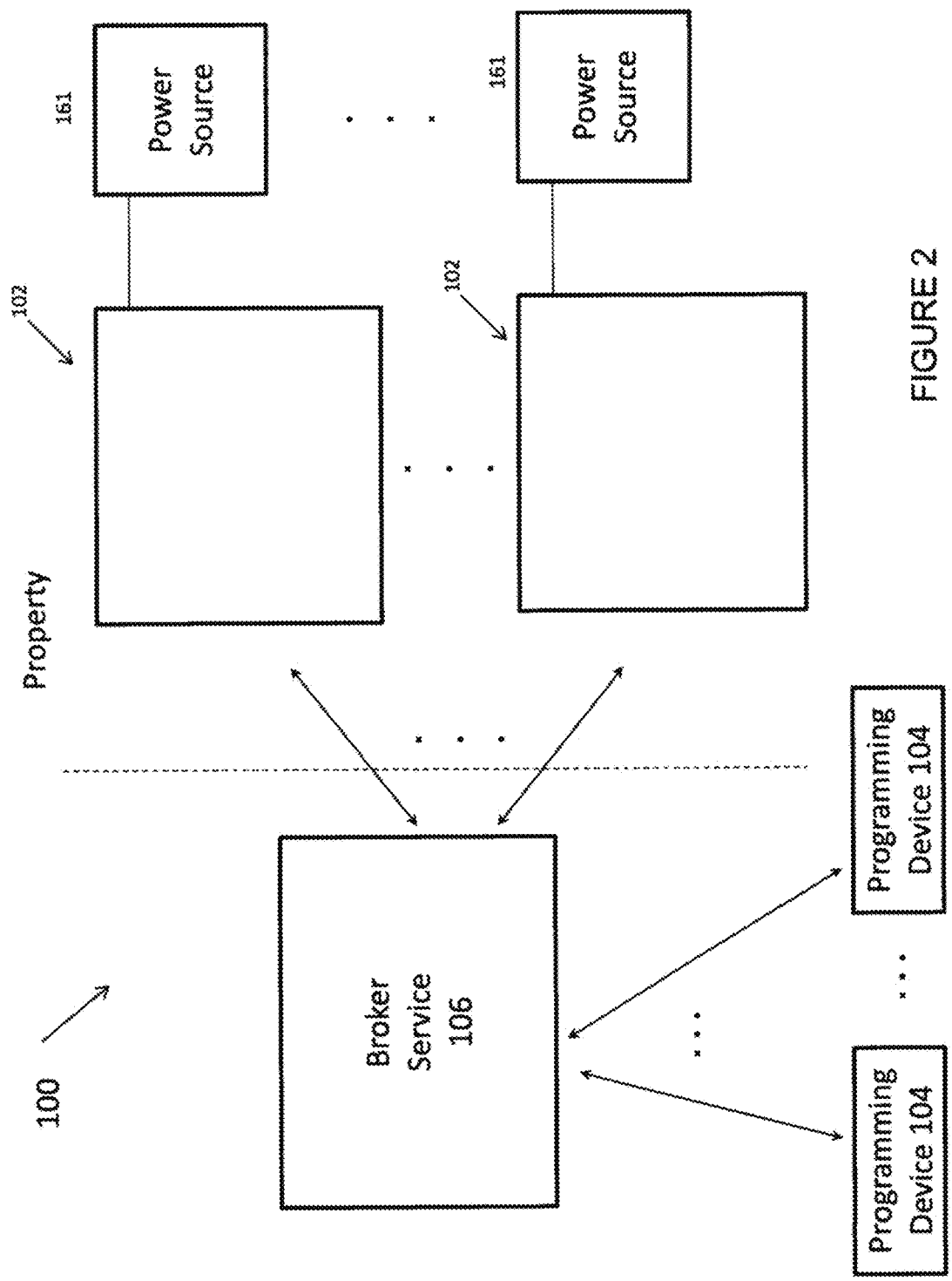

The PCNs 102 that can be used to provide bidirectional communications to subscribers at one or more properties can vary. In various embodiments, each PCN 102 is adapted to communicate with the broker service 106. Consequently, one advantage of the present system is the ability for PCNs to individually and independently conduct bidirectional communications with the broker service 106. In various embodiments, each PCN 102 includes a connection to the power source and is located at the property, as demonstrated in FIG. 2. The PCNs 102 can be used in a multitude of ways that provide programmable, controlled, bidirectional communications with the person or persons at the property for a multitude of new applications.

For example, in one embodiment, the PCNs include the electrical switches shown in U.S. Pat. No. 6,894,609 (the 609 patent) and door lock mechanisms in p U.S. Pat. No. 6,967,562 (the '562 patent), which have been incorporated herein by reference. It is understood that their use in the description is intended to demonstrate the present subject matter, but not in a limited or exclusive or exhaustive sense, and that other PCNs may be used without departing from the scope of the present subject matter. Some of those additional PCN designs are demonstrated by this disclosure as set forth herein.

Figure 3:
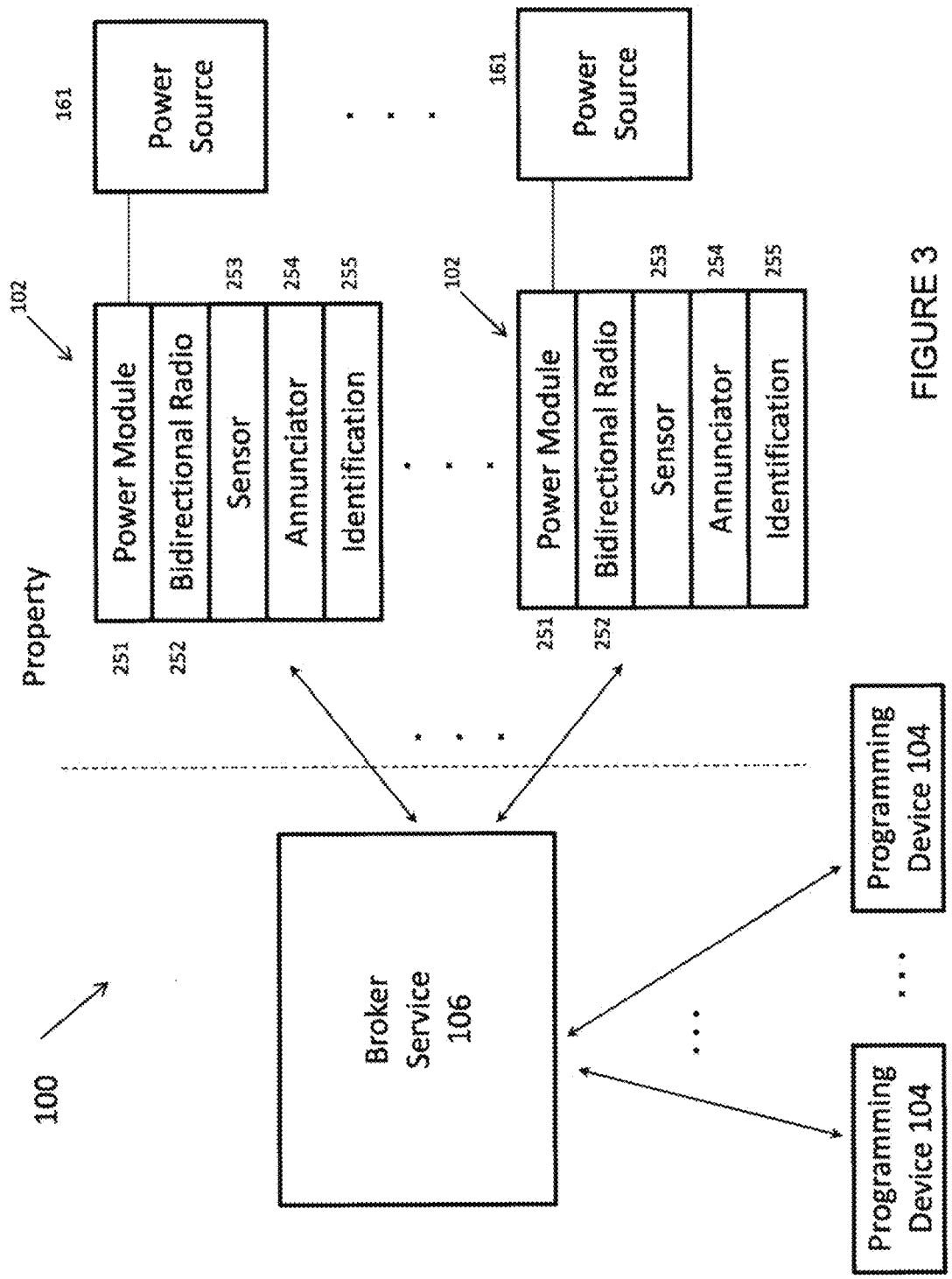

FIG. 3 demonstrates the system 100 according to various embodiments of the present subject matter. The PCNs 102 demonstrated provide a power module 251 which includes circuits for connection to power source 161, such as a typical electrical service. Such circuits may include various features such as a backup power feature that allows the PCN 102 to remain powered for at least a while should the electrical service fail. In some embodiments, a rechargeable battery is maintained at a desired level of charge to function to communicate with the broker service 106 should the power system fail, which is common in typical emergency situations (such as power system failures due to a lightning storm, heat wave, blizzard, tornado, hurricane, or earthquake, for example). In this way, the PCN 102 can provide crucial communications for the disabled, elderly, injured, or young person at a property during such emergency.

PCN 102 also includes a bidirectional radio 252 for communications to the broker service 106. The PCN may employ any number of radio options without departing from the scope of the present subject matter. In various embodiments, the radio 252 is a cellular device that can be connected to the broker service 106 via existing cellular infrastructure. In various embodiments radio 252 is a packet radio device that can communicate with a variety of packet interfaces. In various embodiments, radio 252 is WiFi compatible for internet connections to the broker service 106.

In various embodiments, radio 252 is a software radio that is configurable for a plurality of wireless frequencies and/or protocols. In various embodiments, the radio 252 is programmed by an installer upon placement of the PCN 102 at the property. In various embodiments, the subscriber at the property can choose a communication protocol. In various embodiments, the software radio can automatically detect wireless radio communication options available to it and provide a number of options for the subscriber. In various embodiments the software radio can automatically detect wireless radio communication options and select at least an initial service for communications.

The subscriber can select another wireless option using programming device 104. In other embodiments, the broker service 106 already contains the subscriber's connection preferences and automatically determines the most preferential connection and programs that into the radio 252. Thus, a number of communication options are possible without departing from the present teachings.

PCN 102 in FIG. 3 also includes at least one sensor 253. The sensor can be any number of possible sensors. In one example mode, the sensor is a microphone which can be connected to a microprocessor, microcontroller, digital signal processor, or other digital electronics to accept the sound signal received and process that. For example, a voice recognition feature can be programmed that recognizes the subscriber's voice, the subscriber's children's voices, and/or the voices of select visitors (such as extended family members, the family babysitter, and friends to name a few). This allows for communications from the PCN 102 directly to the rest of the network based on voice recognition and/or voice prompt recognition.

Such a system can be deployed, for example, at the residence of an elderly person and allow him or her to automatically call for help by merely stating a known help request sequence. The microphone can be programmed for any number of different tasks including, but not limited to, glass break detection, tone detection (such as a dual tone multi-function or touch tone), or special programming (such as detection of an audio alarm from a subscriber's ventilator or other device). The microphone can also be used for typical voice communications, such as speakerphone communications. The number of possibilities is virtually unlimited.

In various embodiments, the sensor includes a motion detector. A motion detector can be useful for monitoring health and wellness of the elderly. It can also be used for basic security features. It is also possible to use the motion detector to sense when children arrive from school or when the cleaning service enters the property. Therefore, a rich and diverse array of one or more sensors can be used without departing from the scope of the present subject matter.

The PCN 102 of FIG. 3 also includes an annunciator 254. In various embodiments, the annunciator is a speaker. In various embodiments, the annunciator is a video screen or monitor. Other annunciators are possible without departing from the scope of the present subject matter. The annunciator 254 provides a means for distributing content in the property (of course, based on preferences established by the subscriber). For example, in the application for medical reminders, the annunciator may be a speaker which is used to play a message to the occupant to make sure that she takes her medication. In various embodiments, the annunciator can be a video screen and in a chat application, the screen can be used in conjunction with a speaker, a microphone and a video camera that allows the subscriber to have the ability to teleconference in any room having a PCN so equipped. Such teleconferencing can be conducted with others' PCNs or with any business or home having teleconference equipment. Internet teleconferencing with Skype™ or other such conferencing services/software can be easily conducted using the present system.

The whole system can be combined with other features to provide a new communication mode not possible in current technologies. For example, assume that the property is equipped with multiple PCNs that each include a motion detector, microphone, speaker, video screen and camera. Such a system could afford the subscriber to move from room to room (or even from inside to outside) and seamlessly conduct a videoconference as the person moves around the property. The motion detector could be used to change PCNs as a person moves from one location at the property to the next one. The microphone and camera can "follow" the person as she moves from one place in the property to another. Of course, some of these functions could be performed with fewer components.

It is understood that the microphone could be used to detect when the person moves from one room to another, so a motion detector is not absolutely necessary in some applications. Similarly, the video camera can be used to detect motion in a room. These sensors can also be used in conjunction to provide a seamless handoff of communications from one PCN 102 to the next. It is also possible that certain locations can be specially programmed to control the communications from one PCN 102 to the other. For example, a PCN 102 in a home can be programmed to block video signals from the property unless the communication is to a select desired other location or person. Such programming can be provided via the programming device 104, via PCN 102 (such as with a control switch, software switch, or some programmable feature), via the broker service 106, or all of these. The PCN 102 could be programmed to mute the sound from a microphone unless a communication is unmuted by the person at the property to limit sounds transmitted to another PCN 102 or location. Thus, such a system affords the subscriber a great deal of programmable options that can be used in a multitude of applications.

FIG. 3 also shows PCN 102 with an identification module 255. The actual identification can vary. For example, for fixed PCNs at a location, the identification module 255 can contain at least some of the following parameters: type of location, subscriber identity, PCN location code, PCN identity, and/or special information about the subscriber or property. For example, one variation of the possible information in the identification module is:

PCN Ser. No. 10223721
Battery Backup? Yes
Address 78421
Subscriber 203389
Medical Code 37

This example provides information in the PCN 102 that can be coded or not as desired in any deployment. For example, the information contained in the Address storage is a number "78421" that can be correlated to the proper address of the PCN 102 by the broker service 106. It is also possible to directly code the address into the PCN identification module as well. This PCN example also includes a subscriber code and medical code to afford additional privacy to the subscriber; however, they too could also be entered into the device directly. Other special features could be encoded into the identification module. For example, a workplace with hazardous materials could have a code identifying that fact and could even have information about the exact nature of the hazardous materials.

The identification information provides additional programmability options for the subscriber that can add great value to a particular application. For example, in the case of a power outage from a natural disaster the PCNs 102 deployed at a property can continue transmitting information and identification of where that information is coming from and the subscriber can continue to obtain warning information from any emergency service deploying messages to the PCN 102. That natural disaster information or warning can be delivered to any PCN 102 on the network. So for example, if the subscriber is not at the location experiencing the disaster, the broker service can send such information to the subscriber (or persons/places they designate) via any mechanism described herein (for example, PCN-to-PCN communications either directly or using the broker service, email, text messaging, fax, call, cellular phone messaging, to name a few). For example, the PCN 102 can transmit a code when a power outage occurs at a home of a person on a ventilator. That code can be programmably sent to the broker service for dissemination to emergency personnel.

The code can also be sent to a monitoring station for dispatch of emergency personnel. The code can also be sent to a loved one as a first line of response in matters of less urgency. Consequently, even if the occupant were unable to communicate via the microphone or other operation of the PCN, the PCN itself can provide information identifying the person, place or thing of interest in any sensing event. For even more communications redundancy in case of outages or temporary loss of communications, the wireless radio 252 can be programmed to make different emergency transmissions to different radio services as available and as needed. This raises the overall intelligence of the interactive communication network greatly and provides adaptive alerts to respond to any number of conditions and applications.

In various embodiments, a messaging feature for national disaster or national emergency can be conducted from connections to a single network messaging from FEME (the Federal Emergency Management Agency). For example, FEMA has an IPAWS service (Integrated Public Alert and Warning System) that can be deployed using PCNs 106 and the broker service 106. (Or any system mandated by Congress.) Indeed, the subscriber can even program how he or she would like to receive such information. This is a great advantage over typical deployment mechanisms such as an audible horn or other radio warning system.

Figure 4:
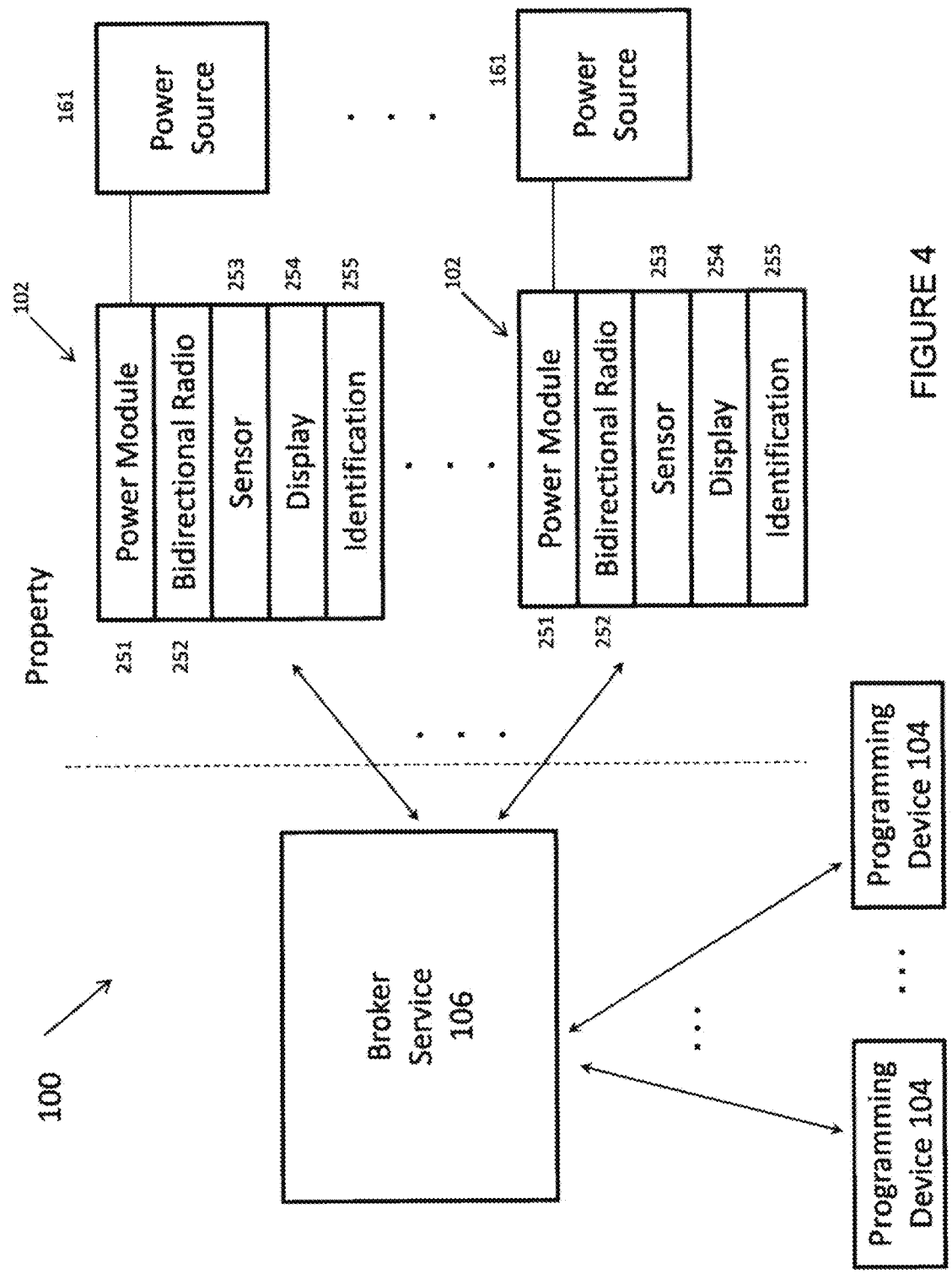

FIG. 4 shows a network similar to that of FIG. 3, but with a display as the annunciator according to various embodiments of the present subject matter. It is understood that the display 254 can be built into the PCN 102, wired to the PCN, or wirelessly in communication with one or more PCNs. Any number of video and audio devices, including, but not limited to, screens, monitors, cell phones, smart phones, laptop computers, desktop computers, televisions, iPads, and/or iPods can be in communication with the PCN for video and audio applications.

A PCN 102 functions as a user interface that can request content, receive content (live streaming, downloaded feed or high density packet, for example), interact with content, and provide content, in various embodiments. PCNs 102 communicate directly with a broker service 106 via wireless communication, in an embodiment. The user can control settings using verbal commands to a microphone or other sensor at the PCN 102, in an embodiment. In various embodiments, the user receives audible information from the broker service at a speaker of the PCN 102. Verbal commands can be used both at the PCN and/or at the broker service side.

Programming Devices

The programming devices 104 can provide instructions and parameters for the broker service 106 to control communications with the PCNs 102. The programming devices 104 can perform the programming over any number of networks, including, wired or wireless networks. The wired networks include, but are not limited to, an attached computer, a local area network, an Internet connected network, a public switched telephone network (PTSN), and combinations thereof. The wireless networks include, but are not limited to, cellular, WiFi, Bluetooth™ and combinations thereof. Combinations of wired and wireless networks can be used to perform programming. The typical application affords a subscriber the ability to program preferences in an account with the broker service 106. The programming devices 104 can also be used with certain PCNs where appropriate to control communications by the PCNs.

Some programming devices 104 include, but are not limited to cell phones, smart phones, laptop computers, desktop computers, televisions, iPads, iPods, TiVo® systems, Wii® systems, Playstation systems, iPods®, and/or iPhones® to name only some. The programming devices 104 can access a programming interface of the broker service 106 from a variety of approaches, including but not limited to: a personal contact that can assist the subscriber to programming their preferences; software running on the programming device 104, such as an applet; a browser-based access point to the subscriber's account on the broker service 106; and/or an access from a PCN 102 programmed to provide contact with the broker service 104 for the subscriber. Other types of user communication can be used by the programming devices 104 to control settings and receive notices from the system, such as e-mail, text messages, Twitter®, Facebook®, LinkedIn®, and other social networking websites, without departing from the scope of the present subject matter. In various embodiments, the programming device 104 may also be used as a display 254 or in conjunction with that display. Other contact options are possible without departing from the scope of the present subject matter.

Programming devices 104 can be used by subscribers. They can also be used by service providers who are providing services to the subscriber. For example, in an example where security monitoring is provided, a security company may supply codes to the subscriber to use in case of an emergency via the system to alert the security company to a need. For instance, suppose the security company receives an alert from a property that a break in has occurred. The security company can use its programming device 104 as an apparatus to monitor other locations of the property that were pre-approved by the subscriber in such emergencies. For example, the security service may have access to a camera fixed on the driveway to see if a vehicle is parked there or to tell when police have arrived. Thus, a number of uses by a trusted service provider of the programming device 104 can be envisioned by the present system and can be controlled by the subscriber.

Figure 5:
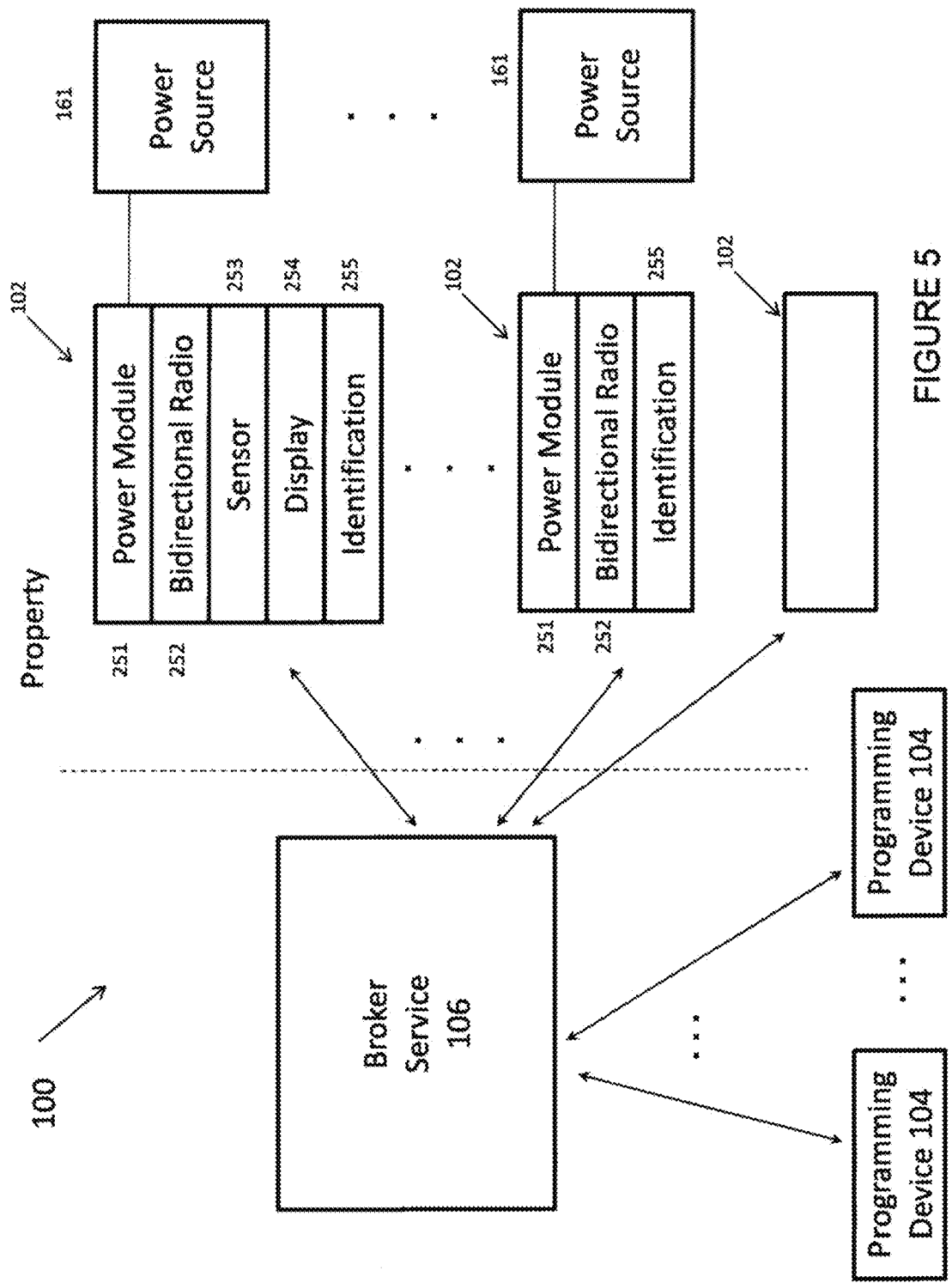

FIG. 5 shows a diversity of communications options that can occur between the broker service 106 and different types of PCNs 102. The PCNs can vary in aspects, such as sensors, communications, annunciators, and connection to external power systems. Other variations are possible, and this example is provided to show that the devices have a rich interconnectivity that can be exploited for different applications.

Figure 6:
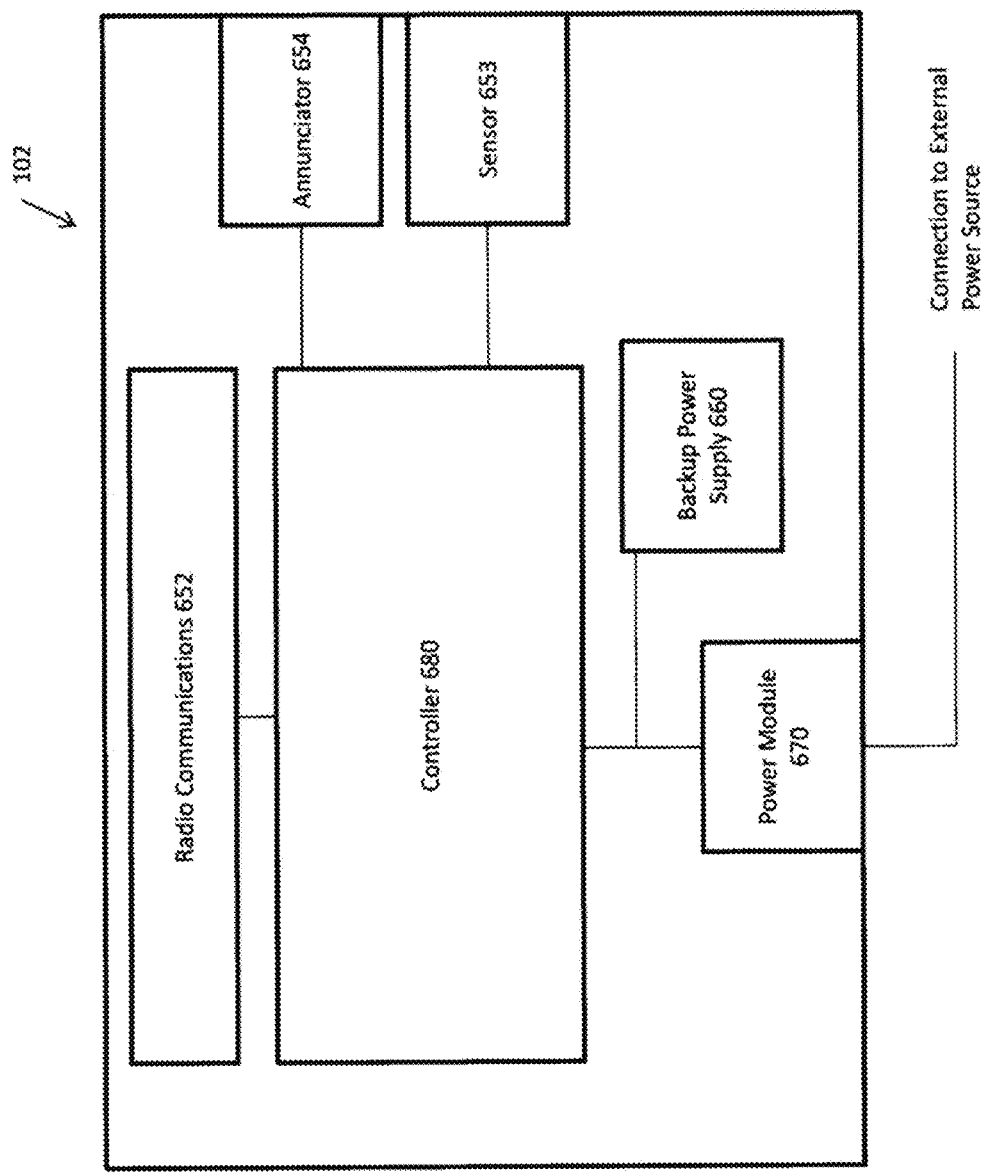
FIGS. 6 and 7 show different embodiments of some property communication nodes according to various embodiments of the present subject matter.
Figure 7:
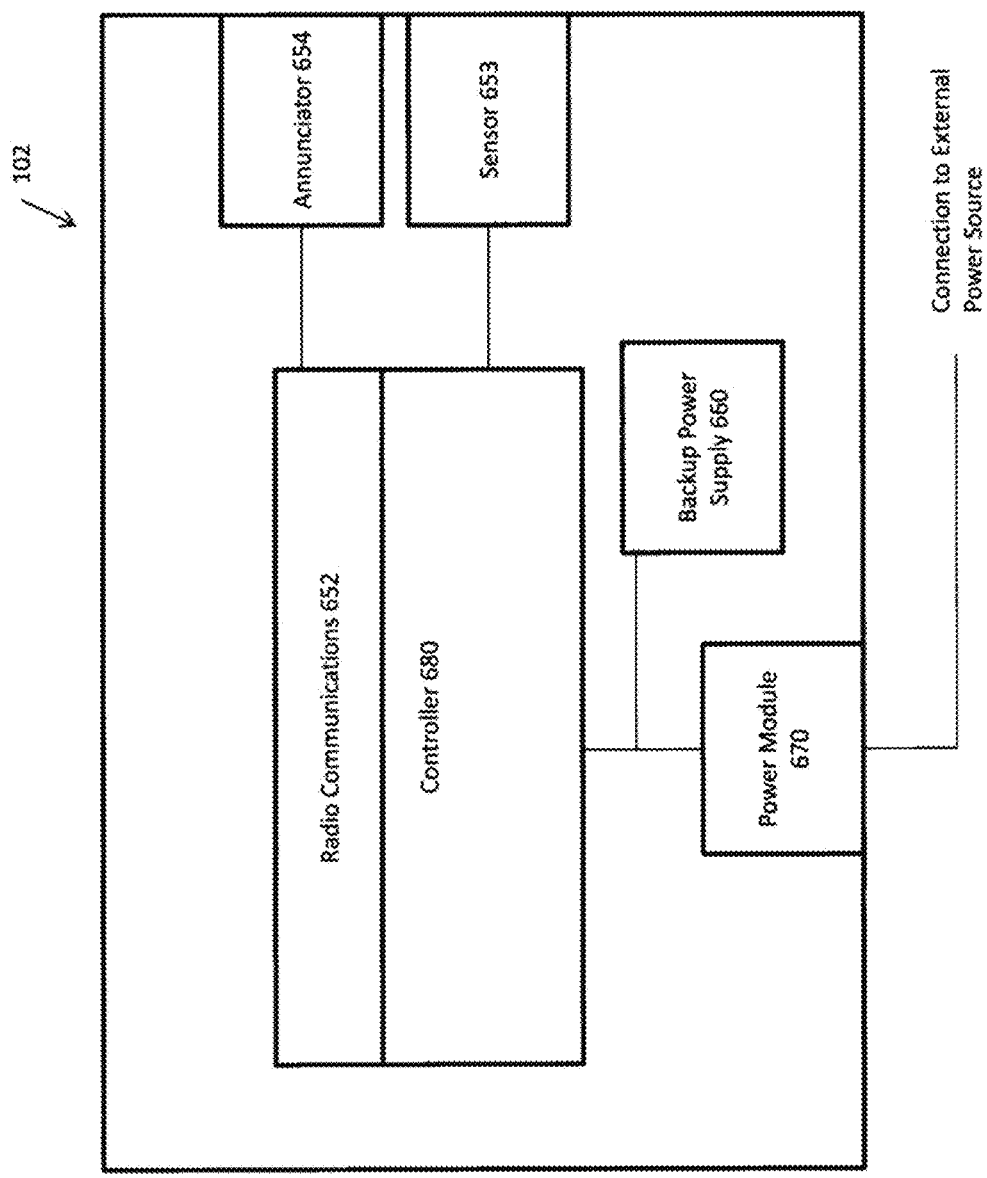

FIG. 6 is a block diagram showing different functional blocks of one type of PCN according to one embodiment of the present subject matter. This particular PCN 102 includes a controller 680, a radio device 652, a backup power supply 660, a power module 670, an annunciator 654, and a sensor 653. In various applications, the controller 680 is a microprocessor, digital signal processor, microcontroller, dedicated ASIC, combinational logic, or other type of digital device. The radio communications can be integrated into a processor in some embodiments, such as that shown in FIG. 7.

In various embodiments, the PCN 102 includes a battery backup including a flag or light to signal low power when the battery was getting low. In various embodiments, the backup provides a flag to the broker service that can be programmed to: (1) send a message to emergency aid if the power goes low (e.g., elderly person who has no power, or person on a ventilator that has lost power); or (2) send a message to a friend or family member programmed into the device or the broker service if the power goes low (e.g., elderly person who has no power, or person on a ventilator that has lost power); (3) provide selective access to inquiries by a list of authorized inquirers (e.g., daughter logs into system because she has not heard from her mother who is elderly and daughter has access to system).

Figure 11:
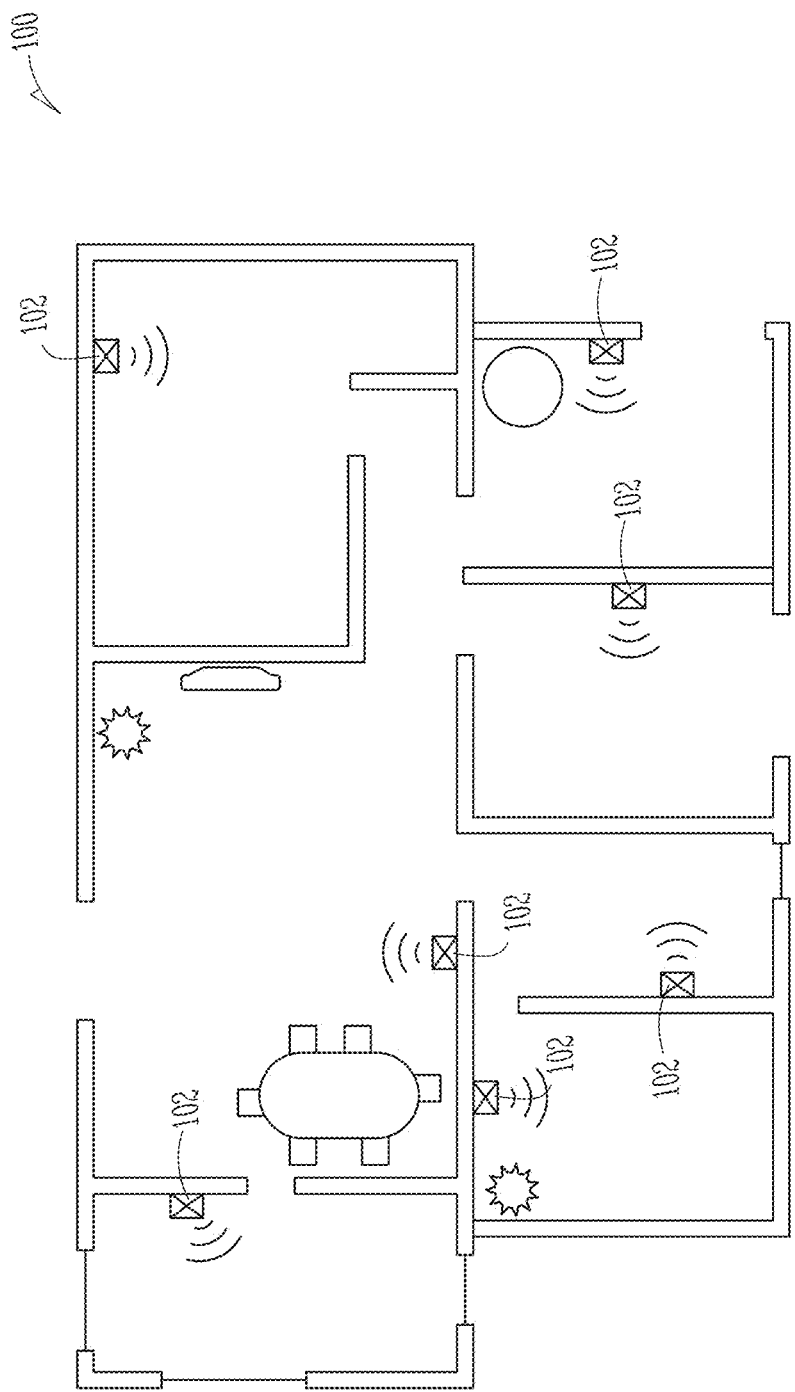
FIG. 11 shows one example of deployment of property communication nodes.

FIG. 11 shows an example of a dwelling with a plurality of PCNs 102 deployed in various locations. The depicted embodiment illustrates a residence, but the present subject matter is not limited to residences. Additional examples of properties include, but are not limited to, a business, office, factory, cabin, cottage or garage. Other types of properties can be serviced without departing from the scope of the present subject matter.

The location of PCNs is unlimited. PCNs can be integrated into a variety of home and office hardware, such as switches, outlets, appliances and other devices. For example, a PCN 102 can be integrated into a refrigerator or other kitchen appliance. PCNs can be integrated into a security camera or other such device. PCNs can be deployed outside of a structure and over grounds. PCNs 102 can be set up in warehouses and in parking lots. The applications are unlimited.

The detectors housed with the PCNs 102 track the user and can transfer communications using a handshaking protocol to provide an interactive communication system that follows the user throughout their property, according to various embodiments. In a system using a plurality of PCNs 102, the PCNs 102 can programmably contact other PCNs 102, programmably broadcast from a single PCN, multiple PCNs, or all PCNs. The PCNs can perform select addressed transmissions to each other at one property or between properties.

Figure 12:
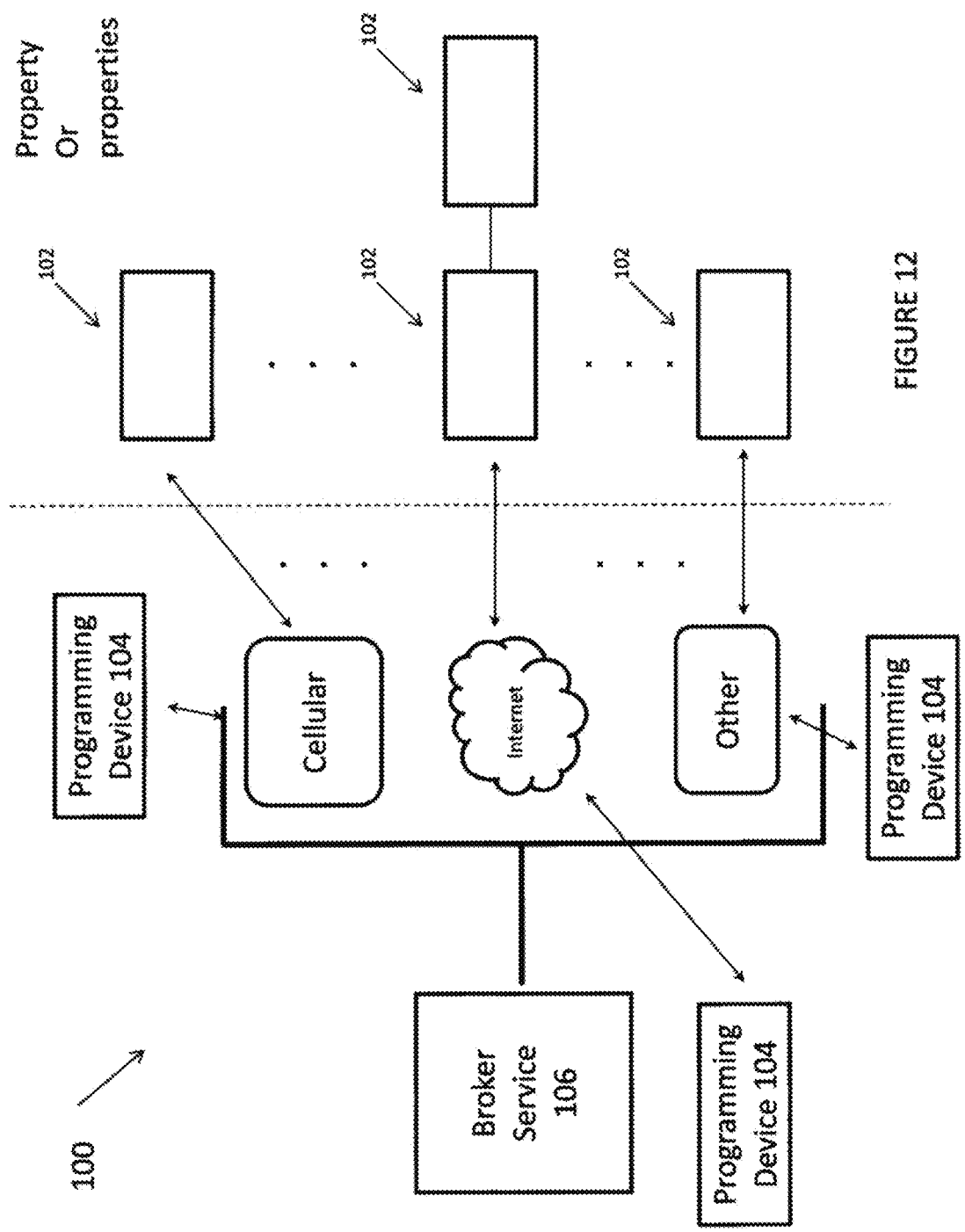
FIG. 12 shows a diversity of communication connections for the broker service, the programming devices, and the property communication nodes.

FIG. 12 shows a diversity of communication connections for the broker service, the programming devices 104, and the PCNs 102. The present system allows a subscriber to use a variety of communication networks to stay in touch at a property or properties. This allows for seamless communications from different places a person resides, from their home to their office and even their loading dock. The communication options are unlimited.

The broker service is shown as a single block in the attached drawings but it is expected that the broker service can take place over a number of computers or servers or services. For example, the broker service can use one set of addresses/communications for high priority communications such as emergency or other such services. The broker service can use more traditional and slower access options for more routine communications or low priority communications. The broker service can be deployed in a cloud computing environment or other distributed processing environment. The broker service can also interface with other service providers to provide services for its subscriber base.

The broker service 106 can include personalized or programmable brokers that provide content, such as Netflix or Google® in various applications. Other examples of a broker service 106 include interactive services provided by private security companies, health care facilities, medical professional networks, advertising and sales, and connections to family and friends. Such services are rich and include, but are not limited to, visual, audio, and data services. PCNs 102 can communicate with multiple services via the broker service to perform multiple functions, in various embodiments.

It is understood that the PCNs 102 can aid or assist other functions, such as home security systems. In one application a security system panel can also act as a PCN or interface to a PCN. Thus, the present system can supplement current more primitive systems.

In the communications stated in this application it is understood that the communications can include a repeater, gateway, switch, router, bridge or network interface, and that the examples given herein are intended to demonstrate only some of the optional configurations.

The interactive property communication system provides wireless connectivity both intra-property and inter-property, in various embodiments. In various embodiments, intra-property communication among PCNs 102 can be facilitated by modulating a signal on the electrical power network throughout the home or building as described in the '609 patent that has previously been incorporated by reference.

In various embodiments, the interactive property communication system connects one or more PCNs directly to the Internet, or to the Internet via the broker service. The geographical range of communication can be extended by linking a wall mounted PCN with a second device (repeater or intermediate node) that is coupled to a long distance communication network, such as by using a short range network such as BLUETOOTH®, HomeRF™, wireless LAN (WLAN), or other personal wireless networking technology to connect to the second device, as described in the '609 patent that has previously been incorporated by reference. As further stated in the '609 patent, the range may be extended by coupling a BLUETOOTH® transceiver with a cellular telephone network, a narrow band personal communication systems ("PCS") network, a CELLEMETRY® network, a narrow band trunk radio network or other type of wired or wireless communication network.

The interactive property communication system can be connected to the United States Government's Integrated Public Alert and Warning System (IPAWS), in one application. In one embodiment, the interactive property communication system is connected to a property security system broker to provide security for the property.

In various applications, algorithms at the broker service include voice recognition algorithms to process information from the property to provide programmable, automated alerts to response agencies for a particular detected emergency. Thus, the voice detection features can be at the property or at the broker or both.

In various embodiments, the interactive property communication system includes hardware, software and related systems configured for monitoring and reporting of operability, continuous or timely status alerts, and reporting to alert the user or users and to allow users to modify usage or have knowledge of loss of functionality. Thus, malfunction or abnormality is verbally reported to the user on the PCN 102, via a video monitor 302 on or connected to the PCN 102, transmitted to their account on the broker service, and/or sent to their personal computer and cell phone or other personal device, in various embodiments.

The present system has many uses, including but not limited to some of which are set forth herein to demonstrate the rich programmability and applications of the present interactive communications system.

Improved Messaging System

The present system affords the users of PCNs to programmably control communications with friends and family in a way not possible with present telephone systems. For example, suppose a family wants to establish communications among family members. Each member can exchange PCN contact information and can then program the broker service with communication options and preferences. For example, suppose the mother of the family wants to limit calls outside of 9 a.m.-8 p.m. every day to ones where it is an emergency. She can program an option in the broker service to filter family calls that are outside of the 9 a.m. to 8 p.m. range to only ones where the caller has indicated an urgency or emergency. The prompts and answers needed to decide what is urgent can be programmed as well.

The system can also be programmed to recognize the mother's voice and perhaps a special spoken sequence to perform calling. For example, the system can be programmed to recognize the mother saying "I need help" or "I need help quickly" and take appropriate action as programmed by the system. For example, upon receipt of such a verbal command, the system can be programmed to call her daughter, text her, and/or simply open a communications pathway so that she can speak directly to her daughter at her PCN. This provides an enormous service since the daughter could be at any location fitted with a PCN and be in almost immediate contact with her mother. For example, assume the daughter is on travel in another city. She could get a message on a PCN in her hotel room or she could have immediate voice and/or visual contact with her mother due to her emergency.

The system is good for emergencies, but is also exceptionally good for less urgent communications. For example, a feature that can be easily implemented is an "I am free to talk" feature, whereby the person sets a status using her programming device 104 or a PCN 102 so equipped to receive the status, that he or she is free to talk. (This could be done by any number of programming options, including, but not limited to a code entry, checking a box on an interactive device screen, or merely a verbal command to the programming device 104 or PCN 102.) The broker service now knows that person is free to talk and can be programmed to make a connection with other friends and family that have also programmed their systems as such. Such programming could result in a voice or voice-and-video conference almost immediately with the other family member. Indeed, the whole family could be joined by the broker service if all of them were available or willing to chat. This feature brings a whole new dynamic to interpersonal communications. It lessens the divide in location between people who want to communicate and makes personal communications a great deal easier than logging into a website or using conventional calling and/or teleconferencing abilities.

The broker service can add another dynamic to the communications. It can have a messaging feature that notes to a select list of persons that certain members of the family are online and welcome an additional party to the contact. This feature can also be deactivated to avoid intrusions to private communications. Thus, the programmability and messaging features of the present service in combination with the inter-property and intra-property communications add a dynamic that cannot be experienced with traditional services.

The broker service features can also be used for social networking to greatly expand the ability for users to connect. The "free to talk" feature can be used by members of a trusted group of friends and family on a social networking site, including, but not limited to, social networking sites such as Facebook, Twitter, MySpace, LinkedIn, to name a few. The broker service 106 can be interfaced with such social networking sites to populate contact information, to globally establish communications from the PCNs under the programmable control of the subscriber, and to establish a whole new genre of intercommunications based on personal status and settings that may be detached from the traditional browser-based communication approach of such social networking sites. The possibilities are unbounded, but some are provided to demonstrate the richness of the present system. For example, a social network could be used to establish a list of wanted or trusted friends that could arrange a multi-person chat session using the broker service, the social networking site and the PCNs of the present subject matter. For example, the present system could go from an online chat to a PCN discussion merely by an instruction sent to the broker service and/or the social networking site. As such, the present system could have a software feature that converts all on the network chat to a verbal discussion or verbal teleconference, as desired.

Another feature is that people who have met on the networking site and wish to conduct more personal discussions or teleconferencing can provide each other with a secret code or link to provide that person an ability to conference or teleconference without giving out a phone number, an address or other personal information. That provides the persons who are still new to a potential relationship the ability to meet at their own locations (a safe ground to meet electronically), and avoid giving sensitive information to the intended other person until more of a trusted relationship can be established. Such a system could be a single use approach so that any link or code used is useful only for a single communication, giving the parties the ability to more abruptly terminate contact if desired. Of course, due to the sensitive nature of such potential, a parental approval feature can be employed to limit or block entirely the ability to perform such communications. A monitor mode can also be established to allow a third party the ability to chaperone the discussions, for example. As can be seen from the present discussion, any number of telecommunications options are possible with the present system and those given herein are intended to demonstrate the system and not in a limited or exclusive sense.

The present system can also be used to define what communications occur and where in any given property. For example, a single room could be designated as a room for audio and video communications, and such communications could be limited to blocked from any other location at the property. This approach redefines a "chat room" to be a location at the property where chatting is permitted, not unlike having an electronic meeting hall where all associated with the discussion could freely discuss and teleconference or televideoconference. Again, such programming options are unlimited and this example is provided to demonstrate new aspects of the new system.

News, Entertainment, Education, and Other Content

In various embodiments, the present system can be programmed to distribute content such as news, entertainment, education, special programming, requested programming, and any other content to the subscriber. For example, the system can include programming at the broker service to indicate which news sources and/or which news topics the subscriber wishes to receive. The subscriber of such a system could be doing a mundane household chore, such as laundry, and receive a notification from the PCN that a news story on the presidential election is available and ready for listening, viewing, or both of them. In various embodiments the PCN is adapted to provide a voice prompt to the subscriber, such as "Do You Want to Hear a News Story?" or even "Do You Want News About the Election?" The subscriber can program his or her interface to play it upon an acceptance response or to automatically play certain messages due to their urgency or importance. The system can also be programmed to pause or skip a news story upon instruction of the subscriber. This provides a new way for the subscriber to receive news and such receipt can be optional or not, as the subscriber wishes to program the system. Such programming can be extended to entertainment and other such communications. For example, education or learning at home can be performed using the present system.

The broker service can be programmed to play emergency information to the subscriber that is dependent on the geographical location of the subscriber. Therefore, a person visiting an area frequently experiencing earthquakes may receive instant warning and emergency response information from the local emergency information network. In the U.S. the system may be connected to FEMA and may receive messages from IPAWS. Other emergency communications and services are possible. The subscriber can also elect to receive emergency messages from other locations, including, but not limited to, the locations of loved ones, the locations of other properties of the subscriber, to name a few. The scope of information available to the subscriber is not limited and may be programmable to only those things of interest.

This feature also allows the broker service to interface with other news and entertainment services to provide the subscriber content based on their preferences.

Advertising-to-the-Person-at-a-Property

The present system can also be used to control the content of what the subscriber hears/sees from his or her PCN for the purpose of advertising. This feature allows the subscriber the ability to eliminate unwanted advertising or to even solicit for certain types of wanted advertising (e.g., "Send offers for sales of new hybrid electric cars."). Such as system can also be connected to other websites such as eBay (e.g., "Notify for sales concerning antique china.").

The present system allows the subscriber to control only what sales items that he or she wants. The subscriber can select one or more of: retailers, product categories, brands, sale or discounted items, vendors, and a host of other potential parameters. The subscriber may access a selection menu or other interface using the PCN 102 or the programming device 104 (among other options) in communication with the broker service 106. Other possibilities are that the subscriber can sign up for a service that interfaces with the broker service to provide selections that may be selected and thereby get only desired solicitations or offers.

The subscriber can select notification parameters as well. For example, if the desired car is offered for sale they can program the system to notify them immediately. They can also review the product visually for PCNs so equipped or using their own monitor. They can then order the product or service and buy it immediately by selection directly through the PCN 102 or programming device 104.

In one embodiment, the subscriber can choose how many notifications the system can make and after a predetermined number the system can put the message of the sale item or service to be stored on the broker service 106 or the PCN 102 or sent via messaging or email, or any number of other communication options, as programmed by the buyer/subscriber.

The subscriber can also select a chat option to discuss a purchase with a vendor/retailer or other seller. The system can be programmed to transfer the buyer's personal and payment information as authorized by the buyer/subscriber to inform the seller of certain information that the seller desires.

The present system allows the subscriber to save time shopping for things and from a multiplicity of undesired offers by specifying his or her own interest and limiting communications to only the ones desired by the subscriber. This also makes the subscriber's purchase decision more efficient. It allows the subscriber/buyer to purchase, select a shipping/pickup option, discuss the purchase, and perhaps close the buy quickly. It also saves the cost and effort of vendors and retailers in generating catalogues and other sales literature that will never achieve sales.

Again, the possibilities are unlimited and the examples given herein are intended to demonstrate some of the rich programmability and advantages of the present system.

Advertising to the System

Broker Service 106 of System 100 can be used to establish business and/or other distribution relationships with a variety of entities, including, but not limited to various sellers, retailers, wholesalers, distributors, merchants, creators, Broker Service 106 itself, and various partners and/or suppliers and combinations thereof. For the purposes of this document, these individuals will be referenced as "Third Party Vendors". The Third Party Vendors can be vendors or representatives of a variety of goods and services, including, but not limited to, general and specific: products, services, commodities, brands, articles, single, multiple and/or continuous delivery of requested subscription, information or content in various forms and presentations, such as but not limited to programs, travel, lodging, entertainment, dining, news, sports and education. Such goods and services shall be referenced as with the intent and design that the person at the property (abbreviated as "PAP") will be able to receive requested and specific notification and view and select on PAP's PCN(s) 102, Programming Device(s) 104 and/or any other object of connectivity supported by the System 100 which Third Party Vendor's goods and services offerings are of interest and at, but not limited to, what desired pricing, terms and conditions if necessary. Further, the PAP selects notification specifications, and/or other parameters on how the PAP wishes to be notified by and/or through Broker Service 106 Third Party Vendors when PAP's requested and/or preferred terms and conditions, etc. are met by Broker Service 106 goods and services offerings and/or selected Third Party Vendor's goods and services offerings.

Broker Service 106 will specify to Third Party Vendors what web site and/or other forms of presentation and/or connectivity Third Party Vendors will present to Broker Service 106, allowing a PAP and/or subscriber of Broker Service 106 to utilize one or more PCNs 102, Programming Devices 104 and/or any other object of connectivity supported by the System 100 to view all of the PAP requested Third Party Vendor partners and their goods and services offerings provided using Broker Service 106. The PAP can connect to and/or through the Broker Service 106 to the Third Party Vendors' customized interface via Broker Service 106 and/or to the Third Party Vendors' website of goods and services offerings using existing or modified Third Party Vendors' buyer/consumer website(s) of offerings located at designated individual Third Party Vendors' sites.

The PAP can register on a Broker Service 106 customized master form residing on the Broker Service 106 that shall have pertinent Broker Service 106 required and PAP requested terms and conditions for all Broker Service 106 authorized and PAP-selected Third Party Vendors. Some of the required information that the PAP would enter on the Broker Service 106 master form may include, but not be limited to one or more of: name of Third Party Vendors, Third Party Vendors' goods and services catalog identity number, goods and services description, model, size, color, pricing, discount and/or range request amounts if necessary, number desired, valid date range of the PAP's interest, the PAP's notification requirements used by Third Party Vendors performing announcements of the PAP's successful match(es) on the PAP's PCN 102, Programming Devices 104 and any other object of connectivity supported by the System 100.

Parameters that can be used to specify an interest notification to PAP(s) include, but are not limited to, immediate, one or more days of a week, between certain hours Third Party Vendors' announcement(s) are permitted, daylight savings time observed—yes or no, number of announcements per day and for what duration and in what received formats such as, but not limited to, text, email, audio and/or visual presentations on the PAP's PCN 102, Programming Devices 104 and any other object of connectivity supported by the System 100. A PAP can use Broker Service 106 to control Third Party Vendors via the PAP's PCN 102, programming devices 104 and any other object of connectivity supported by the System 100 include, but are not limited to, stopping announcements, to control their duration as specified by the PAP, whether the notification should expire, to store the message to be retrieved at a later time, and a variety of other messaging controls. If the PAP desires message(s) to be stored, then a PCN 102 may display on a designated page or screen on a PAP's monitor Annunciator 254 or PCN 102 face-plate, programming devices 104 and any other object of connectivity supported by the System 100 a graphic symbol indicating a message(s) has been automatically stored on the PAP's selected 102(s), Programming Device(s) 104, the PAP's personal member account page on the Broker Service 106 and/or any other object of connectivity supported by the System 100.

In various embodiments, a PAP may log into or sign on to PAP's private or personal account on Broker Service 106 by using PAP's PCN(s) 102, Programming Device(s) 104 and/or any other object of connectivity supported by the System 100 and convey or transfer PAP's own content such as, but not limited to, text, graphics, pictures, audio, video, information, instructions, messaging, programs or any combinations thereof to PAP's personal and private account data base on Broker Service 106 for subsequent selection, transfer and/or retransfer of any of a PAP's selected and owned content resident or stored on a PAP's account data base on Broker Service 106 to a PAP's owned and managed PCN(s) 102, Programming Device(s) 104 and/or any other object of connectivity supported by the System 100. In such case, a PAP already has ownership and manages all other necessary details, but not limited to, such as selected Identification 255 number destinations, date and time ranges, frequencies and all other necessary control commands to control and manage a PAP's own transfer, retransfer, usage and consumption request(s).

Similarly, in various embodiments, a PAP may log into or sign on to PAP's private or personal account on Broker Service 106 by using PAP's PCN(s) 102, Programming Device(s) 104 and/or any other object of connectivity supported by the System 100 to request transfer of a PAP's content such as, but not limited to, text, graphics, pictures, audio, video, information, instructions, messaging, programs or any combinations thereof to another PAP's Interactive Property Communication System's personal and private account data base on Broker Service 106. Broker Service 106 shall forward initiating a PAP's request to other receiving PAPs for their approval. Upon receiving a PAP's approval, the receiving PAP shall then supply Broker Service 106 with receiving device(s) identification number(s) 255, approved dates, times, durations, etc. for intended transfer of content to receiving PAP's specific PCN(s) 102, Programming Device(s) 104 and/or any other object of connectivity supported by the System 100.

In various embodiments, a PAP's PCN(s) 102 may be, but are not required to be, housed in a single fixed unit or multiple fixed units mounted and/or attached to, among other things, a wall, bracket, electrical outlet or electrical switch, or other permanent type attachment. Similarly, in various embodiments, a PAP's PCN 102 may be, but is not required to be, housed in a single fixed unit or multiple fixed units individually mounted on a flexible and/or articulating arm and mounted and/or attached to, but not limited to, a wall, bracket, electrical outlet or electrical switch, or other permanent type attachment allowing the PAP or designee of PAP to use one or more PCN(s) 102, Programming Device(s) 104, the PAP's personal member account page accessible to the Broker Service 106 and/or any other object of connectivity supported by the System 100 to remotely control and have the PCN(s') 102 on-board motor and software to move and articulate the PCN(s') 102 arm to swing, rotate, tilt, extend or retract or any combination thereof the PCN(s) 102 for improvement of, but not limited to, viewing video and/or monitor on annunciator 254, focusing motion detector on sensor 253, ambient light sensor on sensor 253, camera on sensor 253, speaker on annunciator 254 and video monitor annunciator 254 and display 254.

PAP's PCN(s) 102 sensor 253 devices are able to (but are not limited to) perform: capturing, recording and/or for immediately or later processing, transmission and storage or other manipulation operations and/or capabilities of use of the, but not limited to, output captured or recorded by sensor 253 devices such as, but not limited to, types, levels, times, motion, light, darkness, sounds, noises, voice, pictures, images, video, and streaming video. In various embodiments PAP's PCN(s) 102 annunciator and/or display 254 may contain, but are not limited to, an audible or audio transducer, sound generator, piezo and/or speaker that is capable of generating live or stored content to play at PAP's or PAP's designees selected later dates and times sounds, voice, text to speech, messages, audible capabilities, video output that is capable of generating live, stored or memory to play or re-play presentations of, but not limited to, pictures, graphics and streaming video, programs, content from Third Party Vendors and their partners, operating functions, status and controls of PCN(s) 102 and identification 255 which may contain, but not limited to identification of: zone, area, location, ownership identification management control, associated PAP and or other occupants, where permanent or transient personal coding information and personal identity characteristics, personal, medical and valuable personal information and history, emergency contact information for designated people, operating, history and system control identification or further sub-divided of operating and/or bi-directional communications system(s) identification and location, physical street, city, state, zip code, latitude and longitude, global positioning system (GPS) data gathering and/or generating and receiving location and other information and location identity, permanent and temporary assigned user pin numbers or codes of certain PAP's and other persons approved to operate one or more PCN(s) 102, Programming Device(s) 104, the PAP's personal member account page accessible to the Broker Service 106 and/or any other object of connectivity supported by the System 100 video for immediate or later processing, transmission and storage or other manipulation operations and/or capabilities, Annunciator 254 which may contain, but is not limited to, an audible or audio transducer, sound generator, piezo and/or speaker that is capable of generating live, stored or record for play at later dates and times sounds, voice, text to speech, to name but a few audible capabilities and Identification 255 which may contain, but is not limited to, zone, area, location, ownership identification, PAP and or other occupants, where permanent or transient personal coding information and personal identity characteristics, personal, medical and valuable personal information and history, emergency contact information for designated people, operating, history and system control identification or further divided system(s) identification and location, physical street, city, state, zip code, latitude and longitude, global positioning system—GPS—generating and receiving location information and location identity, permanent and temporary assigned user pin numbers or codes of PAPs and other persons approved to operate one or more PCN(s) 102, Programming Device(s) 102, the PAP's personal member account page on the Broker Service 106 and/or any other object of connectivity supported by the System 100.

The PAP may hear an audio, voice and/or hear and see an audio, voice and visual announcement from a Third Party Vendor through and under the control of the Broker Service 106. The audio or voice/visual announcement may arrive over a speaker and/or video-monitor of a PCN 102 or, including but not limited to, a Programming Device 104, cellular phone and/or any other object of connectivity supported by the System 100.

Such PCN or other device may include a video monitor annunciator 254. However, it is understood that in some embodiments, no video monitor annunciator 254 is necessary. If the PAP is not present at the property when a Third Party Vendor's announcement is played on a PCN's 102 annunciator 254 (e.g., a speaker, video or other annunciator) or other device supported by System 100, in various embodiments, the Third Party Vendor's announcement shall repeat as determined by a PAP's announcement schedule programmed on Broker Service 106. For example, if a PAP has selected that if after Third Party Vendor's first announcement is made and the PAP does not respond (e.g., because they are not present at designated PCN 102(s) or are present at designated PCN 102(s) but wish not to respond), the Broker Service 106 may be programmed to post on a designated page accessible by the PAP's designated PCN 102 monitor 254, PCN 102 without a video monitor annunciator 254, Programming Device 104, Broker Service 106, cellular phone and/or any other object of connectivity supported by the System 100, a graphic symbol or other suitable indication informing PAP that a message has been stored on the PCN 102, Programming Device 104, Broker Service 106, cellular phone and/or any other object of connectivity supported by the System 100.

Further, the PAP while present at the designated PCN(s) 102 may simply issue a short command or manually press a designated command on the PCN(s) 102 that will immediately force the announcement to terminate and be routed to the PAP's queue at the broker service 106 and/or the PAP's PCN(s) 102, Programming Device 104, Broker Service 106, cellular phone and/or any other object of connectivity supported by the System 100 for future retrieval.

In another variation, the PAP upon hearing an announcement may immediately speak a different short verbal command into the designated the PCN(s) 102 microphone sensor 253 or manually press a designated command on the PAP's PCN 102 to cancel the announcement thus avoiding having the announcement go to the PAP's message queue on the broker service 106 and/or the PAP's PCN 102, Programming Device 104, Broker Service 106, cellular phone and/or any other object of connectivity supported by the System 100. Additionally, the PAP will have selected on its notification programming (e.g., a notification form) associated with the Broker Service 106 instructions on how many times the PAP desires incoming announcement(s) is to be played without a response by a PAP before the announcement ceases to sound on the PAP's PCN 102, Programming Device 104 and/or any other object of connectivity supported by system 100. In various embodiments, the Broker Service 106 can be programmed to direct the announcement to PAP's message queue on the Broker Service 106.

A PAP can program an associated PCN 102 (or plurality thereof) and/or an interface at Broker Service 106 to control how inbound communications are handled. In various embodiments, the PAP can control the storage of inbound communications. For example, inbound communications can be stored in a message queue on one or more PCNs 102 and/or on Broker Service 106. The PAP can also program the messaging options to provide alerts. In some embodiments, an alert can be an audio alert. In some embodiments, an alert can be a graphic symbol on a specific page or displayed on a monitor annunciator 254 (if utilized). Such graphical alerts may be by a symbol, such as a message light illuminated on the PCN 102, and by the PAP at any time going to their private customer account at Broker Service 106 to review any and all messages in queue whether from Third Party Vendors, from Broker Service 106 management and any other PAP-authorized user of the Broker Service 106.

The Broker Service 106 can be programmed by a PAP by receiving one or more voice and/or manual commands and converting them into actions performed by the Broker Service 106 and/or System 100. In various embodiments, a PAP can issue a verbal and/or or manual response to an announcement of an offering by a Third Party Vendor. In some embodiments, a voice command is received by a microphone sensor 253 of the PCN. The received voice command can be used to arrange and initiate a voice chat with a representative of a Third Party Vendor. The communication may be to answer questions from the PAP regarding the offering and may communicate information to make a purchase or decline to purchase the offering. In various embodiments, a request to enter into a live two-way conversation can be made with a Third Party Vendor sales and/or customer service agent. In such cases if a monitor annunciator 254 is used, additional information can be viewed, including, but not limited to, product cut sheets, photos, actual item images, video clips on or related to the PAP's desired goods and services, conferencing with other Third Party Vendors associates regarding additional goods and services information such as, but not limited to, transferring information about which store the PAP may purchase and/or pick-up Third Party Vendor's goods and services, and to discuss shipping options. Additionally a camera sensor 253 may be utilized, to allow the PAP to verbally or manually activate a particular PCN (or a plurality of PCNs) 102 camera Sensor 253 and enter into a live full two-way audio-visual session where the PAP can utilize and share visual cues such as, but not limited to, facial, hand and body movements that can more fully convey PAP's thoughts and emotions regarding the contemplated purchase of Third Party Vendor's goods and services. Additionally, in the live two-way full audio-visual session the PAP can more completely communicate such as, but not limited to, demonstrate, illustrate, show, draw diagrams, show actual samples, pictures, etc. to the Third Party Vendors representatives thus more fully articulate the PAP's interest to the Third Party Vendors regarding the pending purchase of the Third Party Vendors goods and services. The PAP can at any time retract or turn off connectivity features such as monitor annunciator 254 and camera sensor 253 by speaking a command or manually selecting the associated controls on the designated PCN(s) 102, which will turn off the desired function at the designated PCN(s) 102.

Should the PAP desire to purchase the Third Party Vendor's goods or services offering, the PAP may speak or manually enter into a PCN's 102 microphone Sensor 253 or monitor Sensor 253 and state to the Third Party Vendor the PAP's code(s), if required by a Third Party Vendor and selected by PAP and registered on PAP's private customer account at Broker Service 106. In this circumstance, Third Party Vendors will pull financial payment data previously entered by PAP into PAP's private customer account on Broker Service 106 for a specific Third Party Vendor. The PAP additionally can make arrangements for payment while in a chat session with a Third Party Vendor, or use various other forms of payment on file in a PAP's private customer account on Broker Service 106.

In various embodiments, System 100 may perform bi-directional interactive audio, visual, audio-visual, data, signaling and content communication, using Broker Service 106 and various premises based devices (PCNs 102) (together referred to as "Communication Content" delivery system). Today many people can look up a person's telephone number, view it on caller ID, and/or find it in business' contact lists, etc. Also a person's telephone privacy or quiet time is disrupted by calls being received that are misdialed at all hours of the day and night, dialed by telemarketers regardless if a person has registered on the Federal Do Not Call List, calls from unknown people that are received with no caller-ID information, legitimate calls received at other undesirable times, etc., simply because all that a caller needs to do is dial direct to practically any seven or ten digit number combination. Further, in many social, professional and business settings people find it necessary to give out their traditional telephone numbers, but do so half-heartedly and with trepidation knowing that the given telephone number(s) will be in the hands of many people forever, thus should the giving party not want to communicate with the other party again, the giving party must depend only upon the good-will of the receiving persons never to call or use the received number again. Additionally, some people desiring to "mask" their telephone identity sometimes use other people's or entity's telephone(s), thus shifting the exposure to risk and/or annoyance to other unassuming people and entities. People are highly communicative and find it desirable to frequently use their telephone, but have additional common concerns: the caller generally believes it's the right time to call, but seldom knows for sure that it is without actually calling and risking bothering the called party with untimely conversation or bothering the called party with only the noise of the telephone ringing, people often call numbers that are found to be obsolete, cancelled or changed, thus again bothering the called party, to name but a few concerns and annoyances of using traditional telephone architecture and common practices. In various embodiments, Broker Service 106 of System 100 may be used to establish bi-directional interactive audio, visual, audio-visual, data, signaling and content communication, together referred to as "Communication Content" relationships with a variety of entities such as, but not limited to: families, close, casual or new friends and selected individuals, professional services, Third Party Vendors and their various partners and/or suppliers, information and other content providers, emergency announcement services and combinations thereof using selected PCN 102, Programming Device 104 and/or any other object of connectivity supported by the System 100, and for the purposes of this document, will be referenced as Interactive Property Communication System ("IP Communication System").

An initial user of the IP Communication System of Broker Service 106 of System 100 may register their account on Broker System 106 of System 100. For the purpose of this document, such users shall each be called a Person at the Property ("PAP"). After completing initial registration on Broker Service 106, Administrator may, utilizing selected PCN(s) 102, Programming Device(s) 104, and/or any other object of connectivity supported by the System 100, register a particular PAP and each other user (referenced as a "Guest" herein) who will be using a PAP's IP Communication System by listing in some situations (but not limited to or made mandatory in all situations) the name of each Guest. The System will then assign and include in the listing a general and/or unique Guest primary code ("Guest Primary Code"); a secondary Guest code ("Guest Secondary Code"). In various embodiments, a Guest voice recording is personally made by each Guest and stored on Broker Service 106 of System 100 for subsequent Guest voice recognition and validation ("Guest Voice Validation") applications. In various embodiments this allows for recognition and/or validation of a Guest via Broker Service 106 for subsequent transmission of Guest's Communication Content to IP Communication System's selected PCN(s) 102, Programming Device(s) 104, and/or any other object or device of connectivity supported by the System 100. In various embodiments programmable exceptions can be made if the Broker Service 106 cannot properly recognize or validate the Guest's voice. Such cases might include, but are not limited to, illness, poor reception, or other changes that make the Guest's contact more important than a necessary voice recognition and/or validation.

In various embodiments, the listing may include Guest contact information, but not limited to, call back telephone numbers and other IP Communication System Guest Addresses. In various embodiments, the System 100 may record a Guest assignment by a PAP to optional groups and/or classifications such as, but not limited to, family, friend, social or new casual acquaintance, (named) Third Party Vendor, (named) medical clinic, (named) personal doctor, (named) auto insurance company, federal, state or local authorities for weather, catastrophe, emergency alert or other general alert or important information.

In various embodiments, the Guest name and other announcement information that is selected by a PAP may be transmitted by and through Broker Service 106 to the IP Communication System's selected PCN(s) 102 Identification 255 locations, Programming Device(s) 104, and/or any other object of connectivity supported by the System 100. In various embodiments, the system will support individual Guest multiple answering priority levels with paired multiple Guest Addresses allowing processing of various priority delivery levels of Communication Content: by way of example, a (named) Health Clinic calling with life threatening communication requiring immediate PAP contact is assigned by the PAP a high priority level with a unique Guest Addresses, or a (named) Health Clinic calling with general or no urgent communication is assigned by the PAP a lower priority level (and may be programmed with one or more different Guest Addresses).

In various embodiments, a PAP may assign a (named) Third Party Vendor to a high priority by assigning one or more high priority Guest Addresses. Some applications include, but are not limited to, assignment of higher priority addresses to immediately receive a specific and valuable short-lived offer, such as a last minute seat on an airline at a price and/or terms previously requested by the PAP. In various embodiments, the PAP may make a selection of IP Communication System transmission technologies and methods, such as, but not limited to, ranging from single communication technology up to redundant, cascading, availability and/or backup communication technologies and methods along with selection of associated costs; programming of PAP's IP Communication System operations and functions, including but not limited to, hourly, days, calendar, holiday ranges; number of repeated announcements with selected time intervals between announcements for specified Guests calling in and PAP's selection of automatic or manually selected message storage for specific Guests' calls carrying Communication Content.

When an announcement limit is reached for a specific Guest calling, the Guest announcements may be, but are not limited to, automatic routing to memory on selected PAP's PCNs 102, Programming Devices 104, the PAP's personal member account page on the Broker Service 106 and/or any other object of connectivity supported by the System 100 for a PAP's future retrieval and further processing, activation of specified received call(s) message stored alerts such as, but not limited to, audio, visual, text and graphic symbol indicating a message(s) has been automatically stored on the selected PCNs 102, Programming Devices 104, the PAP's personal member account page on the Broker Service 106 and/or any other object of connectivity supported by the System 100 for retrieval and further processing.

Additionally, upon receiving any PAP Guest Communication Content call on a PAP's PCN 102, Programming Device 104, and/or any other object of connectivity supported by the System 100, a PAP may at any time speak or physically enter a command into PAP's selected PCN(s)

102, Programming Device(s) 104, and/or any other object of connectivity supported by the System 100 to immediately force the received call into stored memory on PAP's selected PCN(s) 102, Programming Device(s) 104, a PAP's personal member account page on the Broker Service 106 and/or any other object of connectivity supported by the System 100. In various embodiments, the System 100 may activate specified received Communication Content message call(s) stored by announcing and/or displaying alerts such as, but not limited to, audio, visual, text and graphic symbols indicating a message(s) that may have been automatically stored on the PAP's selected PCN(s) 102, Programming Device(s) 104, a PAP's personal member account page accessible to the Broker Service 106 and/or any other object of connectivity supported by the System 100 for retrieval and further processing.

On a PAP's initial setup of the PAP's IP Communication System personal subscriber account page, a PAP may be assigned by the Broker Service 106, including but not limited to, one or more traditional telephone numbers, IP addresses and any other type, category or technology required addresses ("PAP Addresses") to allow a PAP to distribute to the PAP's Guests groups and/or classifications one or more of, family, friend, social or new casual acquaintance, (named) Third Party Vendor, (named) medical clinic, PAP's (named) personal doctor, family (named) auto insurance company and Federal, State or local authorities for weather, catastrophe, emergency alert or other general alert or important information. In various embodiments, this allows the PAP's Guests to program and/or utilize Broker Service 106 and PAP assigned PAP Addresses to make any type Communication Content calls to a PAP specifically ranging from PAP individually assigned high to low communication priority utilizing specific and appropriate PAP Addresses to PAP's Broker Service 106 account for subsequent re-transmission authorized by Broker Service 106 and PAP to PAP's selected PCN(s) 102 general or specific Identification 255 location(s), Programming Device(s) 104, and/or any other object of connectivity supported by the System 100.

Upon a PAP hearing and/or seeing an incoming communication announcement from a registered PAP Guest on the PAP's selected PCN(s) 102 general or specific Identification 255 location(s), Programming Device(s) 104, and/or any other object of connectivity supported by the System 100, PAP can use, including but not limited to, the following answering options: answer the PAP Guests communication by verbally stating a PAP Command, PAP automatically or manually selecting Guest Voice Validation or physically touching or entering a PAP Guest Code into the PAP's selected PAP's PCN(s) 102, Programming Device(s) 104, and/or any other object of connectivity supported by the System 100, a PAP Command, to perform, including but not limited to, answering, not answering or forwarding the PAP Guests' Communication Content to memory on a selected PAP's PCN(s) 102, Programming Device(s) 104, the PAP's personal member account page on the Broker Service 106 and/or any other object of connectivity supported by the System 100 for PAP's future retrieval and further processing, have the PAP's Guest's Communication Content follow the PAP on the PCN(s) 102 where the PAP travels in the property or elsewhere where the PAP's or PCN(s) 102 belonging to other PAP's control are located, shutting off automatically or manually the PAP 102's that are geographically behind and/or no longer needed, have additional, specific or all PAP 102's activate, PAP Command that the PAP 102's being utilized activate and/or deactivate any associated Sensor 253 such as, but not limited to, microphone, motion detector, camera, or other annunciators or sensors as may be deployed at a location.

The present system provides a highly programmable access mechanism that can be specially programmed for specific users and specific communication control needs. In one example, a PAP has the option to program the System 100 to assign to a specific person in a specific family group the certain required and optional registration information of the PAP Guest. This feature allows a PAP the ability to "delegate" communication and content control to a proxy, such as a trusted friend, relative, or spouse. Other communication proxies can be programmed into the system to tailor the access for any given situation and the examples given herein are for demonstrating the system and are not intended to be exclusive, exhaustive or limiting of the present system 100.

A PAP may geographically transit to other areas served by PCNs 102. The system 100 allows a PAP using a PCN 102, programming device 104, Broker Service 106, cellular phone and/or any other object of connectivity supported by the System 100 or other device adapted to communicate with the Broker Service 106 to log onto the PAP's respective private customer account and enter different PCN identification number(s) of identification 255 to perform communications with the Broker Service 106 from a variety of different geographic locations. The selection of PCNs 102 can be programmed to be, but not limited to, on and/or off at a particular date and time, programmed to be left in an on or off status generally, or programmed to automatically turn off or on upon a specific date and time. Any number of exceptions can be made so that specified PCNs 102 under the control of a PAP can be selected/programmed to be "on" for emergency messaging or emergency bi-directional communications as specifically selected by the PAP having primary control over an inventory of PCN 102 Identification numbers Identification 255. When communication to a selected PCN 102 is desired, the Broker Service 106 can be programmed to allow and direct that in and/or out communication from and to a specific PCN 102 based upon the PAP's communication specifications and directions as specified by the PAP on its PAP private customer account on Broker Service 106. In certain circumstances and as authorized by the PAP, certain limited up to full PAP customer rights can be assigned to other person's or parties to aid primary PAP in executing primary PAP's desires. One example of this may be a primary PAP who is for various reasons not available to receive or make communications and/or purchasing or other decisions, and the primary PAP desires and authorizes a secondary, or more, person or party to assume some up to full control of the primary PAP's control, operation and administration of the primary PAP's customer account on Broker Service 106. The primary PAP may, but not be limited to, assign certain date and time ranges to the newly created and authorized secondary person(s) and/or party(s) that allow the newly created and authorized person(s) or party(s) to automatically have cancelled their rights assigned by the primary PAP, or any combination of authorization programming to another person(s) or party(s).

When a PAP desires to geographically transit to other areas served by PCN(s) 102 that are not under the control of the PAP, the PAP using a PCN 102, Programming Device 104 and/or any other object of connectivity supported by system 100 or other device logs on to the PAP's respective private customer account at Broker Service 106 and makes request to add additional PCN 102 Identification number(s)

Identification 255 belonging to and under the control of a different PAP. Examples would be, not limited to, the travel industry. If a primary PAP purchased an airline ticket to travel, either through the primary PAP's PCN 102, Programming Device 104 and/or any other object of connectivity supported by system 100 directly connecting to the broker service 106's registered and PAP's requested and accepted Third Party Vendor airline, through a travel bureau, directly from the airline or purchased through some other source provider of the purchased ticket, the primary PAP traveling could register their future non-controlled or owned PCN 102 connectivity session by requesting through their personal account on the Broker Service 106 that all or some of their inbound messages be repeated and/or re-routed by the Broker Service 106 from the PAP's controlled PCN(s) 102 identification number(s) Identification 255, through the Broker Service 106 to the airlines communication link to the PAP's specific aircraft seat's installed PCN 102 or to the primary PAP's Programming Device 104 and/or any other object of connectivity supported by system 100. Because the Third Party Vendor airline knows of the primary PAP's flight reservation schedule and seat assignment in real-time, the Third Party Vendor airline can allow Broker Service 106 to follow primary PAP's seat assignment throughout their travel while on-board their aircraft. Additionally, to accommodate any changes in seats, the primary PAP would while at their actual seat sign into the Third Party Vendor's PCN 102 to log on to Broker Service 106 of System 100 for bi-directional service, thus preventing miss-directed calls and PCN 102 usage by a non-authorized PAP or other non-authorized person. Additionally, when a PAP temporarily or permanently leaves their actual seat they may log off temporarily or permanently preventing usage by non-authorized PAPs or other persons. When the primary PAP's flight(s) is concluded, the primary PAP requested message repeating and/or forwarding order requested at Broker Service 106 is terminated by either the subject airline owning and controlling the assigned PCN's 102 identification 255 and/or the primary PAP. Alternatively, but not limiting, the Broker Service 106 can forward the primary PAP's requested inbound messages from the Broker Service 106 directly to the PAP's Programming Device 104.

Additionally, similar to the primary PAP's airline ticket purchase options, but not limited by, available to PAP to purchase an airline ticket specified herein, the PAP makes a reservation with a hotel or lodging facility ("Hotel") that is a Third Party Vendor of Broker Service 106 or an individual subscriber of Broker Service 106 of System 100 with their own PCN 102, Programming Devices 104 and/or any other object of connectivity supported by system 100, and has installed PCN 102's in certain or all rooms and selected or all other areas of the Hotel's property. Upon check-in at the Hotel providing PCN 102 service and use by guests and others, the Hotel approves and activates the guest PAP's forwarding request placed earlier on the Broker Service 106 by a guest PAP to the Hotel's owned and controlled PCN's 102 identification number(s) of identification 255 located in the Hotel's guest room assigned to guest PAP. Additionally, the Hotel can approve additional other Hotel-owned PCN 102 identification numbers 255 where the guest PAP may travel within the Hotel-owned area, thus allowing notification following and requested and allowed information to a guest PAP with the use of Hotel assigned code or pin allowing guest PAP access Hotel's PCN 102(s). When a guest PAP checks-out of subject Hotel, the guest PAP's prior requested message repeating and/or forwarding order to subject the Hotel's owned and controlled PCN 102(s) is either cancelled by subject Hotel and/or guest PAP at any time by either guest PAP or Hotel terminating message following request on guest PAP and/or Hotel's individual personal and private account at the Broker Service 106.

Alternatively, among other things, the Broker Service 106 can then repeat and/or forward the primary PAP's requested inbound messages from the Broker Service 106 directly to the PAP's programming device 104 and/or any other object of connectivity supported by System 100 with no break in notification service or connectivity from the Broker Service 106 to a primary PAP. Thus, it can readily be seen and understood that wherever a PAP travels, a PAP can request through their personal and private account on the Broker Service 106 both repeat and forwarding connectivity to any other non-owned PCN(s) 102, Programming Device(s) 104 and/or any object of connectivity supported by the system 100 and its identification number(s) 255 allowing Third Party Vendor(s) and their partner(s) notification to PAP of requested goods and/or services offerings matching PAP's pricing, terms and conditions, if necessary and at PAP specified time, frequency, duration and other PAP notification and recording settings to any and all non-owned or managed PCN 102's, Programming Devices 104 and/or any object of connectivity supported by the system 100.

The PAP may use owned or managed PCN(s) 102, Programming Device(s) 104 and/or any other objects of connectivity supported by System 100 to connect to Broker Service 106 to manage a PAP's personal and private account to, but not limited by, query, view, add, change, delete and/or request addition of authorized Third Party Vendor's goods and services of Broker Service 106 and edit and/or manage all PAP personal and private account information such as, but not limited to, private codes, financial information, announcement and notification settings, contact information, billing and payment account numbers, codes and authorizations, additional authorized person's or entities access to manage various authority levels of primary PAP account and specific duties and authorization codes, etc.

Similarly, it is understood that in some embodiments, a requesting PAP may use owned and managed PCN(s) 102, Programming Device(s) 104 and/or any other object(s) of connectivity supported by System 100 to request through Broker Service 106 use of and receive, but not limited to, approval, specific pin-codes, dates and times of use, etc. to non-owned and/or non-managed specific PCN 102, Programming Device 104 and/or any other object of connectivity supported by system 100 to connect to Broker Service 106 to manage requesting PAP's personal and private account to, but not limited to, query, view, add, change, delete and/or request addition of authorized Third Party Vendor's goods and services of Broker Service 106 and edit and/or manage all PAP account information such as, but not limited to, private codes, financial information, announcement and notification settings, contact information, billing and payment account numbers, codes and authorizations, additional authorized person's or entities access to manage various authority levels of a primary PAP account and specific duties and authorization codes, etc.

Medical Wellness

The present system brings opportunities for wellness checks and "virtual visits" to the sick or aged. These functions can be supported by the present system and in combination with other medical services in conjunction with the broker service to provide the wellness checking, virtual visits, medication reminders, medication refill subscriptions or any other host of medication related services. For example, the subscriber could allow a health care provider access to certain information via the broker service to perform wellness checks or to review medication history, activity data, among a host of other things.

Day to day health is supported by this interactive, bidirectional system. And the services can be supported by the subscriber's activities, by the medical care provider, by a scheduled approach, and/or by all of them.

The PCN 102 can also be used in case of a trip and fall incident. For example, if a person is near a PCN 102 and shouts out "Help" or "I need help," the PCN 102 can be programmed to contact a variety of services, including, the broker server 106, 911 emergency services, loved ones or others trusted to lend assistance. The communications can take form in any programmed operation and a live communication to such destinations can also take place, as programmed by the system.

The possible uses are unlimited and the examples given herein are intended to demonstrate some of the rich programmability and advantages of the present system.

Security

The present PCN system allows for a new type of security for subscribers. It is a security system that 'follows' the subscriber from location to location on a property fitted with PCNs, and from property to property for multiple locations fitted with PCNs. That affords the subscriber a security system with a monitoring service that travels as the do and as they program it to operate. The system also provides the ability for a number of PCNs to conduct independent direct communications with the broker service to provide redundant lines of communication for safety and assistance. The possible uses are unlimited and the examples given herein are intended to demonstrate some of the rich programmability and advantages of the present system.

Emergency Communication Network

The system can be connected to the FEMA IPAWS network established and mandated by Congress. Emergency information can be spread using PCNs in addition to or in lieu of traditional distribution mechanisms (e.g., siren). Such emergency communications can survive a natural disaster for a certain time due to embodiments featuring battery backup and a plurality of direct communications options as set forth herein. The possible uses are unlimited and the examples given herein are intended to demonstrate some of the rich programmability and advantages of the present system.

Electrical Power Switch Control with Usage Data Display

As indicated above, in some example implementations, one or more PCNs 102 can include electrical switches, such as shown in U.S. Pat. No. 6,894,609 (the 609 patent), and/or electrical outlets. However, in contrast to the electrical switches shown in the 609 patent, the PCNs 102 of this disclosure (e.g., including electrical switch and/or electrical outlet functionality) can include a user interface, e.g., a touchscreen display, configured to display current and/or historical electrical power usage information of one or more electrical loads connected to various PCNs 102 (e.g., including electrical switch or outlet functionalities) to a user, as described in detail below. The user interface, which can include a display and a user input device, such as a touchscreen display, can form a portion of a faceplate of an electrical switch, e.g., wall switch, or an outlet, e.g., wall outlet. Displaying the electrical power usage information at the switch or outlet to a user can, for example, cause the user to modify his or her behavior, e.g., dim light, turn off an appliance, etc., and thus conserve energy.

Figure 13:
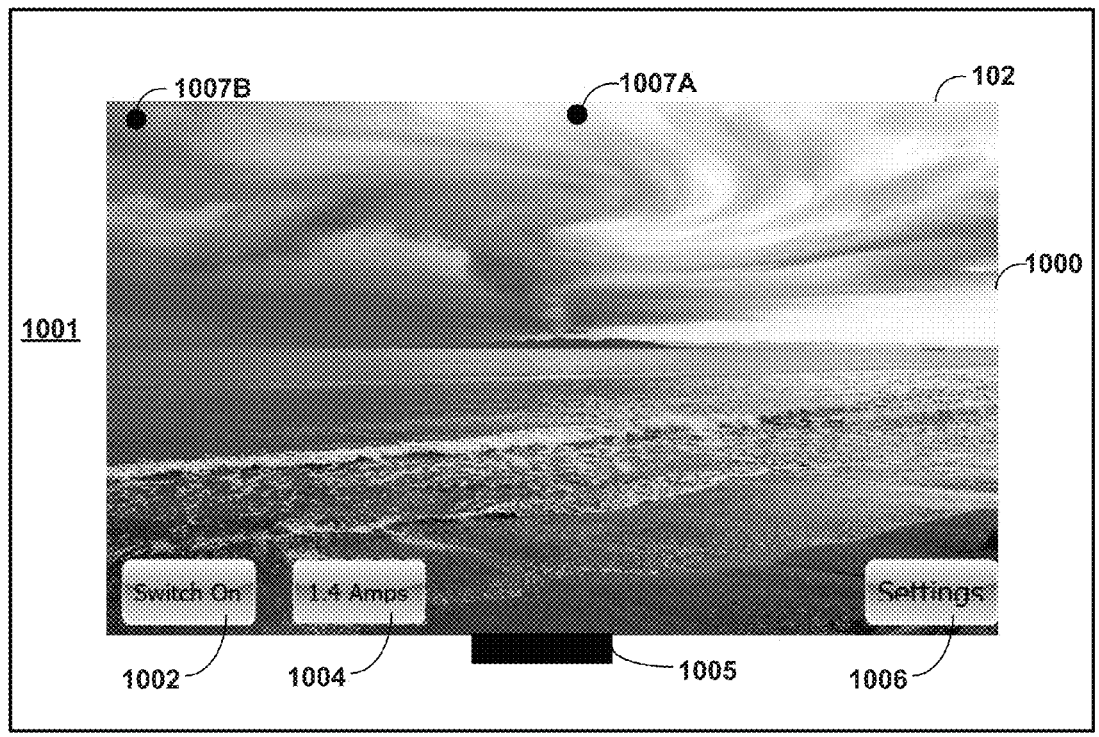
FIG. 13 is an example of a property communication node including electrical switch or outlet functionality and configured to implement various techniques of this disclosure.

FIG. 13 is an example of a PCN 102 having a user interface 1000, e.g., a touchscreen display, that is configured to implement various techniques of this disclosure. The user interface 1000 is also referred to in this disclosure as display 1000. In some example configurations, the user interface 1000 of the PCN 102 can be positioned within a frame 1001. The frame 1001 can provide a border, e.g., less than 0.5 inches or greater than 0.5 inches, adjacent to one or more sides of the user interface 1000. The frame 1001 can incorporate light emitting diode (LED), liquid crystal display (LCD), and/or other electronic visual display material or technology that can be user-configurable to display various designs, images, patterns, colors, and/or alerts. In some example implementations, input from one or more sensors can cause the frame 1001 to display or change various designs, images, patterns, colors, and/or alerts. For example, a user can program the PCN 102 such that the frame 1001 can display a desirable pattern or design that compliments the wall color in a particular room. As described in more detail below, in some example implementations, the frame 1001 can change color to alert a user upon the occurrence of an event, e.g., high power usage. In some example implementations, the frame 1001 can display or change various designs, images, patterns, colors, and/or alerts based on information, e.g., sensor input, and/or events in the same building or a different building.

In FIGS. 13-24, the PCN 102, which can include any of the functionality described above with respect to the PCNs 102, can include electrical switch and/or electrical outlet functionality and, as such, the terms switch 102, outlet 102 and PCN 102 are used interchangeably with respect to FIGS. 13-24. The example display 1000 in FIG. 13 depicts a background image, e.g., user configurable image, and three icons, namely a switch state icon 1002, a current draw icon 1004, and a settings icon 1006. The switch state icon 1002 can include text to show the ON/OFF state of the switch, e.g., light switch, shown as "Switch On" in FIG. 13, and can receive user input, e.g., a finger tap, to toggle the switch between ON/OFF states.

In addition to the switch state icon 1002, the switch 102 of FIG. 13 can include a manual switch 1005, e.g., rocker switch, push button switch, etc., that can allow a user to control the switch 102 manually and, for example, bypass any verbal commands, touch screen, operate a connector load should the switch 102 become inoperable. In some examples, the manual switch 1005 can include a rheostat or dimmer functionality.

The current draw icon 1004 can include text to show the amount of current being drawn by the switch 102, e.g., light switch, shown as "1.4 Amps" in FIG. 13. In other example implementations, the current draw icon 1004 can additionally or alternatively display other electrical power usage information, such as kilowatts. In some examples, the current draw icon 1004 can receive user input, e.g., a finger tap, to toggle between the various electrical power usage information. In some examples, the current draw icon 1004 can automatically scroll through the various electrical power usage information for display to a user. In other examples, the current draw icon 1004 can provide general status or other information to a user, whether or not electrical power related.

The settings icon 1006 can receive user input, e.g., a finger tap, to allow a user to select a "power use" display. Various example "power use" displays are described below with respect to FIGS. 14-22 and FIGS. 30-31. In addition, in some examples, the settings icon 1006 can receive user input, e.g., a finger tap, to allow a user to select an "alert" icon (not depicted). Selecting the "alert" icon can take a user directly to a screen that can show the user the cause of the alert, e.g., a high power usage alert. For example, in the event that the alert, e.g., an audible alert, a change of color of the frame 1001, and/or some other visual alert, is caused by a high power usage, the user can select the alert icon and be taken directly to a power usage screen, e.g., power use information screen 1008 of FIG. 14 described below.

Like the PCNs 102 described above, the PCNs 102 of FIGS. 13-32 that can include electrical switch and outlet functionality that can communicate remotely with a programming device 104. The PCNs 102 of FIGS. 13-32 can communicate with one another directly using wired, e.g., the electrical wiring of the house or other building, or wireless communication techniques. The PCNs 102 of FIGS. 13-32 can communicate with one another indirectly, e.g., when located in different houses or other buildings, using the broker service 106, for example.

In some example implementations, the PCN 102 of FIG. 13 can include a sensor 1007A, e.g., infrared, ultrasonic, camera configured to take pictures and/or capture video, and the like, configured to detect motion. Example motion detector settings are described below with respect to FIGS. 25-29.

In addition, in some example implementations, the sensor 1007A can be a camera and/or scanner configured to capture and/or scan images, and/or configured with security monitoring functionality, environmental monitoring functionality, and/or health monitoring functionality. The sensor 1007A can capture or scan images, e.g., of a product barcode or medicine bottle label, and a controller, e.g., controller 1104 of FIG. 23 or 24, can execute instructions to, for example, look up a product associated with the product and/or perform text recognition on the captured image. The controller can then store and/or process the information from the captured and/or scanned images. In one specific example scenario, the PCN 102 in the same building or a different building can store information related to the products or medicines, e.g., the expiration date and/or dosage of the medicine, and, for example, generate and transmit reminders to the user to take the medicine at appropriate times, reorder medicine or products, and the like, and, in some examples, store an inventory.

In some example implementations, the sensor 1007A can additionally or alternatively include environmental condition sensing functionality. For example, the sensor 1007A can include functionality to sense, monitor, and/or receive information related to one or more of carbon monoxide, toxins, temperature, humidity, allergen(s), air quality, altitude, atmospheric pressure, and the like, which are listed as non-limiting examples. As such, the sensor 1007A can include one or more sensors.

In an example implementation, the sensor 1007A can additionally or alternatively be a device configured to sense, monitor, and/or receive information related to a user's condition of health and/or security. In some examples, the sensor 1007A can be integral with the PCN 102. In other examples, the sensor 1007A can be an external sensor, e.g., a third party sensor, that can be connected to the PCN 102, e.g., via a communication port or wirelessly connected. For example, the sensor 1007A can be a wearable device, e.g., heart rate monitor, glucose monitor, blood pressure, body temperature, oxygen saturation, fitness or activity (or lack of activity) tracker, and/or any other type of health monitor. The sensor 1007A can include circuitry configured to transmit information, e.g., using a wireless protocol, to the PCN 102 for display and/or monitoring, for example. As an example, if the PCN 102 detects that a user's heart rate, glucose, and the like exceeds or is below a threshold, the PCN 102 can alert the user or someone designated by the user to which alerts should be sent. An example sensor selection screen is shown and described below with respect to FIG. 32. In some examples, the sensor 1007A is in the same building as the controller and/or in a different building.

The user interface 1000 is not limited to receiving input via a touchscreen, but can additionally or alternatively include a microphone 1007B to allow a user to input commands to the switch 102 and/or outlet 102 using voice commands. In addition, in some example configurations, the PCN 102 can include a speaker, e.g., annunciator 254 of FIG. 3, as described above.

In some example configurations, the user interface 100 can display a keypad to receive user input. The keypad can receive user input to allow the user to control one or more functions of a PCN 102 and/or other electrical devices and/or other PCNs 102 in the same building or in different buildings, as well as to allow the PCN 102 (and the user) to connect to and navigate the Internet, send text messages, send email, dial phone numbers, etc.

Figure 14:
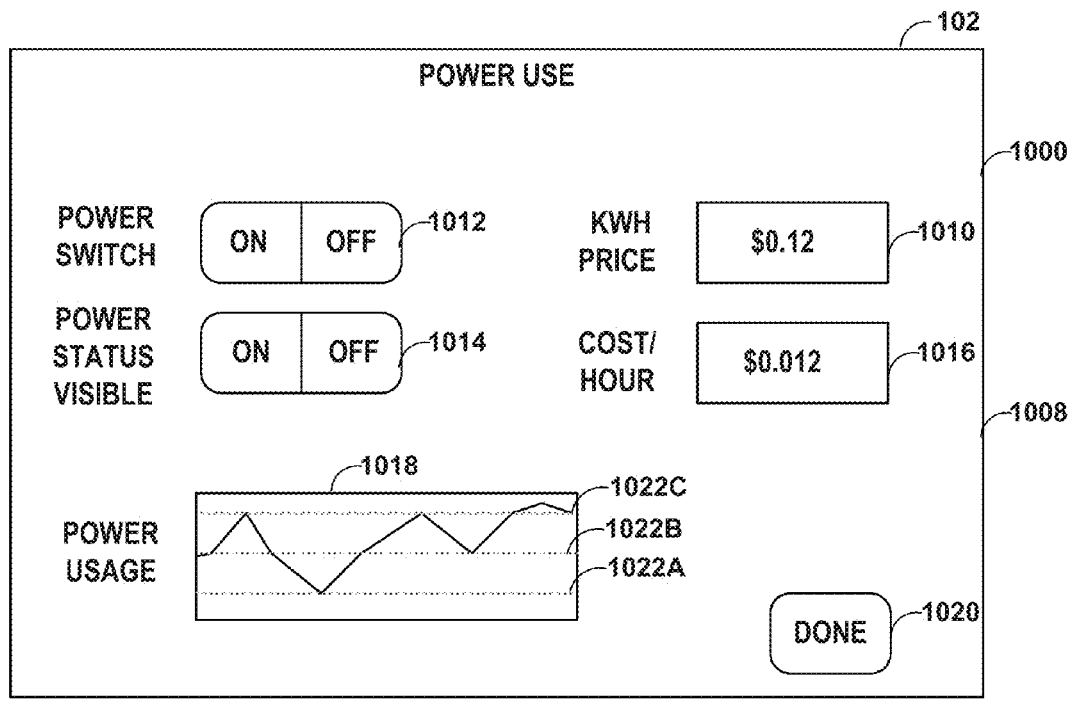
FIGS. 14-22 are examples of a display of a property communication node depicting various electrical power usage information, in accordance with various techniques of this disclosure.

FIG. 14 is an example of the display 1000 of a PCN 102 depicting various electrical power usage information, in accordance with various techniques of this disclosure. As seen in FIG. 14, the display 1000 can present a power use information screen 1008 to a user, including a kilowatt-hour price ("KWH PRICE") field 1010, a power switch ON/OFF switch icon 1012, a power status visible switch icon 1014, a cost per hour field 1016, and a power usage graph 1018.

The kilowatt-hour price field 1010 can, for example, receive user input that defines the current price per kilowatt-hour charged by the user's electric company. The kilowatt-hour price field 1010 allows the cost per hour field 1016 to display the current cost to the user of the electrical load connected to the switch. In the example shown in FIG. 14, the KWH price is shown as $0.12 and the current cost per hour of supplying power to the electrical load is shown as $0.012.

The power switch ON/OFF switch icon 1012 can allow the user to turn ON/OFF the power to the electrical load connected to the PCN 102 without having to go back to the previous screen, as shown in the display of FIG. 14, for example.

The power status visible switch icon 1014 can allow the user to turn ON/OFF the current draw icon 1004, or the information shown on the icon 1004, shown in the display of FIG. 13, for example. In some examples implementations, the power usage graph 1018 can be presented on the display of FIG. 13 and the power status visible switch icon 1014 can allow the user to turn ON/OFF the power usage graph 1018.

The icon 1020 ("DONE") can receive user input that allows the user to exit the power use information screen 1008 of display 1000 and return to a previous screen, such as displayed in FIG. 13.

The power usage graph 1018 can graphically display various electrical power usage information, e.g., current, kilowatts, and the like, to the user. In some examples, such as shown in FIG. 14, the graph 1018 can display one or both of current electrical information and historical electrical information, e.g., over the past hour, several hours, days, weeks, months, etc.

In some examples, such as shown in FIG. 14, the power usage graph 1018 can include one or more indicators 1022A-1022C (collectively referred to in this disclosure as "indicators 1022"), e.g., lines, that can indicate levels of power usage. For example, the indicator 1022A can define a low power usage level, the indicator 1022B can define a moderate power usage level, and the indicator 1022C can define a high power usage level. Although not depicted, the indicators 1022, the regions between the indicators 1022, and/or the portions of the graph between the indicators 1022, can be color-coded, e.g., green, yellow, and red, to graphically depict low/moderate/high power usage levels. By displaying the power usage graph 1018 on the display 1000 of the switch 102 (a PCN 102), the user can easily monitor the power consumption of one or more electrical loads connected to the switch 102 and, if desired, take steps to reduce the power consumption. Example power usage graphs include but are not limited to line graphs and bar graphs.

As mentioned above, the frame 1001 of FIG. 13 can change color to alert a user upon the occurrence of an event, e.g., high power usage. For example, in the event that the power usage in a particular room and/or location exceeds a threshold e.g., user defined threshold, or otherwise deviates from a setting, the controller, e.g., controller 1104 of FIG. 23 or 24, can cause the frame 1001 to turn color to alert the user. In other examples, the controller can generate an audible alert and/or some other visual alert to notify the user of any excursion or deviation from a setting. The controller can be configured to generate the alert in the same building as the controller, and/or different building. In other examples, the frame 1001 can change color if there is no power usage associated with a PCN 102.

Figure 15:
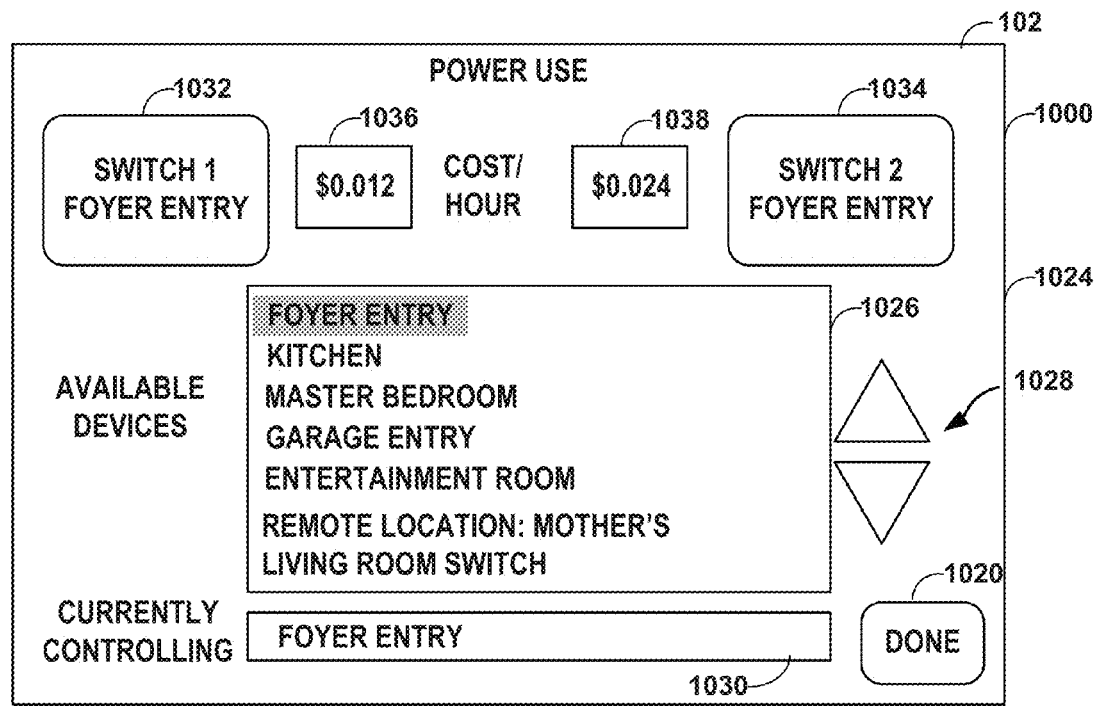

FIG. 15 is another example of the display 1000 of a PCN 102 depicting various electrical power usage information, in accordance with various techniques of this disclosure. As seen in FIG. 15, the display 1000 can present another power use information screen 1024 to a user, including presenting power use information for multiple switches 102, e.g., two or more switches or outlets, that can be selected by the user.

As described above, each PCN 102 can include a bidirectional radio, e.g., the bidirectional radio 252 of FIG. 5. The bidirectional radio can allow the PCNs 102 to communicate with one another. When the PCNs 102 are embodied as electrical switches and/or outlets, as in FIGS. 13-24, these electrical switches and/or outlets can communicate power use information with one another.

In FIG. 15, the display 1000 can include a list 1026 of available switches 102 or outlets 102, e.g., by location. In some example implementations, the user can scroll through and select from the list 1026 with arrow icons 1028. In the specific example shown in FIG. 15, the user can select from six locations: foyer entry, kitchen, master bedroom, garage entry, entertainment room, and a remote location (mother's living room switch). Each of these locations can include one or more switches 102 and/or outlets 102 with bidirectional radios to communicate with other switches 102 and/or outlets 102.

As indicated by the highlighted text in the list 1026, the user has selected the "FOYER ENTRY" as the location that includes one or more switches 102 and/or outlets 102 of interest to the user, which can then be displayed in a "currently controlling" field 1030 of the power use information screen 1024. After the user selects on the display 1000 the one or more locations that each include one or more switches and/or outlets 102, the switch 102 can begin determining and/or receiving the power use information and displaying the determined and/or received power use information.

The example screen 1024 of FIG. 15 includes two switch icons 1032, 1034. The switch icon 1032 in FIG. 15 is associated with "Switch 1 Foyer Entry" and the switch icon 1034 in FIG. 15 is associated with "Switch 2 Foyer Entry," e.g., a double switch. Each switch icon 1032, 1034 can be associated with a cost per hour ("COST/HOUR") field 1036, 1038. In the example of FIG. 15, "Switch 1 Foyer Entry" has a cost/hour of $0.012 and "Switch 2 Foyer Entry" has a cost/hour of $0.024. Thus, the electrical load associated with "Switch 2 Foyer Entry," e.g., a ceiling fan, is costing a user twice as much as the electrical load associated with "Switch 1 Foyer Entry," e.g., a light. By displaying this power use information, the display 1024 can allow the user to monitor and/or modify his or her behavior, e.g., dim light, turn off an appliance, etc., and thus conserve energy.

In some examples, the display 1000 of FIG. 15 can be associated with either or both of "Switch 1 Foyer Entry" and "Switch 2 Foyer Entry". In other words, the display 1000 can be the display of a switch 102 in the foyer entry presenting power use information associated with electrical loads connected to that particular switch 102.

However, because each switch 102 or outlet 102 can include a bidirectional radio, e.g., the bidirectional radio 252 of FIG. 5, the display 1000 of FIG. 15 need not be associated with either "Switch 1 Foyer Entry" or "Switch 2 Foyer Entry". That is, the display 1000 presenting power use information associated with electrical loads connected to switches in the foyer entry can be the display of a switch 102 located somewhere other than in the foyer entry, e.g., a display of a switch in the master bedroom. In this manner, a user can view power use information for electrical loads in one room when the user is in another room. In addition, the user is not limited to viewing power use information for electrical loads in the same house or other building, which will be described in more detail below.

Figure 16:
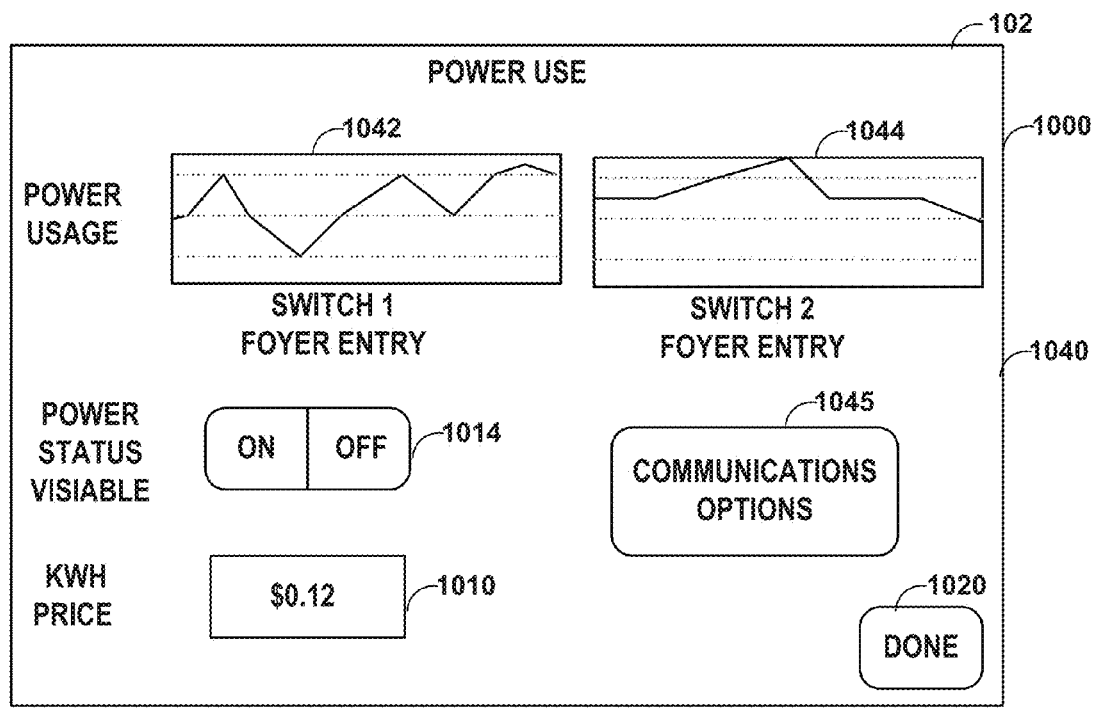

FIG. 16 is another example of the display 1000 of a PCN 102 depicting various electrical power usage information, in accordance with various techniques of this disclosure. As seen in FIG. 16, the display 1000 can present a power use information screen 1040 to a user, including a kilowatt-hour price ("KWH PRICE") field 1010, a power status visible switch icon 1014, and multiple power usage graphs 1042, 1044, e.g., two or more power usage graphs. Power usage graphs were described above with respect to FIG. 14 and, for purposes of conciseness, will not be described in detail again.

The power usage graphs 1042, 1044 can graphically present power usage information associated with the location(s) selected in FIG. 15, e.g., the foyer entry. In the example shown in FIG. 16, the power usage graph 1042 can present power use information associated with "Switch 1 Foyer Entry" and the power usage graph 1044 can present power use information associated with "Switch 2 Foyer Entry."

The display 1000 can include a communications options icon 1045. The user interface can present a communications options screen to a user in response to the user selecting the communications options icon 1045. To control how communication(s) are received, a user can select to receive one or more of a text message, a voice message, an email message, and/or some other mode of communication, e.g., a notification in a user's account at a website. An example of a communications options screen is shown and described below with respect to FIG. 27 and, for purposes of conciseness, will not be described in detail again.

Figure 17:
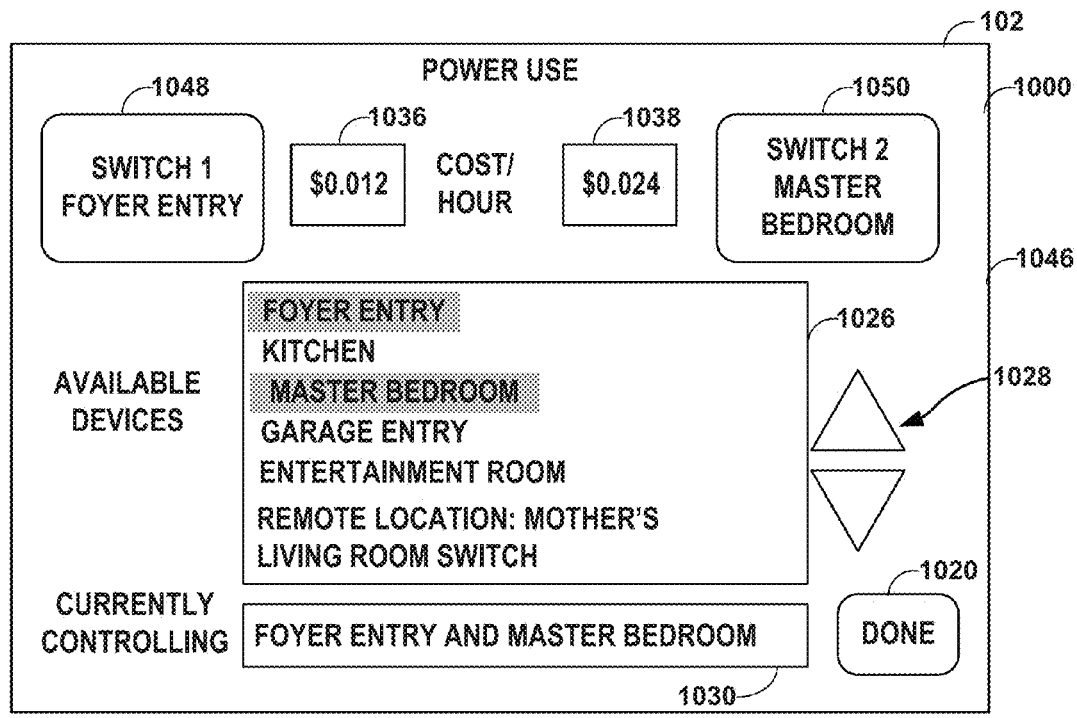

FIG. 17 is another example of the display 1000 of a PCN 102 depicting various electrical power usage information, in accordance with various techniques of this disclosure. As seen in FIG. 17, the display 1000 can present another power use information screen 1046 to a user, including presenting power use information for multiple switches 102, e.g., two or more switches or outlets, from multiple locations that can be selected by the user.

The power use information screen 1046 can be similar to the power use information screen 1024 of FIG. 15 and, as such, similar features will not be described in detail again. The display 1000 shown in FIG. 17 can include a list 1026 of available switches 102 or outlets 102, e.g., by location.

As seen in the list 1026 by the highlighted text, the user has selected both the "FOYER ENTRY" and the "MASTER BEDROOM" as the locations that include one or more switches 102 and/or outlets 102 of interest to the user, which can then be displayed in a "currently controlling" field 1030 of the power use information screen 1046. After the user selects on the display 1000 the one or more locations that each include one or more switches and/or outlets 102, the switch 102 can begin determining and/or receiving the power use information and displaying the determined and/or received power use information.

Because each switch 102 or outlet 102 can include a bidirectional radio, e.g., the bidirectional radio 252 of FIG. 5, the display 1000 of FIG. 17 can be associated with a switch 102 located in the foyer entry and receive and present power use information associated with electrical loads connected a switch 102 located in the master bedroom, or vice versa.

In other example implementations, the display 1000 of FIG. 17 need not be associated with either "Switch 1 Foyer Entry" or "Switch 2 Master Bedroom." That is, the display 1000 presenting power use information associated with electrical loads connected to the switch in the foyer entry and with electrical loads connected to the switch in the master bedroom can be the display of a switch 102 located somewhere other than in the foyer entry or the master bedroom, e.g., a display of a switch 102 in the kitchen. In this manner, a user can view power use information for electrical loads in one or more rooms when the user is in another room.

The example screen 1046 of FIG. 17 includes two switch icons 1048, 1050. The switch icon 1048 in FIG. 17 is associated with "Switch 1 Foyer Entry" and the switch icon 1050 in FIG. 17 is associated with "Switch 2 Master Bedroom." Each switch icon 1048, 1050 can be associated with a cost per hour ("COST/HOUR") field 1036, 1038. In the example of FIG. 17, "Switch 1 Foyer Entry" has a cost/hour of $0.012 and "Switch 2 Master Bedroom" has a cost/hour of $0.024. Thus, the electrical load associated with "Switch 2 Master Bedroom," e.g., a ceiling fan, is costing a user twice as much as the electrical load associated with "Switch 1 Foyer Entry," e.g., a light. By displaying this power use information, the display 1000 can allow the user to monitor and/or modify his or her behavior, e.g., dim light, turn off an appliance, etc., and thus conserve energy.

Figure 18:
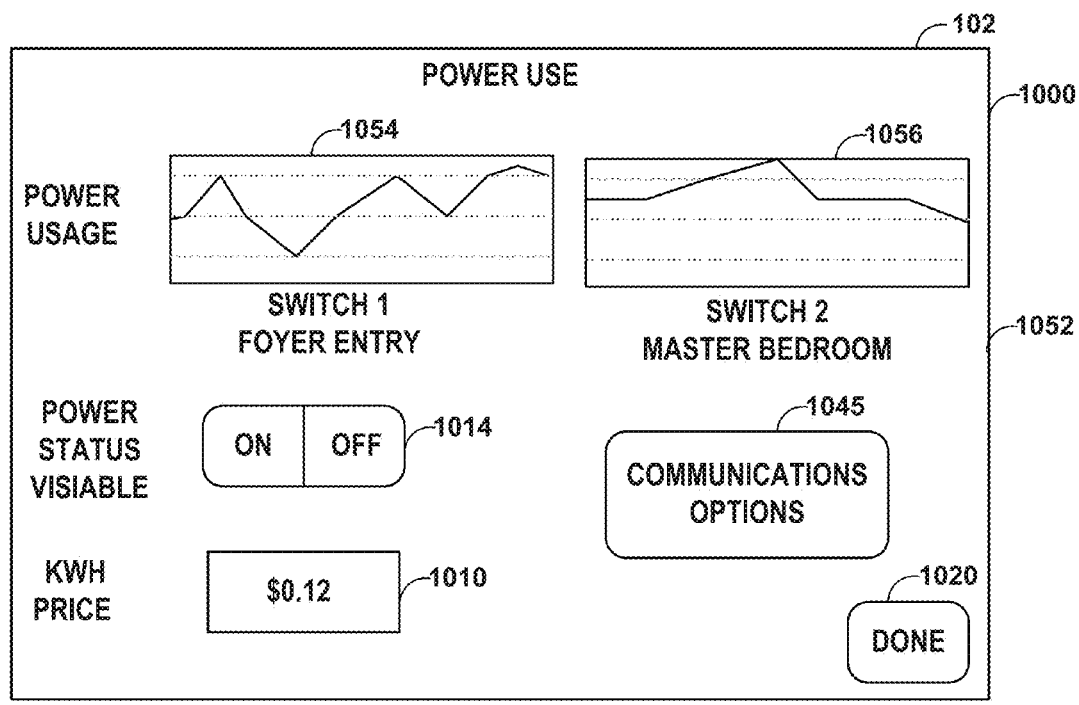

FIG. 18 is another example of the display 1000 of a PCN 102 depicting various electrical power usage information, in accordance with various techniques of this disclosure. As seen in FIG. 18, the display 1000 can present a power use information screen 1052 to a user, including a kilowatt-hour price ("KWH PRICE") field 1010, a power status visible switch icon 1014, and multiple power usage graphs 1054, 1056, e.g., two or more power usage graphs. Power usage graphs were described above with respect to FIG. 16 and, for purposes of conciseness, will not be described in detail again.

The power usage graphs 1054, 1056 can graphically present power usage information associated with the location(s) selected in FIG. 17, e.g., the foyer entry and the master bedroom. In the example shown in FIG. 18, the power usage graph 1054 can present power use information associated with "Switch 1 Foyer Entry" and the power usage graph 1056 can present power use information associated with "Switch 2 Master Bedroom."

Figure 19:
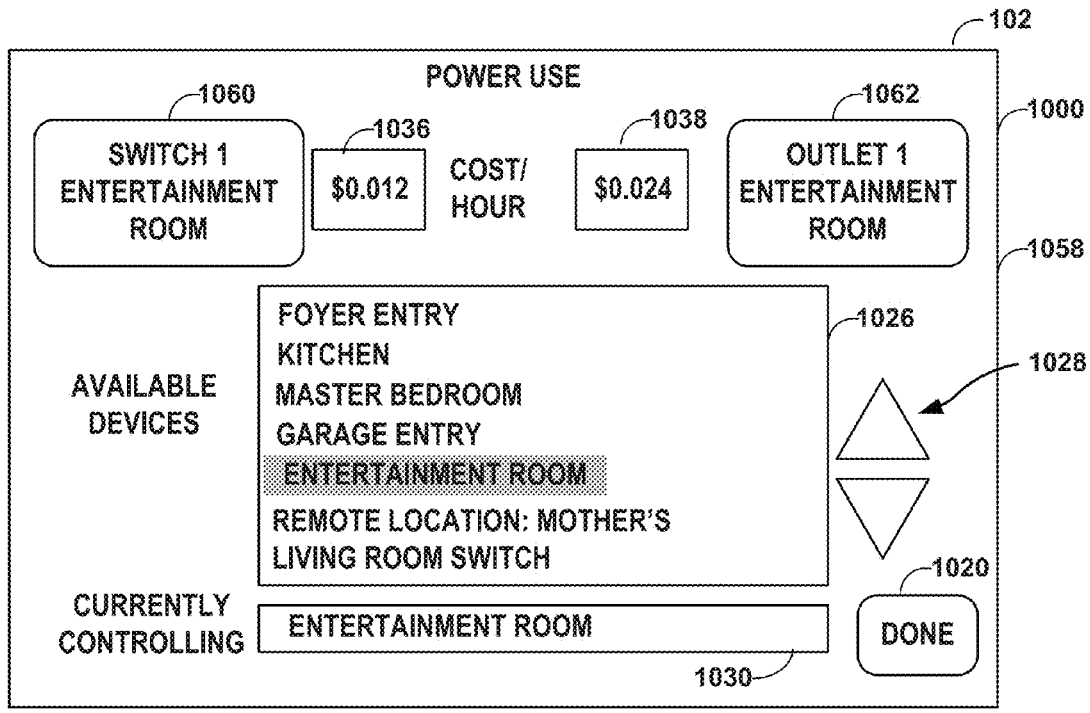

FIG. 19 is another example of the display 1000 of a PCN 102 depicting various electrical power usage information, in accordance with various techniques of this disclosure. As seen in FIG. 19, the display 1000 can present another power use information screen 1058 to a user, including presenting power use information for a switch 102 and an outlet 102 selectable from multiple locations by the user.

The power use information screen 1058 can be similar to the power use information screen 1024 of FIG. 15 and, as such, similar features will not be described in detail again. The display 1000 shown in FIG. 19 can include a list 1026 of available switches 102 or outlets 102, e.g., by location.

As seen in the list 1026 by the highlighted text, the user has selected the "ENTERTAINMENT ROOM" as the location that include one or more switches 102 and/or outlets 102 of interest to the user, which can then be displayed in a "currently controlling" field 1030 of the power use information screen 1058. More particularly, the entertainment room in the example includes "switch 1" and "outlet 1." For example, switch 1 can be associated with one or more lights and outlet 1 can be associated with an entertainment system.

After the user selects on the display 1000 the one or more locations that each include one or more switches and/or outlets 102, the switch 102 can begin determining and/or receiving the power use information and displaying the determined and/or received power use information. The display 1000 can be associated with either a switch 102 or outlet 102 in the entertainment room.

In some example, because each switch 102 or outlet 102 can include a bidirectional radio, e.g., the bidirectional radio 252 of FIG. 5, the display 1000 of FIG. 19 can be associated with a switch 102 located in the master bedroom and receive and present power use information associated with electrical loads connected a switch 102 and an outlet 102 located in the entertainment room. In this manner, a user can view power use information for electrical loads in one or more rooms when the user is in another room.

The example screen 1058 of FIG. 19 includes two switch icons 1060, 1062. The switch icon 1060 in FIG. 19 is associated with "Switch 1 Entertainment Room" and the switch icon 1062 in FIG. 19 is associated with "Outlet 1 Entertainment Room." Each switch icon 1060, 1062 can be associated with a cost per hour ("COST/HOUR") field 1036, 1038. In the example of FIG. 19, "Switch 1 Entertainment Room" has a cost/hour of $0.012 and "Outlet 1 Entertainment Room" has a cost/hour of $0.024. Thus, the electrical load associated with "Outlet 1 Entertainment Room," e.g., an entertainment system, is costing a user twice as much as the electrical load associated with "Switch 1 Entertainment Room," e.g., one or more lights. By displaying this power use information, the display 1000 can allow the user to monitor and/or modify his or her behavior, e.g., dim light, turn off an appliance, etc., and thus conserve energy.

Figure 20:
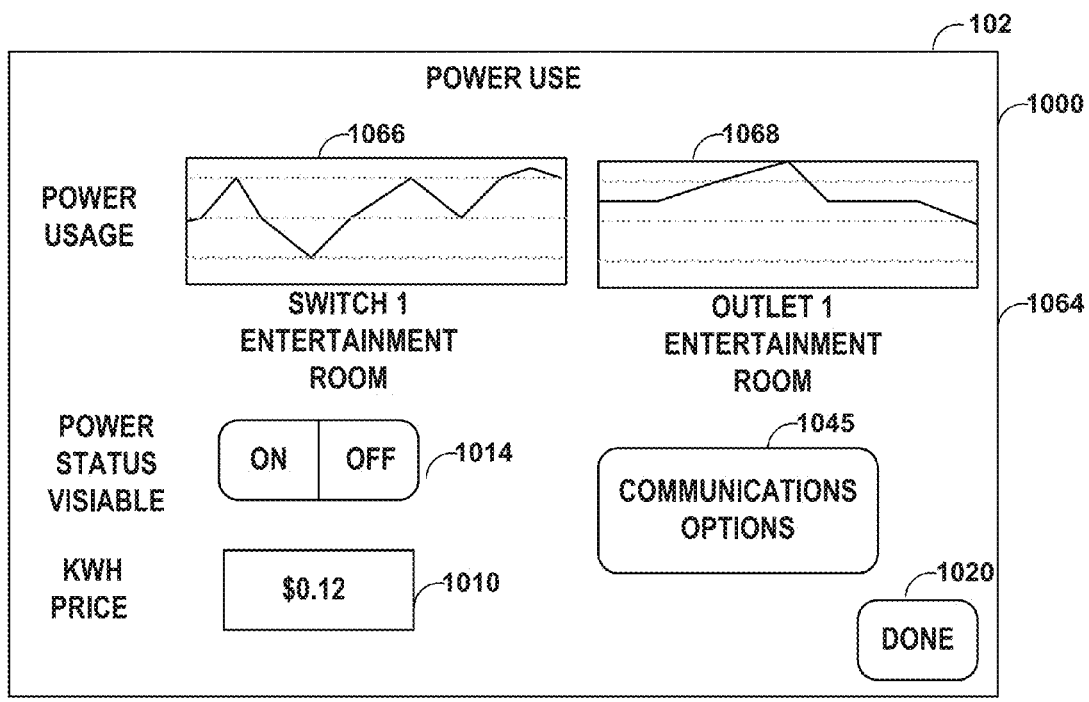

FIG. 20 is another example of the display 1000 of a PCN 102 depicting various electrical power usage information, in accordance with various techniques of this disclosure. As seen in FIG. 20, the display 1000 can present a power use information screen 1064 to a user, including a kilowatt-hour price ("KWH PRICE") field 1010, a power status visible switch icon 1014, and multiple power usage graphs 1066, 1068, e.g., two or more power usage graphs. Power usage graphs were described above with respect to FIG. 14 and, for purposes of conciseness, will not be described in detail again.

The power usage graphs 1066, 1068 can graphically present power usage information associated with the location(s) selected in FIG. 19, e.g., the entertainment room. In the example shown in FIG. 20, the power usage graph 1066 can present power use information associated with "Switch 1 Entertainment Room" and the power usage graph 1068 can present power use information associated with "Outlet 1 Entertainment Room."

Figure 21:
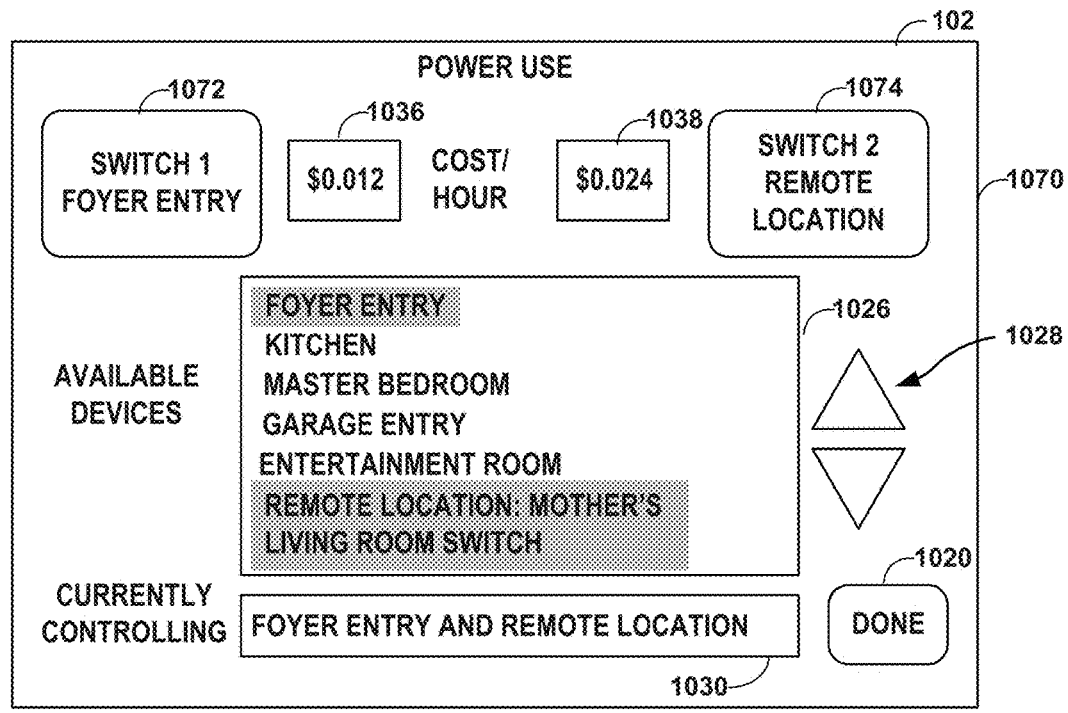

FIG. 21 is another example of the display 1000 of a PCN 102 depicting various electrical power usage information, in accordance with various techniques of this disclosure. As seen in FIG. 21, the display 1000 can present another power use information screen 1070 to a user, including presenting power use information for multiple switches 102, e.g., two or more switches or outlets, from two or more locations that can be selected by the user. That is, as mentioned above, the user is not limited to viewing power use information for electrical loads in the same house or other building.

The power use information screen 1070 can be similar to the power use information screen 1024 of FIG. 15 and, as such, similar features will not be described in detail again. The display 1000 shown in FIG. 21 can include a list 1026 of available switches 102 or outlets 102, e.g., by location.

As seen in the list 1026 by the highlighted text, the user has selected both the "FOYER ENTRY" and the "REMOTE LOCATION: MOTHER'S LIVING ROOM SWITCH" as the locations that include one or more switches 102 and/or outlets 102 of interest to the user, which can then be displayed in a "currently controlling" field 1030 of the power use information screen 1070. After the user selects on the display 1000 the one or more locations that each include one or more switches and/or outlets 102, the switch 102 can begin determining and/or receiving the power use information and displaying the determined and/or received power use information.

Because each switch 102 or outlet 102 can include a bidirectional radio, e.g., the bidirectional radio 252 of FIG. 5, the display 1000 of FIG. 21 can be associated with a switch 102 located in the foyer entry and receive and present power use information associated with electrical loads connected a switch 102 located at the remote location. That is, as described above, each PCN 102 (embodied here as a switch 102 or an outlet 102) of the multiple locations can communicate bi-directionally with the broker service 106. The subscriber located at a remote location can authorize a user at another location to communicate, e.g., via the broker 106, with one or more switches 102 and outlets 102 located at the subscriber's remote location. This can allow the user to remotely monitor the subscriber's energy use.

The example screen 1070 of FIG. 21 includes two switch icons 1072, 1074. The switch icon 1072 in FIG. 21 is associated with "Switch 1 Foyer Entry" and the switch icon 1074 in FIG. 21 is associated with "Switch 2 Remote Location." Each switch icon 1072, 1074 can be associated with a cost per hour ("COST/HOUR") field 1036, 1038. In the example of FIG. 21, "Switch 1 Foyer Entry" has a cost/hour of $0.012 and "Switch 2 Remote Location" has a cost/hour of $0.024. Thus, the electrical load associated with "Switch 2 Remote Location," e.g., a living room switch remotely located at the user's mother's residence, is costing twice as much as the electrical load associated with "Switch 1 Foyer Entry," e.g., a light. By displaying this power use information, the display 1000 can allow the user to monitor and/or modify his/her/another's behavior, e.g., dim light, turn off an appliance, etc., and thus conserve energy.

Figure 22:
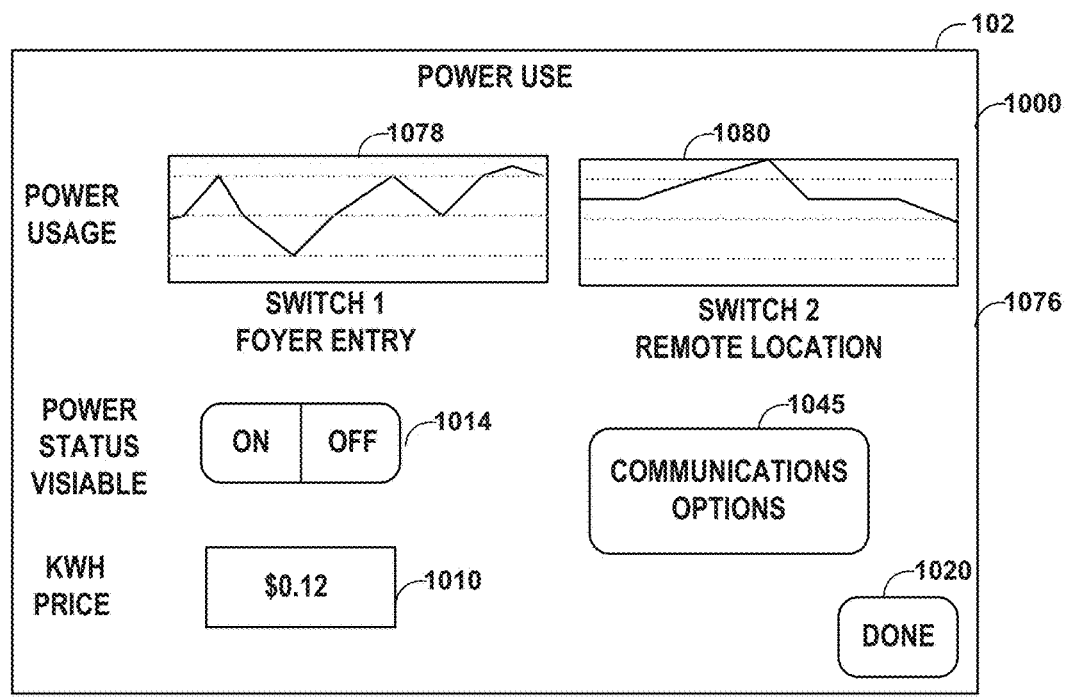

FIG. 22 is another example of the display 1000 of a PCN 102 depicting various electrical power usage information, in accordance with various techniques of this disclosure. As seen in FIG. 22, the display 1000 can present a power use information screen 1076 to a user, including a kilowatt-hour price ("KWH PRICE") field 1010, a power status visible switch icon 1014, and multiple power usage graphs 1078, 1080, e.g., two or more power usage graphs. Power usage graphs were described above with respect to FIG. 14 and, for purposes of conciseness, will not be described in detail again.

The power usage graphs 1078, 1080 can graphically present power usage information associated with the location(s) selected in FIG. 21, e.g., the foyer entry and the remote location (mother's living room switch). In the example shown in FIG. 22, the power usage graph 1078 can present power use information associated with "Switch 1 Foyer Entry" and the power usage graph 1080 can present power use information associated with "Remote Location."

It should be noted that in some example implementations, one or more rooms and/or locations can be monitored even though the information is not currently being displayed. For example, as described above, the user can select from the list 1026 of available switches 102 or outlets 102. Even though the user is not currently displaying or controlling the power usage in the "master bedroom," for example, the PCN 102 can still monitor the power usage of the "master bedroom" (and any one or more of the locations listed). Should the power usage of a location that is not currently being controlled, e.g., the "master bedroom," deviate from a usage setting, the PCN 102 can alert the user, e.g., change the color of the frame 1001, and/or generate some other audible or visual alert. In other words, the PCN 102 can currently monitor locations and/or rooms that are not currently controlled or displayed in a screen.

Figure 23:
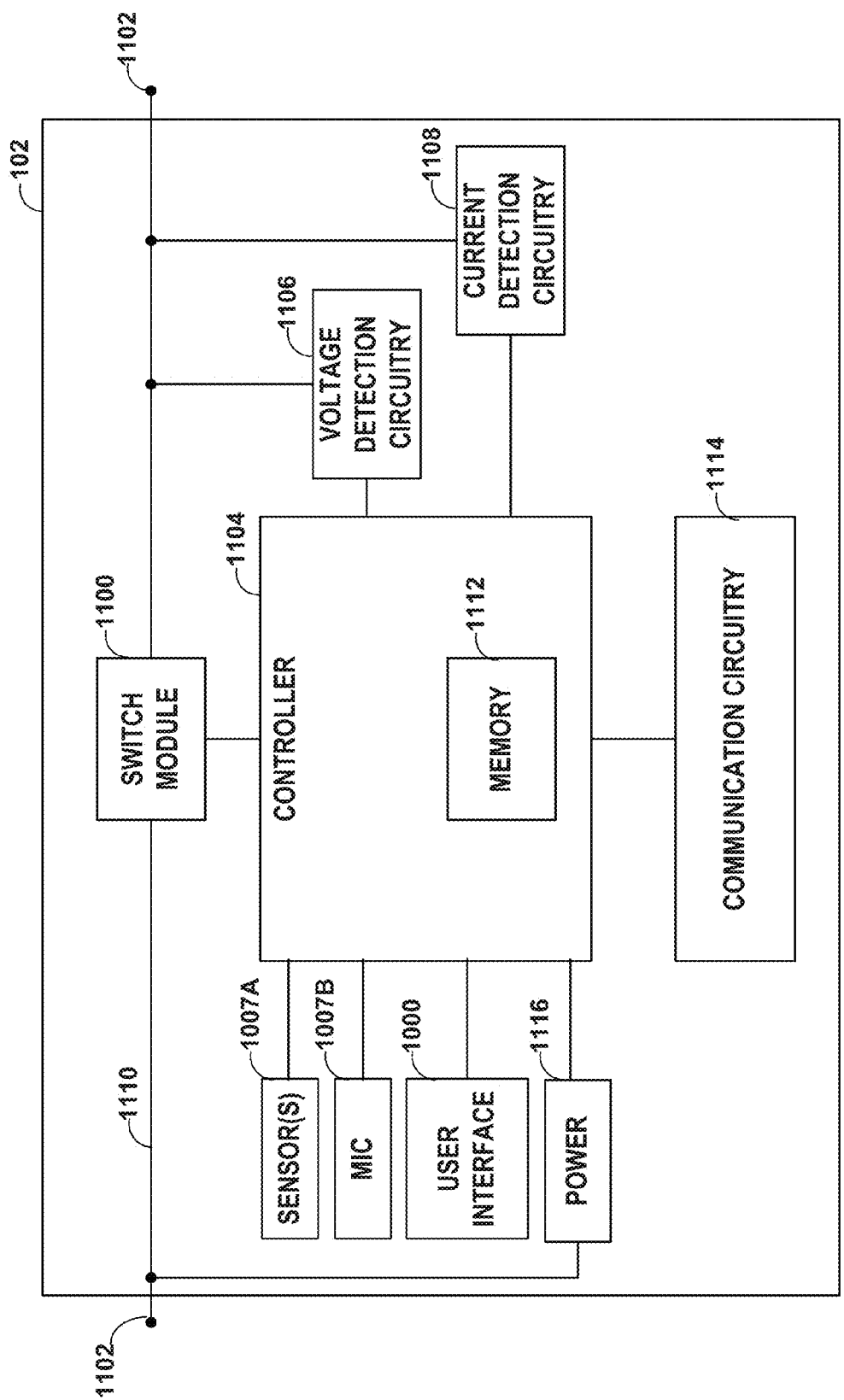
FIG. 23 is a block diagram of an example of a property communication node including electrical switch functionality and configured to implement various techniques of this disclosure.

The switches 102 and the outlets 102 described above with respect to FIGS. 13-22 and below with respect to FIGS. 23-29 can include any of the features described above with respect to the PCNs 102 as well as any of the features described in U.S. Pat. No. 6,894,609. FIG. 23 depicts one example of a switch 102 that can implement various techniques of this disclosure.

FIG. 23 depicts a block diagram of an example of a switch 102 that can implement various techniques of this disclosure. The switch 102 can be an example of an electrical device configured to be electrically connected to the electrical power wiring of a building and configured to display electrical power usage information of at least one electrical load connected to the electrical power wiring.

The switch 102 can include a switch module 1100 (or switch), similar to the switch module 20A (or switch 20) described in the 609 patent. The switch module 1100 can be positioned between two electrical terminals 1102 connected to the electrical power wiring of a building and can be configured to interrupt, control, and/or modify the delivery of voltage and current to a load (not depicted) in the building, e.g., light, ceiling fan, appliance, and the like. The electrical terminals 1102 of the switch 102, similar to the terminals 15 of the 609 patent, can be configured to receive individual wires of the electrical power wiring.

The switch 102 can include a controller 1104 configured to control the switch module 1100. The controller 1104 can be similar to the controller 680 described above. The controller 1104 can be configured to receive information representing a current to the electrical load(s). In some examples, the controller 1104 can receive voltage information using voltage detection circuitry 1106 and can receive current information using current detection circuitry 1108. In other examples, the voltage can be pre-programmed and then retrieved from memory to determine a power usage. The voltage detection circuitry 1106 can include, for example, a voltage transformer and an analog-to-digital converter. The current detection circuitry 1108 can include, for example, a current transformer and an analog-to-digital converter.

The controller 1104 can receive the digital representations of the line voltage and current of line 1110 and execute instructions to determine the electrical power usage information of the at least one electrical load using the received information. In some examples, the switch 102 can include a memory 1112, e.g., in the controller 1104 or external to the controller 1104, that allows the switch 102 to store historical power usage information for display.

The switch 102 can include a communications circuitry or interface 1114, e.g., radio communication circuitry, to transmit to and/or receive energy usage or electrical power usage information from one or more other switches 102 for display. In some examples, the communication circuitry can be similar to the radio communications 652 in FIGS. 6 and 7 and can include wired and wireless protocols as described above including, but not limited to, cellular, LAN, WiFi, SMS messaging, software radio, Bluetooth™, Zigbee™, Z-Wave™, and other proprietary wireless protocols. These are just some of the protocols available. It is understood that a variety of other protocols can be employed.

The switch 102 can include a user interface 1000, e.g., a touchscreen display, for displaying electrical power usage information of at least one electrical load connected to the electrical power wiring. The user interface 1000 can receive the electrical power usage information from the controller 1104 and the user interface 1000 can display to a user any of the power use information screens described above in FIGS. 13-22, for example.

In addition, as described above, the switch 102 and, in particular, the controller 1104, can receive electrical power usage information from another switch 102 via the communication circuitry 1114. The user interface 1000 can then receive the electrical power usage information from the controller 1104 and the user interface 1000 can display to a user any of the power use information screens described above in FIGS. 13-22, for example.

The switch 102 can include a power supply 1116. In some examples, the power supply 1116 can be similar to the power supply 60 of FIG. 4 of the 609 patent. Briefly, the power supply 1116 can provide power to the components of FIG. 23 by drawing power from the line 1110, e.g., an electrical power supply providing 110 volts AC or other standard supply voltage, or from battery power, e.g., rechargeable or non-rechargeable battery. If using batter power, the switch 102 can monitor the battery and generate a low battery alert.

The switch 102 can include a sensor 1007A, e.g., infrared, ultrasonic, video camera, and the like, configured to detect motion.

Figure 24:
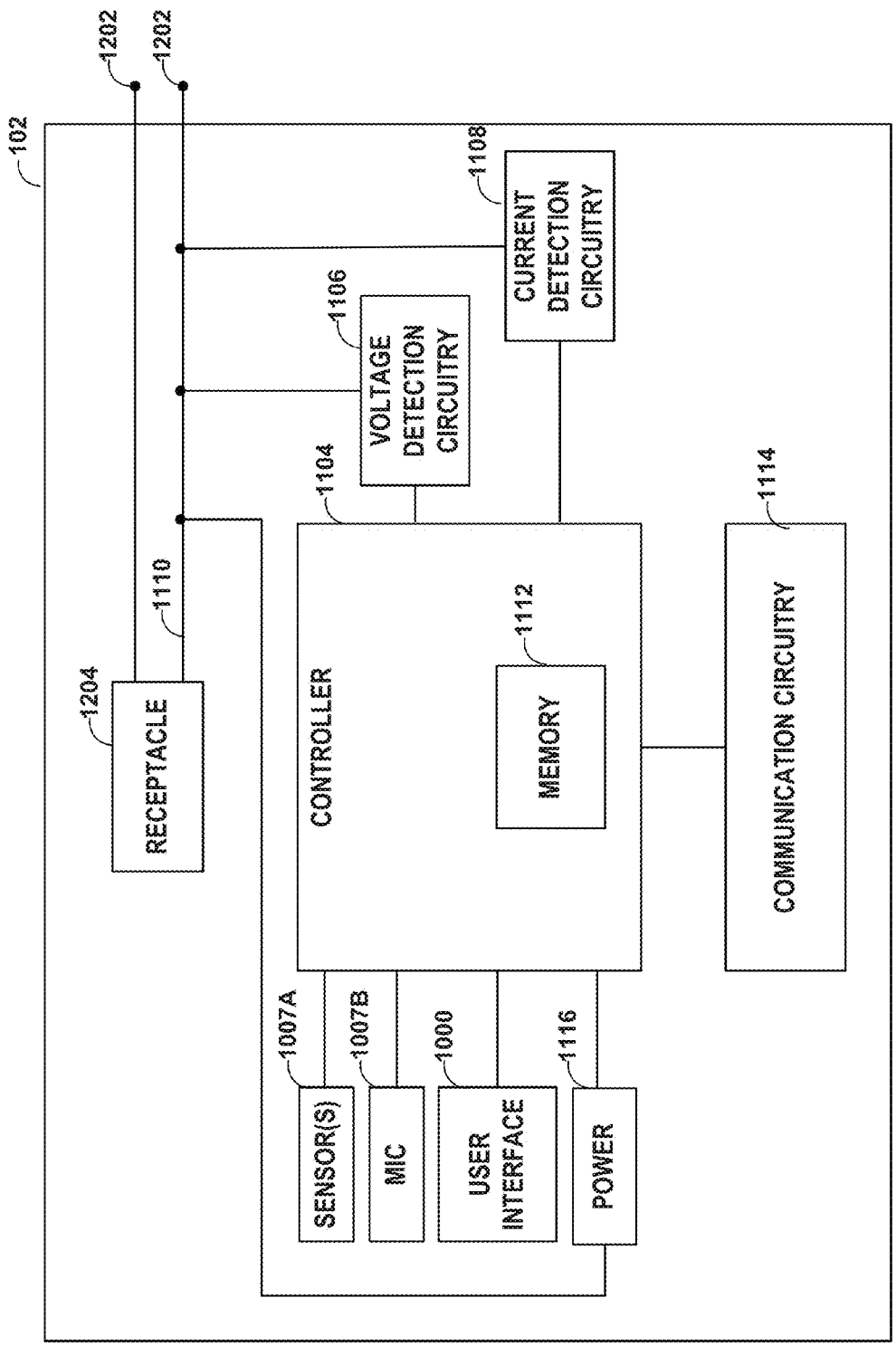
FIG. 24 is a block diagram of an example of a property communication node including electrical outlet functionality and configured to implement various techniques of this disclosure.

FIG. 24 depicts a block diagram of an example of an outlet 102 that can implement various techniques of this disclosure. The outlet 102 can be an example of an electrical device configured to be electrically connected to the electrical power wiring of a building and configured to display electrical power usage information of at least one electrical load connected to the electrical power wiring.

Many of the components of the outlet 102 are similar to the components described above with respect to the switch 102 of FIG. 23 and, as such, will not be described again.

The outlet 102 can include electrical terminals 1202 configured to electrically connect to the electrical power wiring of the building. The electrical terminals can include one or more multi-pronged male plugs (not depicted) configured to mate with corresponding female receptacle(s) of an electrical outlet connected to the electrical power wiring of the building.

The outlet 102 can include one or more female receptacles 1204 configured to mate with corresponding multi-pronged male plugs connected to one or more electrical loads and thus deliver power to the electrical load(s).

The outlet 102 can include, for example, the voltage detection circuitry 1106 e.g., a voltage transformer and an analog-to-digital converter, and the current detection circuitry 1108, e.g., a current transformer and an analog-to-digital converter, to determine digital representations of the line voltage and current of line 1110.

The controller 1104 can be configured to receive the information representing the voltage and the current to the at least one electrical load. The controller can execute instructions to determine the electrical power usage information of the at least one electrical load using the received information. In some examples, the outlet 102 or the controller 1104 can include a memory 1112 that allows the outlet 102 to store historical power usage information for display.

Although the outlet 102 depicts one receptacle 1204, in some example configurations there may be two or more receptacles. Each of the two or more receptacles can be appropriately wired to voltage detection circuitry and current detection circuitry to accurately measure the electrical load associated with each receptacle.

The switches 102 and outlets 102 described above with respect to FIGS. 13-32 can include any of the various functionality of the PCNs 102 described above with respect to FIGS. 1-12. For example, in some implementations, the switch 102 and/or outlet 102 described in FIGS. 13-32 can include a sensor, e.g., sensor 1007A of FIG. 13 and various motion detector functionality, as described below with respect to FIGS. 25-29. A motion detector can be useful for monitoring health and wellness of the elderly. It can also be used for basic security features. It is also possible to use the motion detector to sense when children arrive from school or when the cleaning service enters the property.

As described below with respect to FIGS. 25-29, various settings of the motion detector can be controlled by the user using one or more motion detection screens displayed on the user interface 1000. The motion detection screen(s) can include a "security alarm" icon that can allow a user to turn ON/OFF an alarm or other indicator that indicates when motion is detected by the motion sensor. The motion detection screen(s) can include a "motion activated light" icon that can allow a user to turn ON/OFF functionality that can control a light (or other device), for example, to be turned ON when motion is detected by the motion sensor (or to be turned ON when motion is not detected by the sensor, for example). The motion detection screen(s) can include an "activity time out" icon, e.g., a slider bar, that can allow a user to adjust a length of time that a light (or other device), for example, remains ON after motion is detected by the motion sensor. The motion detection screen(s) can include a "sensitivity" icon, e.g., a slider bar, that can allow a user to adjust a level of sensitivity of the motion detector to reduce or eliminate unwanted detection, e.g., in the case of pets walking past the sensor.

In some example implementations, the PCNs 102 of this disclosure, including the switch 102 and/or outlet 102 described in FIGS. 13-24, can include a user interface that provides voice activation capabilities. That is, the user interface 1000 is not limited to receiving input via a touchscreen, but can additionally or alternatively include a microphone to allow a user to input commands to the switch 102 and/or outlet 102 using voice commands.

Furthermore, in other example implementations, the switch 102 and/or outlet 102 described in FIGS. 13-24 can allow a user to select a language from a number of languages, e.g., English, French, German, Chinese, Spanish, etc., in which to display text on the screens. Additionally or alternatively, the switch 102 and/or outlet 102 described in FIGS. 13-24 can receive voice activation commands, e.g., via the microphone 1007B, spoken in the selected language.

Figure 25:
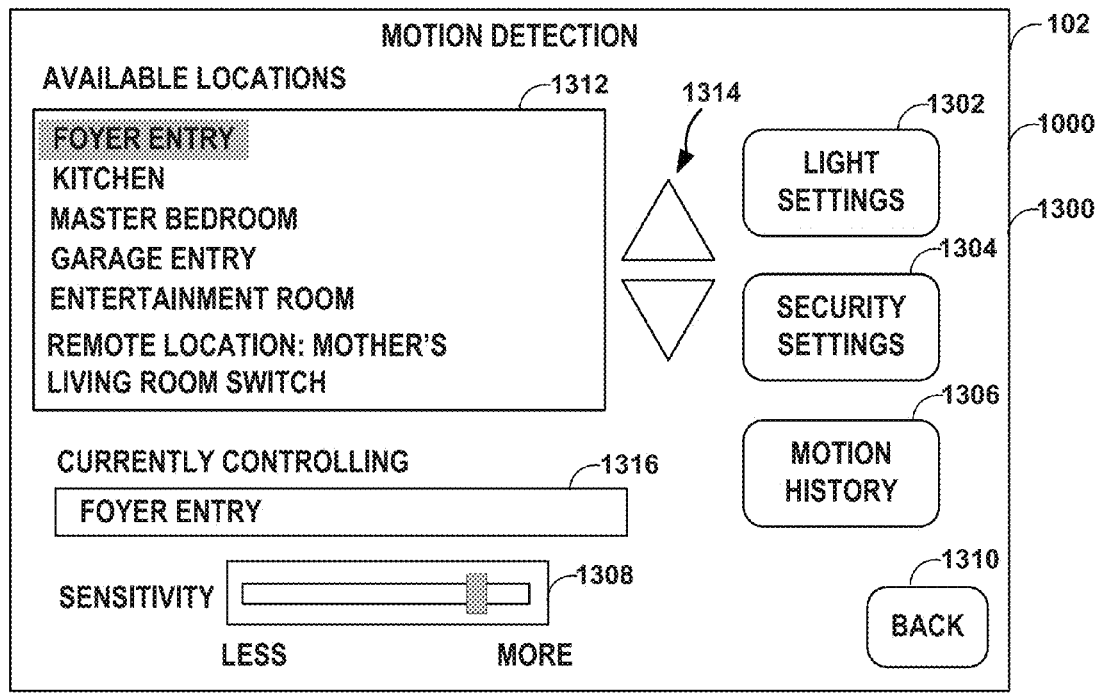
FIGS. 25-29 are examples of a display of a property communication node depicting various motion detection settings, in accordance with various techniques of this disclosure.

FIG. 25 is an example of the display 1000 of a PCN 102 depicting various motion detection settings, in accordance with various techniques of this disclosure. As seen in FIG. 25, the display 1000 can present a motion detection screen 1300 to a user, including a light settings icon 1302, a securing settings icon 1304, a motion history icon 1306, a sensitivity control icon 1308. The icon 1310 ("BACK") can receive user input that allows the user to exit the motion detection screen 1300 of display 1000 and return to a previous screen.

In FIG. 25, the display 1000 can include a list 1312 of switches 102 or outlets 102, e.g., by location, available as motion detectors. In some example implementations, the user can scroll through and select from the list 1312 with arrow icons 1314. In the specific example shown in FIG. 25, the user can select from six locations: foyer entry, kitchen, master bedroom, garage entry, entertainment room, and a remote location (mother's living room switch). Each of these locations can include one or more switches 102 and/or outlets 102 with bidirectional radios to communicate with other switches 102 and/or outlets 102.

As indicated by the highlighted text in the list 1312, the user has selected the "FOYER ENTRY" as the location that includes one or more switches 102 and/or outlets 102 of interest to the user, which can then be displayed in a "currently controlling" field 1316 of the motion detection screen 1300. After the user selects on the display 1000 the one or more locations that each include one or more switches and/or outlets 102, the user can modify the light settings via icon 1302, modify the security settings via icon 1304, and/or view the motion history via icon 1306.

By selecting the light settings icon 1302, the user can turn ON/OFF a motion activated light feature and/or modify various light settings, including schedules and activity time out settings, as described below with respect to FIG. 26.

By selecting the security settings icon 1304, the user can turn ON/OFF a security alarm feature and/or modify various security settings, including schedules and how alerts, if any, should be communicated to the user, as described below with respect to FIGS. 27 and 28. As described above, alerts can be generated, for example, due to various conditions including, but not limited to power usage, e.g., high power usage or no power usage, low power supply battery, security, lighting, environmental conditions detected by one or more sensors, and health conditions detected by one or more sensors, where the sensors can include sensors integral with and/or external to the device.

By selecting the motion history icon 1306, the user can review motion events captured by the PCN 102, as described below with respect to FIG. 29.

The motion detection screen 1300 can include a sensitivity control icon 1308, e.g., a slider bar, that can allow a user to adjust a level of sensitivity of the motion detector to reduce or eliminate unwanted detection, e.g., in the case of pets walking past the sensor.

Figure 26:
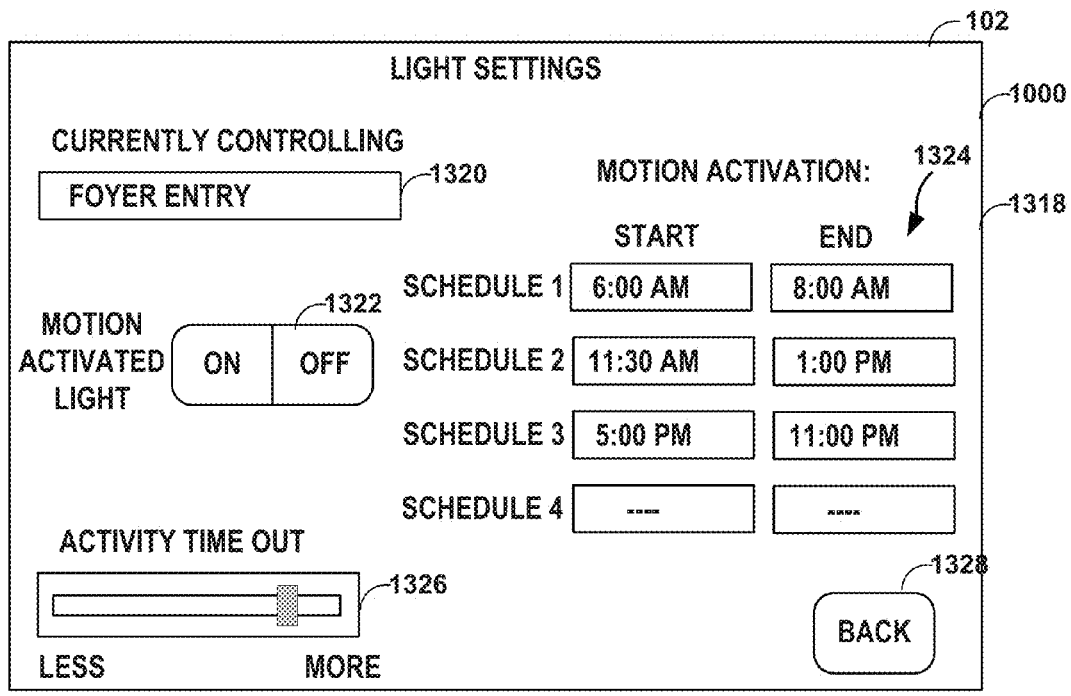

FIG. 26 is an example of the display 1000 of a PCN 102 depicting various light settings, in accordance with various techniques of this disclosure. As seen in FIG. 26, the display 1000 can present a light settings screen 1318 to a user in response to the user selecting the light settings icon 1302 of FIG. 25.

Continuing with the example above in FIG. 25 in which the user has selected the "FOYER ENTRY" as the location of interest to the user, the location can then be displayed in a "currently controlling" field 1320 of the light settings screen 1318.

Using the motion activity light ON/OFF icon 1322, the user can control whether a motion activated light feature is activated. If activated, any motion detected by the sensor, e.g., sensor 1007A of FIG. 13, can cause one or more lights in one or more rooms at one or more locations to turn ON (and/or turn OFF).

The light settings screen 1318 can include one or more motion activation schedules, shown generally at 1324. For example, a user can program various start and end times between which any motion can turn ON (and/or turn OFF) one or more lights, e.g., using controller 1104 of FIGS. 23-24. In the non-limiting example shown in FIG. 26, schedules 1-4 are depicted, with schedule 4 not currently programmed. In some examples, the controller the light can be located in the same building as the controller and/or in a different building.

The light settings screen 1318 can include an "activity time out" icon 1326, e.g., a slider bar, that can allow a user to adjust a length of time that a light (or other device), for example, remains ON after motion is detected by the sensor, e.g., sensor 1007A of FIG. 13.

The icon 1328 ("BACK") can receive user input that allows the user to exit the motion detection screen 1300 of display 1000 and return to a previous screen.

Figure 27:
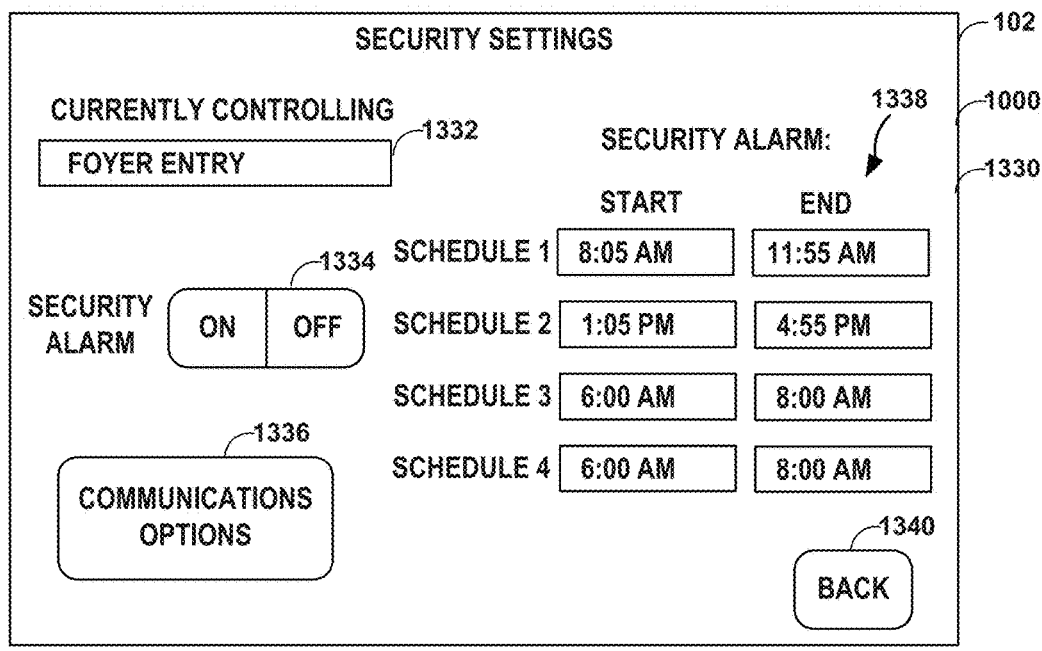

FIG. 27 is an example of the display 1000 of a PCN 102 depicting various security settings, in accordance with various techniques of this disclosure. As seen in FIG. 27, the display 1000 can present a security settings screen 1330 to a user in response to the user selecting the security settings icon 1304 of FIG. 25.

Continuing with the example above in FIG. 25 in which the user has selected the "FOYER ENTRY" as the location of interest to the user, the location can then be displayed in a "currently controlling" field 1332 of the security settings screen 1330.

Using the security alarm ON/OFF icon 1334, the user can control whether the motion detection alarm feature is activated. If activated, any motion detected by the sensor, e.g., sensor 1007A of FIG. 13, can cause the controller, e.g., controller 1104 of FIGS. 23-24, to generate an alarm in the same building as the controller and/or a different building. In some examples, the controller can generate audible and/or visual alarms in the same building as the controller and/or a different building.

In some examples, the controller can communicate to the user that motion was detected, e.g., via text message, voice message, email message. Additionally or alternatively, the controller can communicate, for example, to a user by a message sent to a user's account that can be retrieved at a website, or by a message to an app running on a user's smartphone, etc. There are numerous other ways by which the controller can communicate to the user. To control how communication(s) are received, a user can select the communications options icon 1336, which is described below with respect to FIG. 28.

The security settings screen 1330 can include one or more security alarm schedules, shown generally at 1338. For example, a user can program various start and end times between which any motion can activate an alarm. In the non-limiting example shown in FIG. 27, schedules 1-4 are depicted, with schedules 1-4 currently programmed.

The icon 1340 ("BACK") can receive user input that allows the user to exit the motion detection screen 1340 of display 1000 and return to a previous screen.

Figure 28:
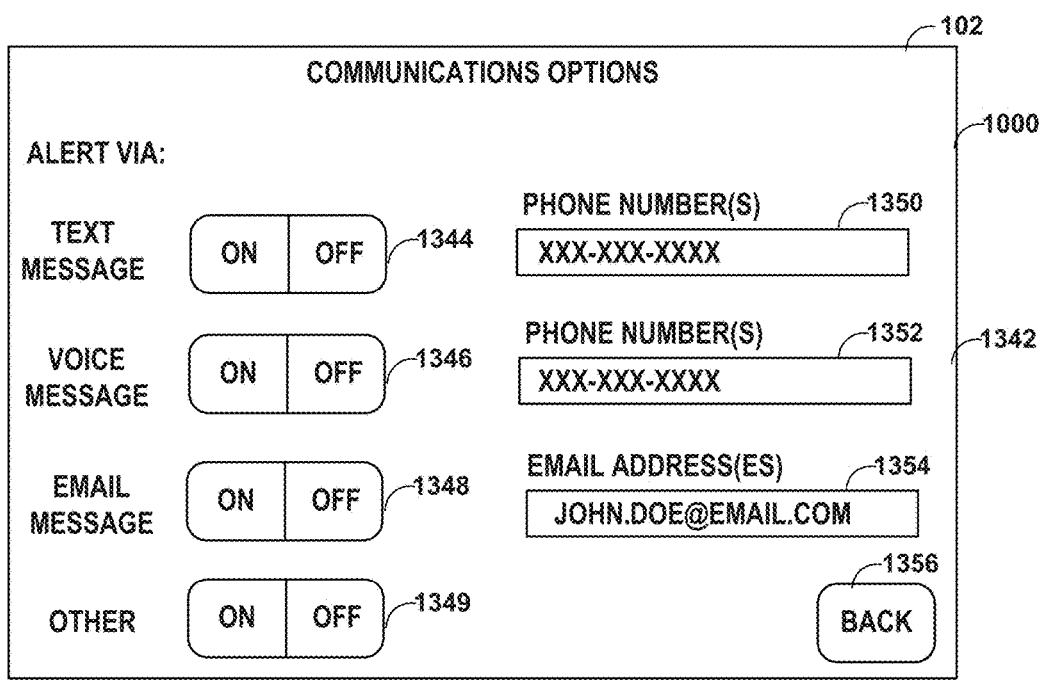

FIG. 28 is an example of the display 1000 of a PCN 102 depicting various communication options settings, in accordance with various techniques of this disclosure. As seen in FIG. 28, the display 1000 can present a communications options screen 1342 to a user in response to the user selecting the communications options icon 1336 of FIG. 27.

If activated, any motion detected by the, e.g., sensor 1007A of FIG. 13, can cause the controller, e.g., controller 1104 of FIGS. 23-24, to communicate to the user that motion was detected. To control how communication(s) are received, a user can select to receive one or more of a text message, a voice message, and an email message using, respectively, text message ON/OFF icon 1344, voice message ON/OFF icon 1346, and email message ON/OFF icon 1348. In some examples, a user can define additional or alternative modes of communication using the "other" ON/OFF icon 1349, e.g., a message sent to a user's account that can be retrieved at a website, a message to an app running on a user's smartphone, etc.

The communications options screen 1342 can include fields 1350-1354 for the user to enter one or more phone numbers to send text message alerts (field 1350), voice message alerts (field 1352), and/or one or more email addresses to send email message alerts (field 1354). If the "other" ON/OFF icon 1349 is set to ON, additional or alternative fields can be displayed on the options screen 1342 for a user to populate with the appropriate information.

The icon 1356 ("BACK") can receive user input that allows the user to exit the motion detection screen 1342 of display 1000 and return to a previous screen.

Figure 29:
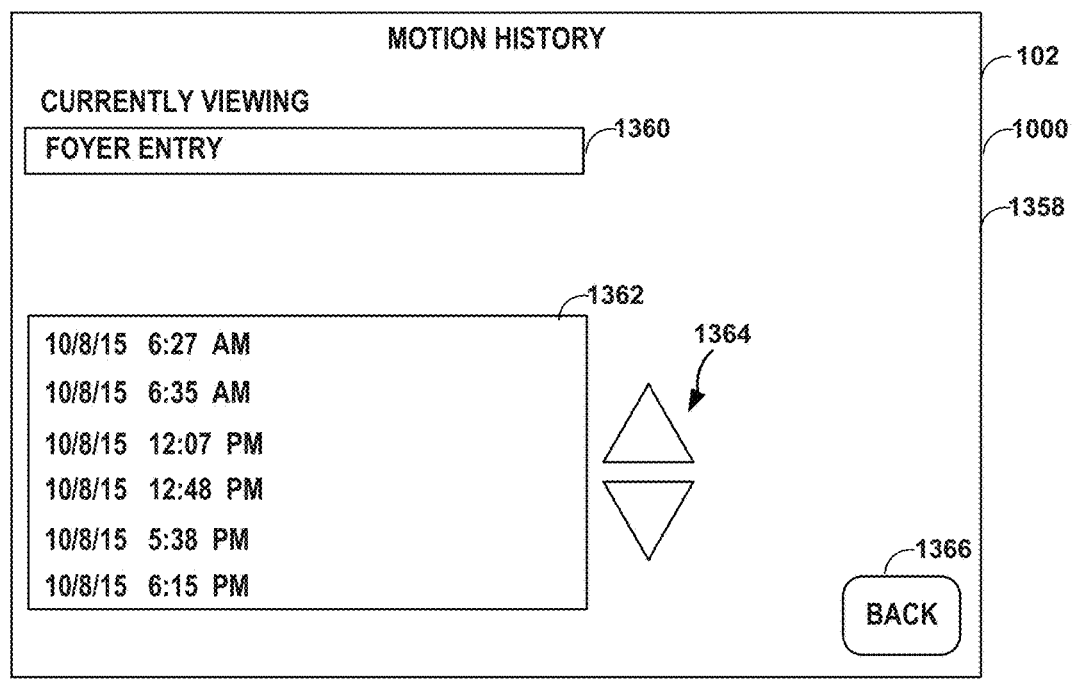

FIG. 29 is an example of the display 1000 of a PCN 102 depicting various motion history events, in accordance with various techniques of this disclosure. As seen in FIG. 29, the display 1000 can present a motion history screen 1358 to a user in response to the user selecting the motion history icon 1306 of FIG. 25.

Continuing with the example above in FIG. 25 in which the user has selected the "FOYER ENTRY" as the location of interest to the user, the location can then be displayed in a "currently controlling" field 1360 of the motion history screen 1358.

In some example implementations, the user can scroll through and review the motion events captured by the PCN 102 for the selected location from the list 1362 with arrow icons 1364. A date and time can be recorded when a controller, e.g., controller 1104 of FIGS. 23-24, detects a motion event, which can the controller can then display to a user via list 1362, as seen in FIG. 29.

The icon 1366 ("BACK") can receive user input that allows the user to exit the motion detection screen 1358 of display 1000 and return to a previous screen.

Figure 30:
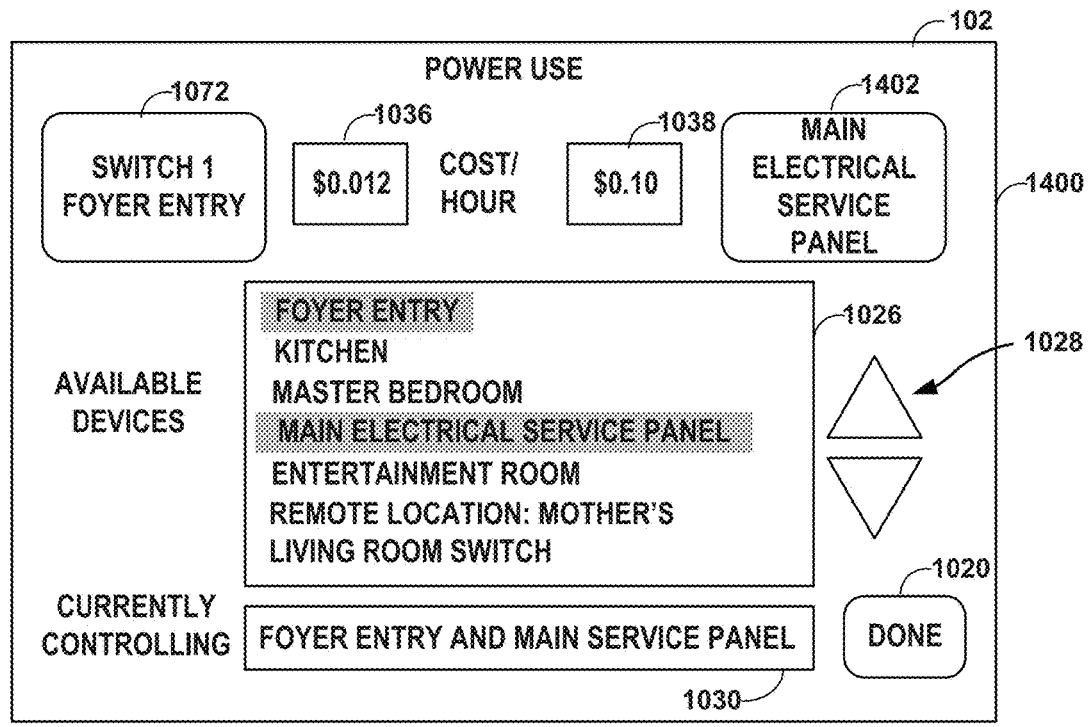
FIGS. 30-31 are examples of a display of a property communication node depicting various electrical power usage information, in accordance with various techniques of this disclosure.

FIG. 30 is another example of the display 1000 of a PCN 102 depicting various electrical power usage information, in accordance with various techniques of this disclosure. As seen in FIG. 30, the display 1000 can present another power use information screen 1400 to a user, including presenting power use information for a switch 102, e.g., from a local or remotely located switch or outlet, selected by the user as well as from a local or remotely located main electrical service panel at a house or building. In this manner, the user can view not only power use information for one or more particular switches/outlets, but can view total power consumption for a local or remote house or building.

The power use information screen 1400 can be similar to the power use information screen 1024 of FIG. 15 and, as such, similar features will not be described in detail again. The display 1000 shown in FIG. 30 can include a list 1026 of available switches 102 or outlets 102, e.g., by location, as well as a main electrical service panel.

As seen in the list 1026 by the highlighted text, the user has selected the "FOYER ENTRY" as the location that includes a switch 102 and/or outlet 102 and the user has selected the "MAIN ELECTRICAL SERVICE PANEL," which can then be displayed in a "currently controlling" field 1030 of the power use information screen 1400. After the user selects on the display 1000 the location that includes a switch and/or outlet 102, the switch 102 can begin determining and/or receiving the power use information and displaying the determined and/or received power use information.

Because each switch 102 or outlet 102 can include a bidirectional radio, e.g., the bidirectional radio 252 of FIG. 5, the display 1000 of FIG. 30 can be associated with a switch 102 located in the foyer entry and receive and present power use information associated with electrical loads connected to a switch 102. In addition, the communication circuitry 1114 of FIG. 23 or 24 can receive power information related to a main electrical service panel. For example, a current transformer and measurement circuitry positioned adjacent to the electrical service wires at the main electrical service panel of a house or building can measure a representation of the total current of the house or building. A transmitter associated with the current transformer and measurement circuitry can transmit the measured representation of the total current to the communication circuitry 1114 of the switch 102, which can process the received measurement information for display on the display 1000.

The example screen 1400 of FIG. 30 includes a switch icon 1072, and a main electrical service panel icon 1402. The switch icon 1072 in FIG. 30 is associated with "Switch 1 Foyer Entry" and the main electrical service panel icon 1402 in FIG. 30 is associated with "Main Electrical Service Panel." Each icon 1072, 1402 can be associated with a cost per hour ("COST/HOUR") field 1036, 1038. In the example of FIG. 30, "Switch 1 Foyer Entry" has a cost/hour of $0.012 and "Main Electrical Service Panel" has a cost/hour of $0.10. By displaying this power use information, the display 1000 can allow the user to monitor and/or modify his/her/another's behavior, e.g., dim light, turn off an appliance, etc., and thus conserve energy.

Figure 31:
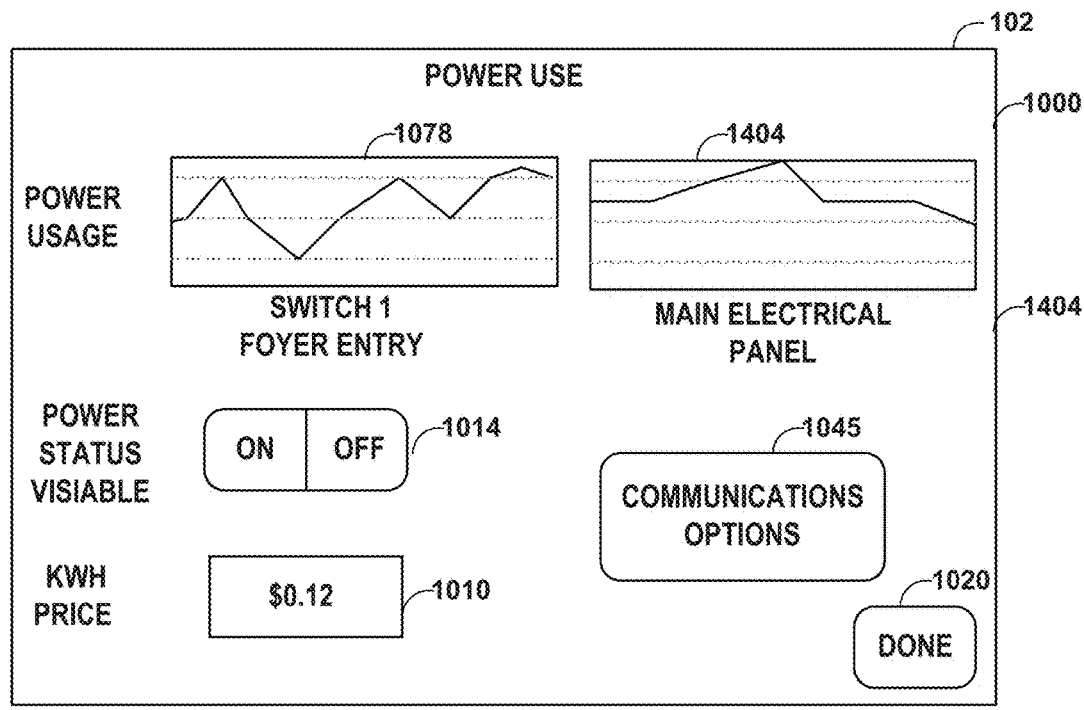

FIG. 31 is another example of the display 1000 of a PCN 102 depicting various electrical power usage information, in accordance with various techniques of this disclosure. As seen in FIG. 31, the display 1000 can present a power use information screen 1404 to a user, including a kilowatt-hour price ("KWH PRICE") field 1010, a power status visible switch icon 1014, and multiple power usage graphs 1078, 1404, e.g., two or more power usage graphs. Power usage graphs were described above with respect to FIG. 14 and, for purposes of conciseness, will not be described in detail again.

The power usage graphs 1078, 1404 can graphically present power usage information associated with the location(s) selected in FIG. 30, e.g., the foyer entry and the main electrical service panel. In the example shown in FIG. 31, the power usage graph 1078 can present power use information associated with "Switch 1 Foyer Entry" and the power usage graph 1404 can present power use information associated with "Main Electrical Service Panel."

The switches 102 and the outlets 102 described above with respect to FIGS. 30 and 31 can include any of the features described above with respect to the PCNs 102 as well as any of the features described in U.S. Pat. No. 6,894,609.

Figure 32:
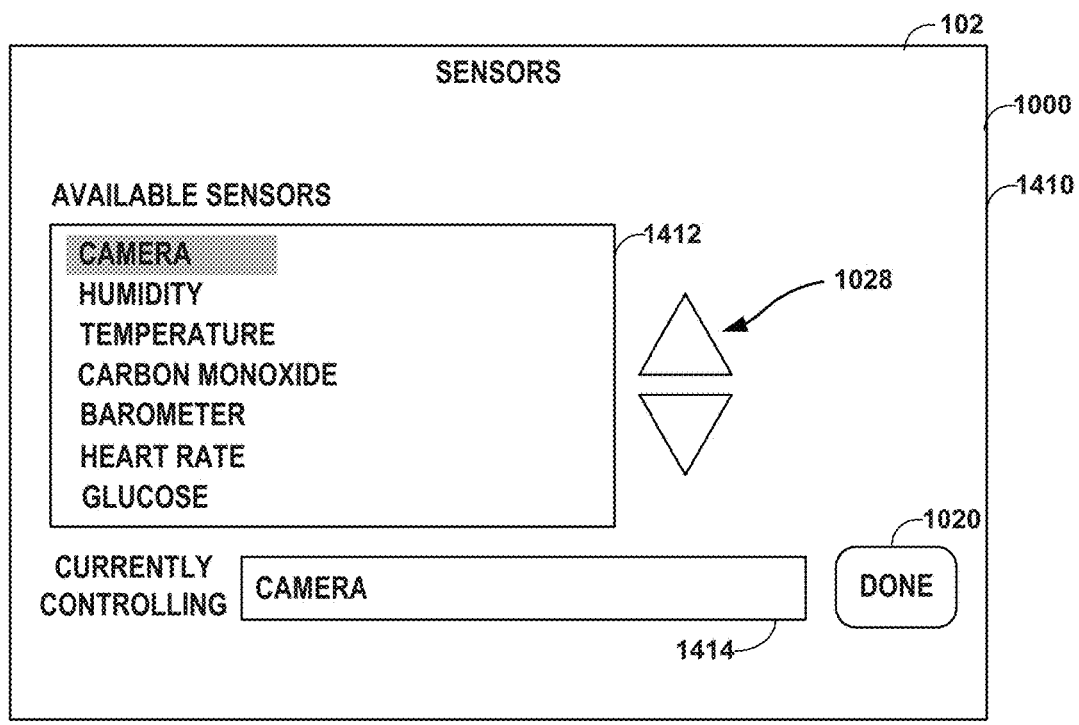
FIG. 32 is an example of a display of a property communication node depicting various example sensors that can be monitored and/or controlled, in accordance with various techniques of this disclosure.

FIG. 32 is an example of a display of a property communication node depicting various example sensors that can be monitored and/or controlled, in accordance with various techniques of this disclosure. As mentioned above, the sensor 1007A of FIG. 13 can additionally or alternatively include environmental sensing functionality. For example, the sensor 1007A can include functionality to sense one or more of carbon monoxide, toxins, temperature, humidity, allergen(s), air quality, atmospheric pressure, and the like, which are listed for purposes of explanation and are non-limiting examples. In some examples, the sensor 1007A can include one or more sensors in order to accommodate the desired functionality.

In an example implementation, the sensor 1007A can additionally or alternatively be a wearable device configured to sense or monitor information related to a user's health. For example, the sensor 1007A can be a wearable heart rate monitor, glucose monitor, fitness tracker, and/or any other type of health monitor. The sensor 1007A can be include circuitry configured to transmit information, e.g., using a wireless protocol, to the PCN 102 for display.

In FIG. 32, a screen 1410 of the display 1000 can include a list 1412 of available sensors 1007A that are available to be monitored and/or controlled. In some example implementations, the user can scroll through and select from the list 1412 with arrow icons 1028. In the specific example shown in FIG. 32, the user can select from one or more sensors including, but not limited to, the following: camera, humidity, temperature, carbon monoxide, toxin, allergen, barometer, heart rate, and glucose. It should be understood that this is a non-limiting list of example sensors. Additional or alternative sensors are contemplated and are within the scope of this disclosure.

As indicated by the highlighted text in the list 1412, the user has selected the "CAMERA" as a desired sensor to control, which can then be displayed in a "currently controlling" field 1414 of the screen 1410. After the user selects on the display 1000 the one or more sensors to control, the switch 102 can begin controlling the sensor(s), e.g., enable a camera, and/or begin controlling the display and/or monitoring of the information from the sensor(s), e g., display heart rate information from a heart rate monitor, etc.

As described in detail above, e.g., under the section titled "Advertising to the System," the present system allows the subscriber to save time shopping for things and from a multiplicity of undesired offers by specifying his or her own interest and limiting communications to only the ones desired by the subscriber. This also makes the subscriber's purchase decision more efficient. It allows the subscriber/buyer to purchase, select a shipping/pickup option, discuss the purchase, and perhaps close the buy quickly. It also saves the cost and effort of vendors and retailers in generating catalogues and other sales literature that will never achieve sales. And, as described above, the broker Service 106 of system 100 can be used to establish business and/or other distribution relationships with a variety of entities, including, but not limited to various sellers, retailers, wholesalers, distributors, merchants, creators, Broker Service 106 itself, and various partners and/or suppliers and combinations thereof.

In some example implementations, a user can select the "Settings" icon 1006 shown in FIG. 13, which can cause the PCN 102 to display a master directory of the various functionality of the PCN 102. The user can connect via PCN 102 to a website that displays one or more login fields and/or uses biometric identification, e.g., face, fingerprint, voice, and/o eye recognition and the like, and/or uses security questions and answers. The user can either login with a username and password or with biometric information, or begin a registration process to create a username and password, biometric information for identification, and/or security questions and answers.

After the user has logged into the website, the PCN 102 can display the master directory. The master directory can allow the user to select from a list of various PCN 102 functions described in this disclosure, including phone communication, intercom communication, shopping, emergency, and the Interactive Property Communication System ("IPCS") (e.g., PCN 102, broker 106, programmer 104), power, motion, sensors, browser, settings (e.g., control, modify, program, update), entertainment, books, education, and numerous other functions. If the user selected IPCS, that would allow the user, authorized person, entity etc. to operate any of the functionality associated with the PCN 102, e.g. power, motion, lights, shopping, etc. In the specific example described here, and for purposes of explanation only, the user selects "shopping".

After the user selects "shopping" from the directory, the PCN 102 can display a list of vendors, e.g., third party sellers, the broker 106 itself, etc., and the user can select from that list. At block XX, after the user selects a vendor, the PCN 102 can display the selected vendor's catalog or search page(s) and the user can enter the desired search criteria, e.g., "women's coats."

The PCN 102 can display the result(s) of the search using the search criteria, including the description, pricing, picture, etc. The user can enter one or more of the following example information: size, color, price that the user is willing to pay, whether the item will be picked up at the store by the user or delivered to the user, when a day or timeframe when the item is desired, how the user would like to be notified if the seller accepts the user's offered price/bid, e.g. on IPCS PCN 102, any programmer 104, text, phone, e-mail, app on a smartphone, notification on a website, etc., whether the seller can publicize the user's information, e.g., name, city, state, etc., in the event that the seller accepts the user's price/bid, and whether the seller can contact the user in the future with other product offerings.

The user/buyer can receive a notification of the seller's acceptance and can invite the user/buyer to complete the purchase, e.g., by returning to the seller's web site.

Various Notes

Example 1 includes subject matter (such as device, apparatus or machine) configured to be electrically connected to first electrical power wiring and for displaying electrical power usage information of at least one first electrical load connected to the first electrical power wiring, the subject matter comprising: a plurality of electrical terminals configured to electrically connect to the first electrical power wiring of a building; a controller configured to: receive information representing at least a current to the at least one first electrical load; determine first electrical power usage information of the at least one first electrical load using the received information; a user interface configured to display the determined first electrical power usage information of the at least one first electrical load; and a communications interface configured to: transmit the determined first electrical power usage information to at least one second electrical device for display, wherein the at least one second electrical device is configured to be electrically connected to second electrical power wiring; and receive determined second electrical power usage information of at least one second electrical load from the at least one second electrical device for display.

In Example 2, the subject matter of Example 1 may optionally include, wherein the user interface is configured to receive input selecting the at least one second electrical device.

In Example 3, the subject matter of one or more of Examples 1 and 2 may optionally include, wherein the first electrical power wiring and the second electrical power wiring are in the same building.

In Example 4, the subject matter of one or more of Examples 1 and 2 may optionally include, wherein the first electrical power wiring and the second electrical power wiring are in different buildings.

In Example 5, the subject matter of one or more of Examples 1-4 may optionally include, wherein the controller is configured to receive electrical price information, and wherein the user interface is configured to display the electrical price information.

In Example 6, the subject matter of Example 5 may optionally include, wherein the controller is configured to determine electrical power usage cost information using the electrical price information.

In Example 7, the subject matter of one or more of Examples 1-6 may optionally include, wherein the device is configured to control or modify at least the current to one or both of the at least one first electrical load and the at least one second electrical load, wherein the at least one first electrical load and the at least one second electrical load are located in the same building or are located in different buildings.

In Example 8, the subject matter of one or more of Examples 1-7 may optionally include, wherein the plurality of electrical terminals configured to electrically connect to the first electrical power wiring of the building include electrical terminals configured to receive individual wires of the electrical power wiring.

In Example 9, the subject matter of one or more of Examples 1-8 may optionally include, wherein the plurality of electrical terminals configured to electrically connect to the first electrical power wiring of the building include at least one multi-pronged plug configured to mate with an electrical outlet.

In Example 10, the subject matter of one or more of Examples 1-9 may optionally include, wherein the electrical device is configured to be powered by power provided by the first electrical power wiring of the building.

In Example 11, the subject matter of one or more of Examples 1-10 may optionally include, a battery, wherein the device is configured to be powered by power provided by the battery.

In Example 12, the subject matter of one or more of Examples 1-11 may optionally include, wherein the user interface is configured to display at least one electrical power usage information graph based on at least one of the determined first electrical power usage information and the determined second electrical power usage information.

In Example 13, the subject matter of one or more of Examples 1-12 may optionally include, wherein the controller is configured to: receive information representing a total current drawn by at least one electrical service wire at a main electrical service panel of a building; determine the electrical power usage information of the main electrical service panel using the received information; and wherein the user interface is configured to display the determined electrical power usage information of the main electrical service panel.

In Example 14, the subject matter of one or more of Examples 1-13 may optionally include, at least one sensor, wherein the controller is configured to receive information from the at least one sensor and determine whether motion occurred or whether motion did not occur, and wherein the at least one sensor is in the same building as the controller or in a different building.

In Example 15, the subject matter of Example 14 may optionally include, wherein the controller is configured to either turn on or turn off at least one light in the same building as the controller or in a different building in response to the determination.

In Example 16, the subject matter of Example 15 may optionally include, wherein the controller is configured to communicate an alert in response to the determination, wherein the controller is configured to communicate the alert in the same building as the controller or to a different building.

In Example 17, the subject matter of Example 16 may optionally include, wherein the alert includes at least one of an audio alert and visual alert.

In Example 18, the subject matter of Example 17 may optionally include, a frame adjacent at least one side of the user interface, the frame including electronic visual display material, wherein the frame is configured to display the visual alert.

In Example 19, the subject matter of one or more of Examples 1-18 may optionally include, wherein the controller is configured to receive user input defining a lighting schedule, and wherein the controller is configured to either turn on or turn off the at least one light in accordance with the lighting schedule, wherein the light is in the same building as the controller or in a different building.

In Example 20, the subject matter of Example 19 may optionally include, wherein the controller is configured to receive user input defining a security alert schedule, and wherein the controller is configured to communicate the alert in accordance with the security alert schedule, and wherein the controller is configured to communicate the alert in the same building as the controller or to a different building.

In Example 21, the subject matter of Example 14 may optionally include, wherein the at least one sensor is selected from the group consisting of an infrared sensor, an ultrasonic sensor, and a camera.

In Example 22, the subject matter of one or more of Examples 1-21 may optionally include, at least one sensor, wherein the at least one sensor is in the same building as the controller or in a different building.

In Example 23, the subject matter of Example 22 may optionally include, wherein the at least one sensor is configured to capture and scan information on a product label.

In Example 24, the subject matter of Example 22 may optionally include, wherein the at least one sensor is configured to sense at least one environmental condition.

In Example 25, the subject matter of Example 24 may optionally include, wherein the environmental condition is selected from the group consisting of: carbon monoxide, toxins, temperature, humidity, allergens, air quality, altitude, and atmospheric pressure.

In Example 26, the subject matter of Example 22 may optionally include, wherein the at least one sensor is configured to receive information related to a user's health.

In Example 27, the subject matter of Example 26 may optionally include, wherein the at least one sensor is configured to receive information related to at least one of heart rate, glucose, blood pressure, body temperature, oxygen saturation, activity, and lack of activity.

In Example 28, the subject matter of one or more of Examples 1-27 may optionally include, wherein the controller is configured to receive information from at least one external sensor that is configured to be connected to the electrical device.

In Example 29, the subject matter of one or more of Examples 1-28 may optionally include, wherein the communications interface is configured to communicate using a wireless connection.

In Example 30, the subject matter of Example 29 may optionally include, wherein the wireless connection is selected from the group consisting of: a proprietary wireless protocol, a packet communication connection, a cellular connection, a WiFi connection, a radio connection, Zigbee, Z-Wave, and a Bluetooth connection.

In Example 31, the subject matter of one or more of Examples 1-28 may optionally include, wherein the communications interface is configured to communicate using a wired connection.

In Example 32, the subject matter of Example 31 may optionally include, wherein the wired connection is selected from the group consisting of electrical power wiring, a public switched telephone network, an attached computer, a local area network, and an Internet connected network.

In Example 33, the subject matter of one or more of Examples 1-32 may optionally include, wherein the communications interface is configured to bi-directionally communicate with at least one of an interactive property communications system and a programmer, the system comprising: a processor; a memory comprising instructions that cause the processor to execute: a broker service module, the broker service module including software configured to execute on a network and to control bidirectional communications with one or more of a plurality of property communication devices at one or more individual premises of various premises, the broker service module including: a communications interface configured to: control communications between property communication devices at the one or more individual properties of the various premises; perform bidirectional communications with the one or more of the plurality of property communication devices; receive at least one broker service communication authorization instruction from at least one of a plurality of subscribers or at least one authorized user, the at least one broker service communication authorization instruction allowing communications with the broker service module; receive content from a broker service, wherein the broker service module acts as an interface configured to enable each subscriber of the plurality of subscribers or at least one authorized user access to a broker service acting as a third party that provides the goods and/or the services or acting as a broker to at least one third party that provides the goods and/or the services.

Example 34 includes subject matter (such as a device, apparatus or machine) configured to be electrically connected to first electrical power wiring and for displaying electrical power usage information of at least one first electrical load connected to the first electrical power wiring, the subject matter comprising: a plurality of electrical terminals configured to electrically connect to the first electrical power wiring; a sensor; a controller configured to: receive information representing at least a current to the at least one first electrical load; determine first electrical power usage information of the at least one first electrical load using the received information; receive information from the sensor and determine whether motion occurred or did not occur; a user interface configured to display the determined first electrical power usage information of the at least one first electrical load; and a communications interface configured to: transmit the determined first electrical power usage information to at least one second electrical device for display, wherein the at least one second electrical device is configured to be electrically connected to second electrical power wiring; and receive determined second electrical power usage information of at least one second electrical load from the at least one second electrical device for display.

In Example 35, the subject matter of Example 34 may optionally include, wherein the controller is configured to either turn on or turn off at least one light in the same building as the controller or in a different building when the controller determines that motion occurred or did not occur.

In Example 36, the subject matter of Example 35 may optionally include, wherein the controller is configured to receive user input defining a lighting schedule, and wherein the controller is configured to either turn on or turn off the at least one light in the same building as the controller or in a different building in accordance with the lighting schedule.

In Example 37, the subject matter of one or more of Examples 34-36 may optionally include, wherein the controller is configured to communicate an alert in response to the determination, and wherein the controller is configured to communicate the alert in the same building as the controller or to a different building.

In Example 38, the subject matter of one or more of Examples 34-37 may optionally include, wherein the controller is configured to receive user input defining at least one alert condition, and wherein the controller is configured to communicate the alert in the same building as the controller or in a different building in accordance with the at least one alert condition.

In Example 39, the subject matter of Example 38 may optionally include, wherein the at least one alert condition is selected from the group consisting of: no power usage, high power usage, low power supply battery, security schedule, lighting schedule, an environmental condition detected by one or more sensors, and a health condition detected by one or more sensors.

In Example 40, the subject matter of one or more of Examples 34-39 may optionally include, wherein the sensor is selected from the group consisting of an infrared sensor, an ultrasonic sensor, a camera configured to take pictures, and a camera configured to capture video.

Example 41 includes subject matter (such as a device, apparatus or machine) configured to be electrically connected to first electrical power wiring and for displaying electrical power usage information of at least one first electrical load connected to the first electrical power wiring, the subject matter comprising: a plurality of electrical terminals configured to electrically connect to the first electrical power wiring of a building; a controller configured to: receive information representing at least a current to the at least one first electrical load; determine first electrical power usage information of the at least one first electrical load using the received information; receive electrical price information and determine electrical power usage cost information using the electrical price information; a user interface configured to: display the determined first electrical power usage information of the at least one first electrical load; and display the electrical price information; and a communications interface configured to: transmit the determined first electrical power usage information to at least one second electrical device for display, wherein the at least one second electrical device is configured to be electrically connected to second electrical power wiring; and receive, from the at least one second electrical device, determined second electrical power usage information of at least one second electrical load connected to the at least one second electrical device, wherein the device is configured to control or modify at least the current to one or both of the at least one first electrical load and the at least one second electrical load, wherein the at least one first electrical load and the at least one second electrical load are located in the same building or are located in different buildings, and wherein the user interface is configured to display at least one electrical power usage information graph based on at least one of the determined first electrical power usage information and the determined second electrical power usage information.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled. This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

The invention claimed is:

1. An electrical device configured to be electrically connected to first electrical power wiring and configured to at least one of capture images or scan images, the electrical device comprising:
a plurality of electrical terminals configured to electrically connect to the first electrical power wiring of a building;
a sensor to at least one of capture an image or scan an image;
a controller configured to:
receive information from the sensor representing the image and process the information;
receive information representing at least a current to the at least one first electrical load;
control or modify at least a current to the at least one first electrical load;
a user interface configured to display processed information about the image; and
a communications interface configured to:
transmit instructions to at least one second electrical device that controls or modifies at least a current to the at least one second electrical load, wherein the at least one second electrical load is distinct from the at least one first electrical load.

2. The electrical device of claim 1, wherein the image includes a product barcode, and wherein the controller is configured to determine a product associated with the product barcode.

3. The electrical device of claim 2, wherein the communications interface is configured to transmit a message to a user regarding the determined product.

4. The electrical device of claim 3, wherein the communications interface is configured to transmit the message to the user using the second electrical device.

5. The electrical device of claim 4, wherein the at least one second electrical device is configured to be electrically connected to second electrical power wiring, and wherein the first electrical power wiring and the second electrical power wiring are in different buildings.

6. The electrical device of claim 4, wherein the at least one second electrical device is configured to be electrically connected to second electrical power wiring, and wherein the first electrical power wiring and the second electrical power wiring are in the same building.

7. The electrical device of claim 4, wherein the user interface is configured to receive input selecting the at least one second electrical device.

8. The electrical device of claim 2, wherein the controller is configured to store data representing the determined product.

9. The electrical device of claim 8, wherein the user interface is configured to display data representing at least one determined product.

10. The electrical device of claim 1, wherein the image includes a label having text, wherein the controller is configured to perform text recognition on the text, and wherein the controller is configured to determine a product associated with the recognized text.

11. The electrical device of claim 10, wherein the communications interface is configured to transmit a message to a user regarding the determined product.

12. The electrical device of claim 11, wherein the communications interface is configured to transmit the message to the user using the second electrical device.

13. The electrical device of claim 12, wherein the at least one second electrical device is configured to be electrically connected to second electrical power wiring, and wherein the first electrical power wiring and the second electrical power wiring are in different buildings.

14. The electrical device of claim 12, wherein the at least one second electrical device is configured to be electrically connected to second electrical power wiring, and wherein the first electrical power wiring and the second electrical power wiring are in the same building.

15. The electrical device of claim 12, wherein the user interface is configured to receive input selecting the at least one second electrical device.

16. The electrical device of claim 10, wherein the controller is configured to store data representing the determined product.

17. The electrical device of claim 16, wherein the user interface is configured to display data representing at least one determined product.

18. The electrical device of claim 1, wherein the user interface includes a touch screen to receive user input.

19. The electrical device of claim 18, further comprising a physical switch.

20. The electrical device of claim 19, wherein the physical switch is one of a rocker switch or a push button switch.

21. The electrical device of claim 19, wherein the physical switch is a dimmer switch.

22. The electrical device of claim 1, wherein the controller is further configured to:
permit a user to access the device upon receiving user-authenticating information.

23. The electrical device of claim 22, wherein the user-authenticating information includes biometric information.

24. The electrical device of claim 23, wherein the biometric is selected from the group consisting of facial information, fingerprint information, voice information, and eye information.

25. The electrical device of claim 22, wherein the user-authenticating information includes at least one security question.

26. The electrical device of claim 22, wherein the user-authenticating information includes a password.

27. The electrical device of claim 1, wherein the controller is further configured to:
receive information from a security sensor; and
generate an alarm in response to the received information.

28. The electrical device of claim 27, wherein the controller is configured to generate the alarm in at least one of the building or another building.

29. The electrical device of claim 1, wherein the image is a first image, and wherein the user interface includes a display screen.

30. The electrical device of claim 29, further comprising:
a frame adjacent at least one side of the user interface, the frame including electronic visual display material.

31. The electrical device of claim 30, wherein at least one of the display screen and the frame is configured to display a design, a second image, a pattern, a color, and a visual alert.

32. The electrical device of claim 31, wherein the controller is further configured to:
receive information from a security sensor; and
display at least one of the design, the second image, the pattern, the color, and the visual alert in response to the received information.

33. The electrical device of claim 32, wherein the controller is configured to display the at least one of the design, the second image, the pattern, the color, and the visual alert at least one of the building or another building.

34. A method of electrically controlling first and second electrical loads and at least one of capturing images or scanning images, the method comprising:
using a first electrical device, at least one of capturing an image or scanning an image;
using the first electrical device, receiving information representing the image and processing the information;
using the first electrical device, displaying processed information about the image;
using the first electrical device, receiving information representing at least a current to the first electrical load;
using the first electrical device, controlling or modifying at least a current to the first electrical load; and
using the first electrical device, transmitting instructions to a second electrical device to control or modify at least a current to the second electrical load, wherein the second electrical load is distinct from the first electrical load.

* * * * *